US011300996B2

(12) United States Patent
Kim et al.

(10) Patent No.: US 11,300,996 B2
(45) Date of Patent: Apr. 12, 2022

(54) ELECTRONIC DEVICE INCLUDING FOLDABLE CONDUCTIVE PLATE

(71) Applicant: Samsung Electronics Co., Ltd., Suwon-si (KR)

(72) Inventors: Seonghoon Kim, Suwon-si (KR); Harksang Kim, Suwon-si (KR); Sungho Ahn, Suwon-si (KR); Donghyun Yeom, Suwon-si (KR); Chungkeun Yoo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/336,754

(22) Filed: Jun. 2, 2021

(65) Prior Publication Data

US 2021/0286407 A1  Sep. 16, 2021

Related U.S. Application Data

(63) Continuation of application No. 17/307,415, filed on May 4, 2021, which is a continuation of application
(Continued)

(30) Foreign Application Priority Data

Mar. 11, 2019  (KR) .................. 10-2019-0027753
Jun. 13, 2019  (KR) .................. 10-2019-0070106

(51) Int. Cl.
*G06F 1/16*  (2006.01)
*H04M 1/02*  (2006.01)

(52) U.S. Cl.
CPC .......... *G06F 1/1616* (2013.01); *G06F 1/1652* (2013.01); *G06F 1/1656* (2013.01);
(Continued)

(58) Field of Classification Search
CPC .................................................. G06F 1/1681
See application file for complete search history.

(56) References Cited

U.S. PATENT DOCUMENTS 9,204,565 B1  12/2015  Lee et al.
9,798,359 B2  10/2017  Seo et al.
(Continued)

FOREIGN PATENT DOCUMENTS

CN  1798493 A  7/2006
CN  101877951 A  11/2010
(Continued)

OTHER PUBLICATIONS

International Search Report dated Jun. 24, 2020, issued in International Application No. PCT/KR2020/003407.
(Continued)

*Primary Examiner* — Jerry Wu
(74) *Attorney, Agent, or Firm* — Jefferson IP Law, LLP

(57) ABSTRACT

According to various embodiments, an electronic device may include a housing including an opening connected to an internal space; a tray socket disposed to be connected to the outside through the opening in the internal space and including a tray reception space; a tray inserted into the tray reception space, wherein the tray includes a tray body including at least one space configured to receive at least one external component; and a tray cover including a pin insertion hole configured to guide a tray ejecting pin to the opening; an eject bar movably disposed in a tray mounting direction or ejecting direction in the tray reception space and facing the pin insertion hole; and a rotation lever configured to press the tray in the ejection direction according to pressing of the eject bar in the tray reception space, wherein
(Continued)

the eject bar is disposed at a position at least partially overlapped with the tray body when viewed from above the tray socket.

14 Claims, 46 Drawing Sheets

Related U.S. Application Data

No. 16/910,665, filed on Jun. 24, 2020, which is a continuation of application No. PCT/KR2020/003407, filed on Mar. 11, 2020.

(52) U.S. Cl.
CPC ........ *G06F 1/1681* (2013.01); *H04M 1/0216* (2013.01); *H04M 1/0268* (2013.01)

(56) References Cited

U.S. PATENT DOCUMENTS

| | | |
|---|---|---|
| 10,015,897 B1 | 7/2018 | Hong et al. |
| 10,368,452 B2 | 7/2019 | Yun et al. |
| 2006/0139271 A1 | 6/2006 | Okuda |
| 2010/0270052 A1 | 10/2010 | Crohas et al. |
| 2015/0043174 A1* | 2/2015 | Han ............... G06F 1/1652 361/749 |
| 2015/0241925 A1 | 8/2015 | Seo et al. |
| 2015/0330614 A1 | 11/2015 | Lee et al. |
| 2015/0366089 A1 | 12/2015 | Park et al. |
| 2016/0070304 A1 | 3/2016 | Shin et al. |
| 2016/0118616 A1 | 4/2016 | Hiroki et al. |
| 2016/0188098 A1 | 6/2016 | Her et al. |
| 2016/0357052 A1 | 12/2016 | Kim et al. |
| 2016/0364044 A1 | 12/2016 | Kim et al. |
| 2016/0366255 A1 | 12/2016 | Chu et al. |
| 2017/0061836 A1 | 3/2017 | Kim et al. |
| 2017/0066275 A1 | 3/2017 | Kovacevitch |
| 2017/0068275 A1 | 3/2017 | Lee et al. |
| 2017/0192460 A1 | 7/2017 | Watanabe et al. |
| 2018/0093462 A1 | 4/2018 | Liu et al. |
| 2018/0295735 A1 | 10/2018 | Ahn |
| 2018/0324964 A1 | 11/2018 | Yoo et al. |
| 2019/0036068 A1 | 1/2019 | Kim et al. |
| 2019/0058110 A1 | 2/2019 | Singh et al. |
| 2019/0132987 A1* | 5/2019 | Koo ............... H05K 5/0217 |
| 2019/0196548 A1 | 6/2019 | Kim et al. |
| 2019/0302917 A1 | 10/2019 | Pan |

FOREIGN PATENT DOCUMENTS

| | | |
|---|---|---|
| CN | 204103970 U | 1/2015 |
| CN | 205750746 U | 11/2016 |
| CN | 106205384 A | 12/2016 |
| CN | 106210180 A | 12/2016 |
| CN | 106252378 A | 12/2016 |
| CN | 108269497 A | 7/2018 |
| CN | 109003545 A | 12/2018 |
| CN | 109360499 A | 2/2019 |
| CN | 109979323 A | 7/2019 |
| EP | 3 109 847 A1 | 12/2016 |
| EP | 3 737 074 A1 | 11/2020 |
| EP | 3 896 948 A1 | 10/2021 |
| KR | 10-2015-0099383 A | 8/2015 |
| KR | 10-2016-0017843 A | 2/2016 |
| KR | 10-2016-0145913 A | 12/2016 |
| KR | 10-1834793 B1 | 3/2018 |
| KR | 10-2018-0036857 A | 4/2018 |
| KR | 10-2018-0079016 A | 7/2018 |
| KR | 10-2018-0122210 A | 11/2018 |
| KR | 10-2019-0003257 A | 1/2019 |
| TW | 201720268 A | 6/2017 |

OTHER PUBLICATIONS

European Search Report dated Feb. 18, 2021, issued in European Application No. 20729610.4.
Extended European Search Report dated Jun. 25, 2021, issued in European Patent Application No. 21178274.3-1216.
Chinese Office Action dated Jul. 5, 2021, issued in Chinese Patent Application No. 202080001213.X.
A Study on the Patent Layout and Implications for E Ink Electronic Paper Flexible Display, Nov. 15, 2015.
Chinese Office Action dated Nov. 12, 2021, issued in Chinese Patent Application No. 202110619879.8.
Chinese Notice of Allowance dated Jan. 30, 2022, issued in Chinese Patent Application No. 202110619879.8.
Chinese Office Action dated Feb. 16, 2022, issued in Chinese Patent Application No. 202080001213.X.

\* cited by examiner

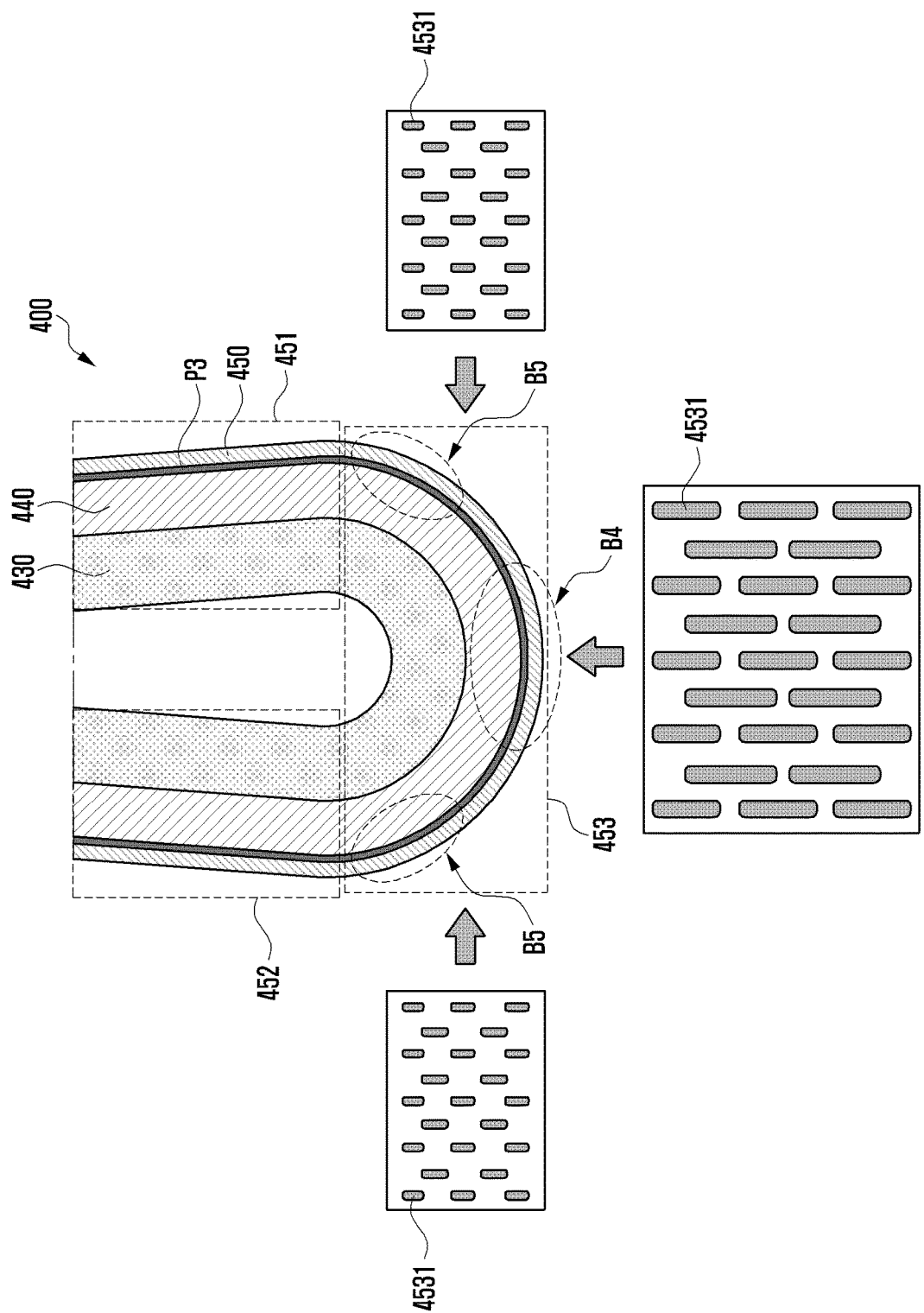

ELECTRONIC DEVICE INCLUDING FOLDABLE CONDUCTIVE PLATE

CROSS-REFERENCE TO RELATED APPLICATION(S)

This application is a continuation application of Ser. No. 17/307,415, filed on May 4, 2021, which is a continuation application of Ser. No. 16/910,665, filed on Jun. 24, 2020, which is a continuation application, claiming priority under § 365(c), of an International application No. PCT/KR2020/003407, filed on Mar. 11, 2020, which was based on and claimed the benefit of a Korean patent application number 10-2019-0027753, filed on Mar. 11, 2019, in the Korean Intellectual Property Office, and of a Korean patent application number 10-2019-0070106, filed on Jun. 13, 2019, in the Korean Intellectual Property Office, the disclosure of each of which is incorporated by reference herein in its entirety.

TECHNICAL FIELD

Various embodiments of the disclosure relate to an electronic device including a foldable conductive plate.

BACKGROUND ART

As a functional gap of each manufacturer decreases significantly, an electronic device is gradually slimming to meet a consumer's purchasing needs. In order to increase the rigidity of the electronic device, to strengthen a design aspect thereof, and to differentiate functional elements thereof, the electronic device is improving. Such electronic devices are being gradually transformed into various shapes out of a uniform rectangular shape. For example, the electronic device may be conveniently carried and have a transformable structure that may use a large screen display when used. A foldable type electronic device has been continuously released, and a support structure for a foldable display may be also improved.

DISCLOSURE OF INVENTION

Technical Problem

The foldable electronic device may include a hinge structure and a first housing structure and a second housing structure connected in directions opposite to each other in the hinge structure. The foldable electronic device may operate in an in-folding manner and/or an out-folding manner when the first housing structure rotates with a range of 0° to 360° relative to the second housing structure through a hinge structure. The foldable electronic device may include a flexible display disposed to cross the first housing structure and the second housing structure in an unfolded state of 180°.

In general, an electronic device (e.g., bar type electronic device) having a single housing may include at least one conductive plate disposed at a rear surface of the display in an internal space, and that may help rigidity reinforcement by supporting the display, and provided for noise shielding purposes. Such a conductive plate may be grounded to the ground of a printed circuit board disposed inside the electronic device through an electrical connection member.

A foldable electronic device may have a configuration in which a first housing structure and a second housing structure move relative to each other by a hinge structure and are separated from each other. Therefore, in the case of a conductive plate that cannot be folded, two conductive plates may be separately disposed in each housing structure.

However, such a separate disposition structure of the conductive plate causes folding marks in the corresponding portions of the display facing corner portions of each conductive plate near the hinge structure by a frequent folding operation of the electronic device, and these folding marks may cause a malfunction of the electronic device and deteriorate operational reliability.

Various embodiments of the disclosure may provide an electronic device including a foldable conductive plate.

Various embodiments of the disclosure may provide an electronic device including a foldable conductive plate capable of adjusting flexibility in each area according to folding characteristics.

Various embodiments of the disclosure may provide an electronic device including a foldable conductive plate having a low production cost and an excellent assembly property.

Solution to Problem

According to various embodiments of the disclosure, an electronic device includes a hinge module; a first housing connected to the hinge module; a second housing connected to the hinge module so as to fold with respect to the first housing; and a flexible display disposed to receive support of at least a portion of the second housing from at least a portion of the first housing through the hinge module, wherein the flexible display includes a display panel; at least one polymer member disposed at a rear surface of the display panel; and a conductive plate including a first flat portion disposed at a rear surface of the polymer member and facing the first housing, a second flat portion facing the second housing, and a flexible portion configured to integrally connect the first flat portion and the second flat portion and formed to be bendable through a plurality of openings spaced apart from each other, wherein the flexible portion includes a bending portion configured to be folded together with the display; a first lower attachment portion connected from the bending portion to the first flat portion and attached to the first housing together with at least a portion of the first flat portion through an adhesive member; and a second lower attachment portion connected from the bending portion to the second flat portion and attached to the second housing together with at least a portion of the second flat portion through the adhesive member.

According to various embodiments of the disclosure, an electronic device includes a hinge module; a first housing connected to the hinge module; a second housing connected to the hinge module so as to fold with respect to the first housing; and a flexible display disposed to receive support of at least a portion of the second housing from at least a portion of the first housing through the hinge module, wherein the flexible display includes a display panel; at least one polymer member disposed at a rear surface of the display panel; a conductive plate including a first flat portion disposed at a rear surface of the polymer member and facing the first housing, a second flat portion facing the second housing, and a flexible portion configured to integrally connect the first flat portion and the second flat portion and formed to be bendable through a plurality of openings spaced apart from each other; a first reinforcing plate disposed at a rear surface of the conductive plate and disposed to face at least a portion of the first flat portion and the flexible portion; and a second reinforcing plate disposed at a rear surface of the conductive plate and facing at least a portion of the second flat portion and the flexible portion and spaced apart from the first reinforcing plate so as to have a gap, wherein the flexible portion includes a bending portion configured to be folded together with the display; a first lower attachment portion extended from the bending portion to the first flat portion and attached to the first reinforcing plate together with at least a portion of the first flat portion through an adhesive member; and a second lower attachment portion extended from the bending portion to the second flat portion and attached to the second reinforcing plate together with at least a portion of the second flat portion through the adhesive member.

According to various embodiments of the disclosure, an electronic device includes a hinge module; a first housing connected to the hinge module; a second housing connected to the hinge module so as to fold with respect to the first housing; and a flexible display disposed to receive support of at least a portion of the second housing from at least a portion of the first housing through the hinge module, wherein the flexible display includes a display panel; at least one polymer member disposed at a rear surface of the display panel; and a conductive plate including a first flat portion disposed at a rear surface of the polymer member and facing the first housing, a second flat portion facing the second housing, and a flexible portion configured to integrally connect the first flat portion and the second flat portion and formed to be bendable through a plurality of openings spaced apart from each other, wherein the flexible portion includes a rigid reinforcement area having a predetermined area from upper and lower edges.

According to various embodiments of the disclosure, a mobile communication device includes a housing including a first housing portion and a second housing portion; a flexible display received in the first housing portion and the second housing portion, wherein the flexible display includes a first display area that may be bent as the housing is folded and a second display area maintained in a flat surface in a state in which the housing is folded; and a plate received in the housing, positioned under the flexible display and in which a pattern having elasticity is formed, wherein a first pattern portion of the pattern is positioned under the first display area, and a second pattern portion adjacent to the first pattern portion of the pattern is positioned under a portion adjacent to the first display area among the second display area.

According to various embodiments of the disclosure, a display module includes a flexible display including a first display area that may be bent according to folding thereof and a second display area maintained in a flat surface in a state in which the display module is folded; and a plate positioned under the flexible display and in which a pattern having elasticity is formed, wherein a first pattern portion of the pattern is positioned under the first display area, and a second pattern portion adjacent to the first pattern portion of the pattern is positioned under a portion adjacent to the first display area among the second display area.

Advantageous Effects of Invention

Various embodiments of the disclosure provide an integral foldable conductive plate to support a foldable flexible display, so that occurrence of folding marks on the display according to frequent folding operations can be prevented, and the bendability of each area according to various folding characteristics of the electronic device can be adjusted; thus, operational reliability can be improved, the production cost can be reduced, and the assembly labor can be reduced.

BRIEF DESCRIPTION OF DRAWINGS

In the drawings, the same or similar reference numerals may be used for the same or similar components.

FIG. 10 is a diagram illustrating a disposition configuration of openings in consideration of flexibility of a flexible portion of a conductive plate in each area according to a folding operation of a display according to various embodiments of the disclosure.

MODE FOR THE INVENTION

Figure 1:
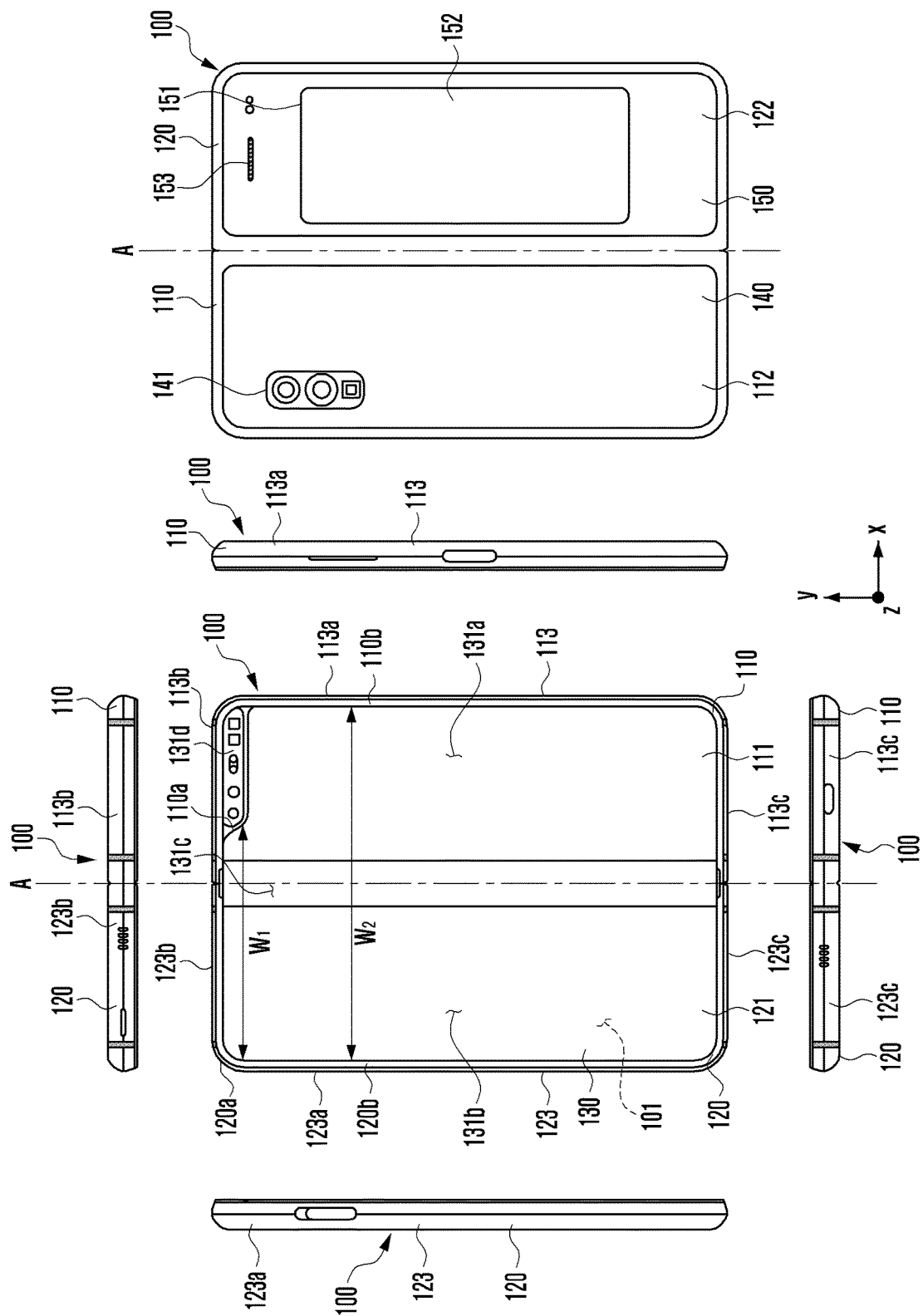
FIG. 1 is a diagram illustrating an unfolded state of an electronic device according to various embodiments of the disclosure.
Figure 2:
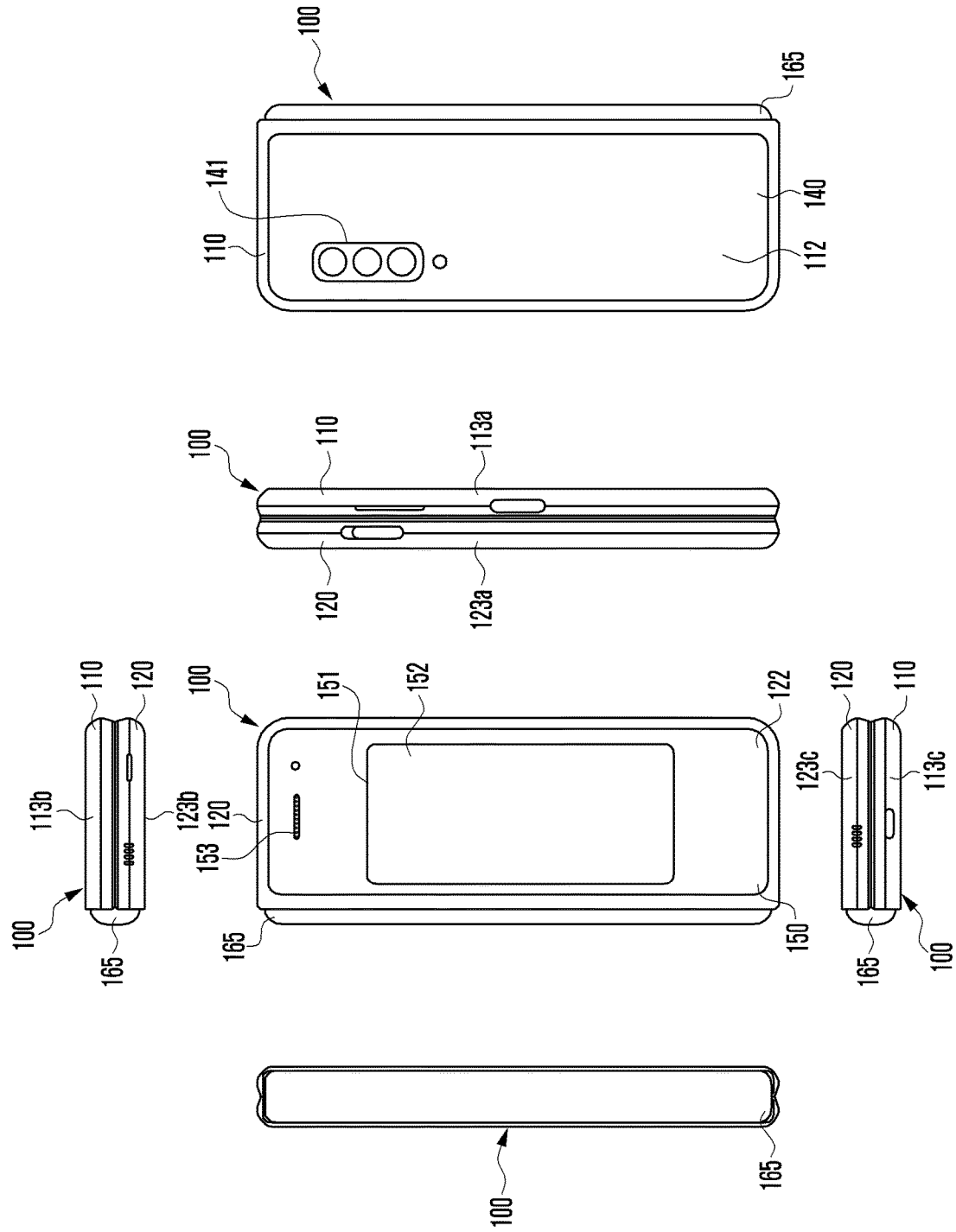
FIG. 2 is a diagram illustrating a folded state of the electronic device of FIG. 1 according to various embodiments of the disclosure.

FIG. 1 is a diagram illustrating an unfolded state of an electronic device according to an embodiment of the disclosure. FIG. 2 is a diagram illustrating a folded state of the electronic device of FIG. 1 according to an embodiment of the disclosure.

With reference to FIG. 1, the electronic device 100 (e.g., mobile communication device) may include a pair of housing structures 110 and 120 (e.g., foldable housing structure or housing) rotatably coupled through a hinge structure (e.g., the hinge structure 164 of FIG. 3) so as to be folded with respect to each other, a hinge cover (e.g., the hinge cover 165 of FIG. 2) for covering foldable portions of the pair of housing structures 110 and 120, and a display 130 (e.g., flexible display, foldable display, or first display) disposed in a space formed by the pair of housing structures 110 and 120. In the description, the surface on which the display 130 is disposed may be referred to as the front surface of the electronic device 100, and the opposite side of the front surface may be referred to as the rear surface of the electronic device 100. The surface surrounding the space between the front surface and the rear surface may be referred to as the side surface of the electronic device 100.

In one embodiment, the pair of housing structures 110 and 120 may include a first housing structure 110 (e.g., first housing or first housing portion) including a sensor area 131d, a second housing structure 120 (e.g., second housing or second housing portion), a first rear cover 140, and a second rear cover 150. The pair of housing structures 110 and 120 of the electronic device 100 are not limited to the shape or combination illustrated in FIGS. 1 and 2, but may be implemented in various shapes or combinations. For example, in another embodiment, the first housing structure 110 and the first rear cover 140 may be formed as a single body, and the second housing structure 120 and the second rear cover 150 may be formed as a single body.

In one embodiment, the first housing structure 110 and the second housing structure 120 may be disposed at both sides with respect to the folding axis (A) and may be substantially symmetrical with respect to the folding axis (A). In one embodiment, the angle or distance between the first housing structure 110 and the second housing structure 120 may vary depending upon whether the electronic device 100 is in the flat state or closed state, the folded state, or the intermediate state. In one embodiment, the first housing structure 110 includes the sensor region 131d where various sensors are disposed, but may have a symmetrical shape with the second housing structure 120 in other regions. In another embodiment, the sensor region 131d may be disposed in a specific region of the second housing structure 120 or may be replaced.

In one embodiment, during the flat state of the electronic device 100, the first housing structure 110 may be connected to the hinge structure (e.g., hinge structure 164 in FIG. 3), and may include a first surface 111 facing the front surface of the electronic device 100, a second surface 112 facing away from the first surface 111, and a first side member 113 enclosing at least a portion of the space between the first surface 111 and the second surface 112. In one embodiment, the first side member 113 may include a first side surface 113a disposed in parallel with the folding axis (A), a second side surface 113b extending from one end of the first side surface 113a in a direction perpendicular to the folding axis, and a third side surface 113c extending from the other end of the first side surface 113a in a direction perpendicular to the folding axis.

In one embodiment, during the flat state of the electronic device 100, the second housing structure 120 may be connected to the hinge structure (e.g., hinge structure 164 in FIG. 3), and may include a third surface 121 facing the front surface of the electronic device 100, a fourth surface 122 facing away from the third surface 121, and a second side member 123 enclosing at least a portion of the space between the third surface 121 and the fourth surface 122. In one embodiment, the second side member 123 may include a fourth side surface 123a disposed in parallel with the folding axis (A), a fifth side surface 123b extending from one end of the fourth side surface 123a in a direction perpendicular to the folding axis, and a sixth side surface 123c extending from the other end of the fourth side surface 123a in a direction perpendicular to the folding axis. In one embodiment, the third surface 121 may face the first surface 111 in the folded state.

In one embodiment, the electronic device 100 may include a recess 101 formed to accommodate the display 130 through a structural combination of the shapes of the first housing structure 110 and the second housing structure 120. The recess 101 may have substantially the same size as the display 130. In one embodiment, the recess 101 may have two or more different widths in a direction perpendicular to the folding axis (A) due to the sensor region 131d. For example, the recess 101 may have a first width (W1) between a first portion 120a of the second housing structure 120 parallel to the folding axis (A) and a first portion 110a of the first housing structure 110 formed at the edge of the sensor region 131d, and have a second width (W2) between a second portion 120b of the second housing structure 120 and a second portion 110b of the first housing structure 110 that does not correspond to the sensor region 113d and is parallel to the folding axis (A). Here, the second width (W2) may be wider than the first width (W1). In other words, the recess 101 may be formed to have the first width (W1) ranging from the first portion 110a of the first housing structure 110 to the first portion 120a of the second housing structure 120 (asymmetric shape), and the second width (W2) ranging from the second portion 110b of the first housing structure 110 to the second portion 120b of the second housing structure 120 (symmetric shape). In one embodiment, the first portion 110a and the second portion 110b of the first housing structure 110 may be located at different distances from the folding axis (A). The width of the recess 101 is not limited to the example shown above. In various embodiments, the recess 101 may have two or more different widths owing to the shape of the sensor region 113d or the asymmetry of the first housing structure 110 or the second housing structure 120.

In one embodiment, at least a portion of the first housing structure 110 and the second housing structure 120 may be made of a metal or non-metal material having a rigidity value selected to support the display 130.

In one embodiment, the sensor region 131d may be formed to have a preset area near to one corner of the first housing structure 110. However, the arrangement, shape, or size of the sensor region 131d is not limited to the illustrated example. For example, in a certain embodiment, the sensor region 131d may be formed at another corner of the first housing structure 110 or in any region between the upper corner and the lower corner. In another embodiment, the sensor region 131d may be disposed at a portion of the second housing structure 120. In another embodiment, the sensor region 131d may be formed to extend between the first housing structure 110 and the second housing structure 120. In one embodiment, to perform various functions, the electronic device 100 may include components exposed to the front surface of the electronic device 100 through the sensor region 113d or through one or more openings provided in the sensor region 131d. The components may include, for example, at least one of a front camera, a receiver, a proximity sensor, an illuminance sensor, an iris recognition sensor, an ultrasonic sensor, or an indicator.

In one embodiment, the first rear cover 140 may be disposed on the second surface 112 of the first housing structure 110 and may have a substantially rectangular periphery. In one embodiment, at least a portion of the periphery may be wrapped by the first housing structure 110. Similarly, the second rear cover 150 may be disposed on the fourth surface 122 of the second housing structure 120, and at least a portion of the periphery thereof may be wrapped by the second housing structure 120.

In the illustrated embodiment, the first rear cover 140 and the second rear cover 150 may have a substantially symmetrical shape with respect to the folding axis (A). In another embodiment, the first rear cover 140 and the second rear cover 150 may have various different shapes. In another embodiment, the first rear cover 140 may be formed as a single body with the first housing structure 110, and the second rear cover 150 may be formed as a single body with the second housing structure 120.

In one embodiment, the first rear cover 140, the second rear cover 150, the first housing structure 110, and the second housing structure 120 may be combined with each other so as to provide a space where various components (e.g., printed circuit board, antenna module, sensor module, and battery) of the electronic device 100 can be arranged. In one embodiment, one or more components may be disposed on or visually exposed via the rear surface of the electronic device 100. For example, one or more components or sensors may be visually exposed through the first rear region 141 of the first rear cover 140. The sensors may include a proximity sensor, a rear camera, and/or a flash. In another embodiment, at least a portion of the sub-display 152 may be visually exposed through the second rear region 151 of the second rear cover 150.

The display 130 may be disposed on the space formed by the pair of housing structures 110 and 120. For example, the display 130 may be seated in the recess (e.g., recess 101 in FIG. 1) formed by the pair of housing structures 110 and 120, and may be disposed to substantially occupy most of the front surface of the electronic device 100. Hence, the front surface of the electronic device 100 may include the display 130, a portion (e.g., edge region) of the first housing structure 110 close to the display 130, and a portion (e.g. edge region) of the second housing structure 120 close to the display 130. In one embodiment, the rear surface of the electronic device 100 may include the first rear cover 140, a portion (e.g., edge region) of the first housing structure 110 close to the first rear cover 140, the second rear cover 150, and a portion (e.g. edge region) of the second housing structure 120 close to the second rear cover 150.

In one embodiment, the display 130 may refer to a display in which at least a portion may be deformed into a flat or curved surface. In one embodiment, the display 130 may include a folding region 131c, a first region 131a disposed on one side (e.g., right side of the folding region 131c) with respect to the folding region 131c, and a second region 131b disposed on the other side (e.g., left side of the folding region 131c). For example, the first region 131a may be disposed on the first surface 111 of the first housing structure 110, and the second region 131b may be disposed on the third surface 121 of the second housing structure 120. This demarcation of the display 130 is only an example, and the display 130 may be subdivided into plural regions (e.g., four or more regions) according to the structure or functionality. For example, in the embodiment of FIG. 1, the area of the display 130 may be subdivided with respect to the folding region 131c or the folding axis (A) extending parallel to the y-axis. However, in another embodiment, the area of the display 130 may be subdivided with respect to a different folding region (e.g., folding region parallel to the x-axis) or a different folding axis (e.g., folding axis parallel to the x-axis). The aforementioned subdivision of the display is only a physical demarcation based on the pair of housing structures 110 and 120 and the hinge structure (e.g., hinge structure 164 in FIG. 3), and the display 130 may substantially present one full screen through the pair of housing structures 110 and 120 and the hinge structure (e.g., hinge structure 164 in FIG. 3). In one embodiment, the first region 131a and the second region 131b may have a symmetrical shape with respect to the folding region 131c. Although the first region 131a may include a notch region (e.g., notch region 133 in FIG. 3) cut according to the presence of the sensor region 131d, the first region 131a may have a symmetrical shape with the second region 131b in other portions. In other words, the first region 131a and the second region 131b may include portions with symmetrical shapes and portions with asymmetrical shapes.

Figure 3:
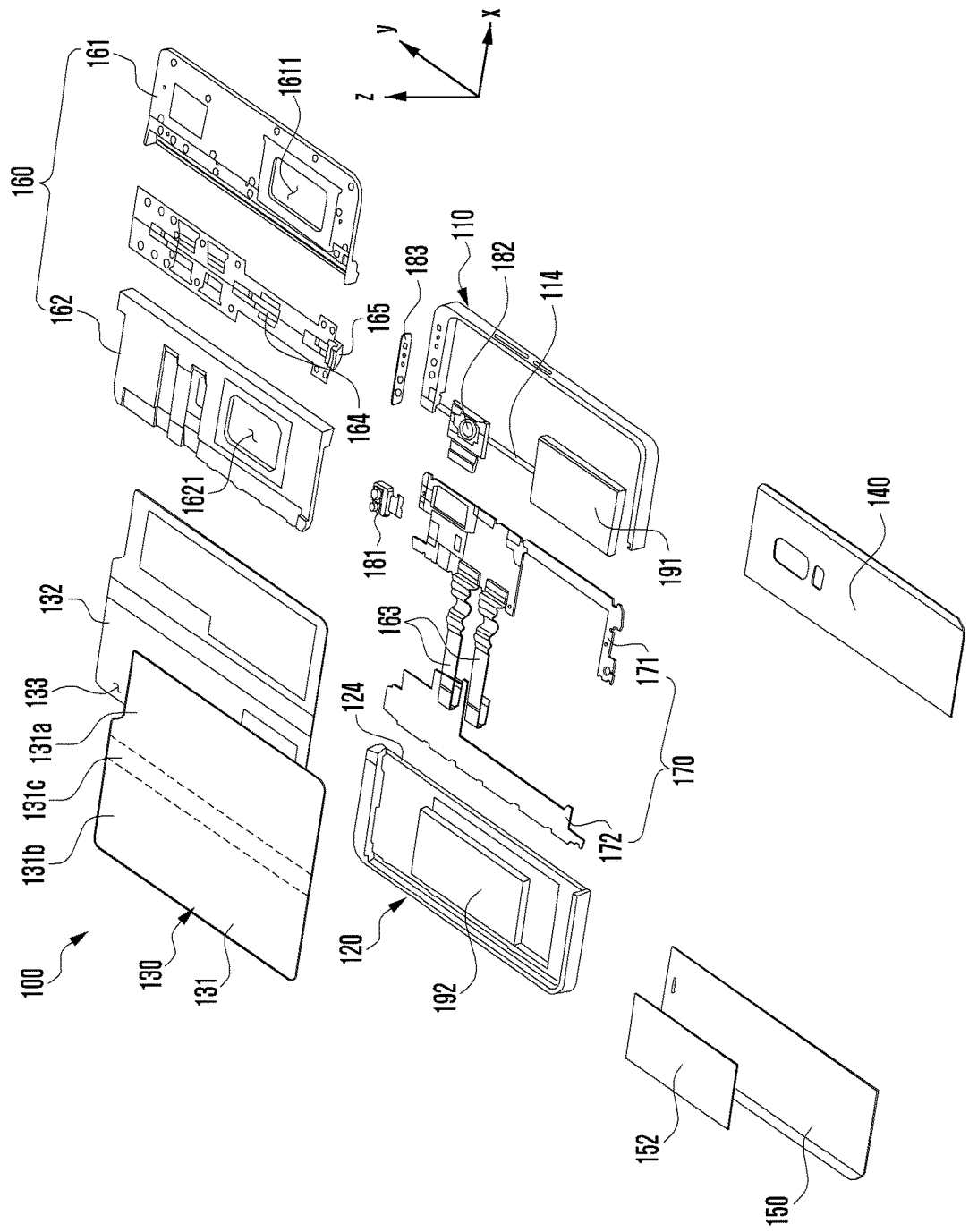
FIG. 3 is an exploded perspective view illustrating an electronic device according to various embodiments of the disclosure.

Referring to FIG. 2, the hinge cover 165 may be disposed between the first housing structure 110 and the second housing structure 120 so as to cover the internal components (e.g., hinge structure 164 in FIG. 3). In one embodiment, the hinge cover 165 may be covered by portions of the first housing structure 110 and the second housing structure 120 or be exposed to the outside according to the operating state (e.g., flat state or folded state) of the electronic device 100.

For example, when the electronic device 100 is in the flat state as illustrated in FIG. 1, the hinge cover 165 may be covered by the first housing structure 110 and the second housing structure 120 so as not to be exposed. When the electronic device 100 is in the folded state (e.g., completely folded state) as illustrated in FIG. 2, the hinge cover 165 may be exposed to the outside between the first housing structure 110 and the second housing structure 120. When the electronic device 100 is in the intermediate state where the first housing structure 110 and the second housing structure 120 make a certain angle, the hinge cover 165 may be partially exposed to the outside between the first housing structure 110 and the second housing structure 120. In this case, the exposed portion may be less than that for the fully folded state. In one embodiment, the hinge cover 165 may include a curved surface.

Next, a description is given of configurations of the first housing structure 110 and the second housing structure 120 and regions of the display 130 according to the operating state (e.g. flat state or folded state) of the electronic device 100.

In one embodiment, when the electronic device 100 is in the flat state (e.g., state of FIG. 1), the first housing structure 110 and the second housing structure 120 may make an angle of 180 degrees, and the first region 131*a* and the second region 131*b* of the display may be disposed to face in the same direction. In addition, the folding region 131*c* may be coplanar with the first region 131*a* and the second region 131*b*.

In one embodiment, when the electronic device 100 is in the folded state (e.g., state of FIG. 2), the first housing structure 110 and the second housing structure 120 may be disposed to face each other. The first region 131*a* and the second region 131*b* of the display 130 may face each other, making a narrow angle (e.g., between 0 degrees and 10 degrees). At least a portion of the folding region 131*c* may form a curved surface with a preset curvature.

In one embodiment, when the electronic device 100 is in the intermediate state, the first housing structure 110 and the second housing structure 120 may be disposed to make a certain angle. The first region 131*a* and the second region 131*b* of the display 130 may form an angle greater than that for the folded state and less than that for the flat state. At least a portion of the folding region 131*c* may form a curved surface with a preset curvature. This curvature may be less than that for the folded state.

FIG. 3 is an exploded perspective view of an electronic device according to an embodiment of the disclosure.

Referring to FIG. 3, in one embodiment, the electronic device 100 may include a display 130, a support member assembly 160, at least one printed circuit board 170, a first housing structure 110, a second housing structure 120, a first rear cover 140, and a second rear cover 150. In the description, the display 130 may be referred to as a display unit, display module, or display assembly.

The display 130 may include a display panel 131 (e.g., flexible display panel), and at least one plate 132 or layer on which the display panel 131 is seated. In one embodiment, one or more plates 132 may include a conductive plate (e.g., Cu sheet or SUS sheet) disposed between the display panel 131 and the support member assembly 160. According to one embodiment, the conductive plate may be formed to have substantially the same area as that of the display, and an area facing a folding area of the display may be formed to be bendable. The plate 132 may include at least one subsidiary material layer (e.g., graphite member) disposed at a rear surface of the display panel 131. In one embodiment, the plate 132 may be formed in a shape corresponding to the display panel 131. For example, a partial area of the first plate 132 may be formed in a shape corresponding to the notch area 133 of the display panel 131.

The support member assembly 160 may include a first support member 161, a second support member 162, a hinge structure 164 disposed between the first support member 161 and the second support member 162, a hinge cover 165 to cover the hinge structure 164 when viewed from the outside, and a wiring member 163 (e.g., flexible printed circuit board (FPCB)) that crosses the first support member 161 and the second support member 162.

In one embodiment, the support member assembly 160 may be disposed between the plate 132 and at least one printed circuit board 170. For example, the first support member 161 may be disposed between the first region 131*a* of the display 130 and the first printed circuit board 171. The second support member 162 may be disposed between the second region 131*b* of the display 130 and the second printed circuit board 172.

In one embodiment, at least a portion of the wiring member 163 and the hinge structure 164 may be disposed within the support member assembly 160. The wiring member 163 may be disposed in a direction crossing the first support member 161 and the second support member 162 (e.g., x-axis direction). The wiring member 163 may be disposed in a direction (e.g., x-axis direction) perpendicular to the folding axis (e.g., y-axis or folding axis (A) in FIG. 2) of the folding region 131*c*.

The at least one printed circuit board 170 may include, as described above, the first printed circuit board 171 disposed on the side of the first support member 161, and the second printed circuit board 172 disposed on the side of the second support member 162. The first printed circuit board 171 and the second printed circuit board 172 may be disposed inside the space formed by the support member assembly 160, the first housing structure 110, the second housing structure 120, the first rear cover 140, and the second rear cover 150. Various components for implementing functions of the electronic device 100 may be mounted on the first printed circuit board 171 and the second printed circuit board 172.

In an embodiment, a first space of the first housing structure 110 may include a first printed circuit board 171 disposed in a space formed through the first support member 161, a first battery 191 disposed at a position facing a first swelling hole 1611 of the first support member 161, at least one sensor module 181, or at least one camera module 182. The first housing structure 110 may include a window glass 183 disposed to protect at least one sensor module 181 and at least one camera module 182 at a position corresponding to the notch area 133 of the display 130. In one embodiment, the second space of the second housing structure 120 may include a second printed circuit board 172 disposed in a second space formed through the second support member 162 and a second battery 192 disposed at a position facing the second swelling hole 1621 of the second support member 162. According to one embodiment, the first housing structure 110 and the first support member 161 may be integrally formed. According to one embodiment, the second housing structure 120 and the second support member 162 may also be integrally formed. According to an embodiment, a sub display 152 may be disposed in the second space of the second housing structure 120. According to an embodiment, the sub display 152 (e.g., the second display) may be disposed to be visible from the outside through at least a partial area of the second rear cover 150.

In one embodiment, the first housing structure 110 may include a first rotary support surface 114, and the second housing structure 120 may include a second rotary support surface 124 corresponding to the first rotary support surface 114. The first rotary support surface 114 and the second rotary support surface 124 may include a curved surface corresponding to the curved surface included in the hinge cover 165.

In one embodiment, when the electronic device 100 is in the flat state (e.g., state of FIG. 1), the first rotary support surface 114 and the second rotary support surface 124 may cover the hinge cover 165 so that the hinge cover 165 may be not or minimally exposed to the rear surface of the electronic device 100. When the electronic device 100 is in the folded state (e.g., state of FIG. 2), the first rotary support surface 114 and the second rotary support surface 124 may rotate along the curved surface included in the hinge cover 165 so that the hinge cover 165 may be maximally exposed to the rear surface of the electronic device 100.

Figure 4A:
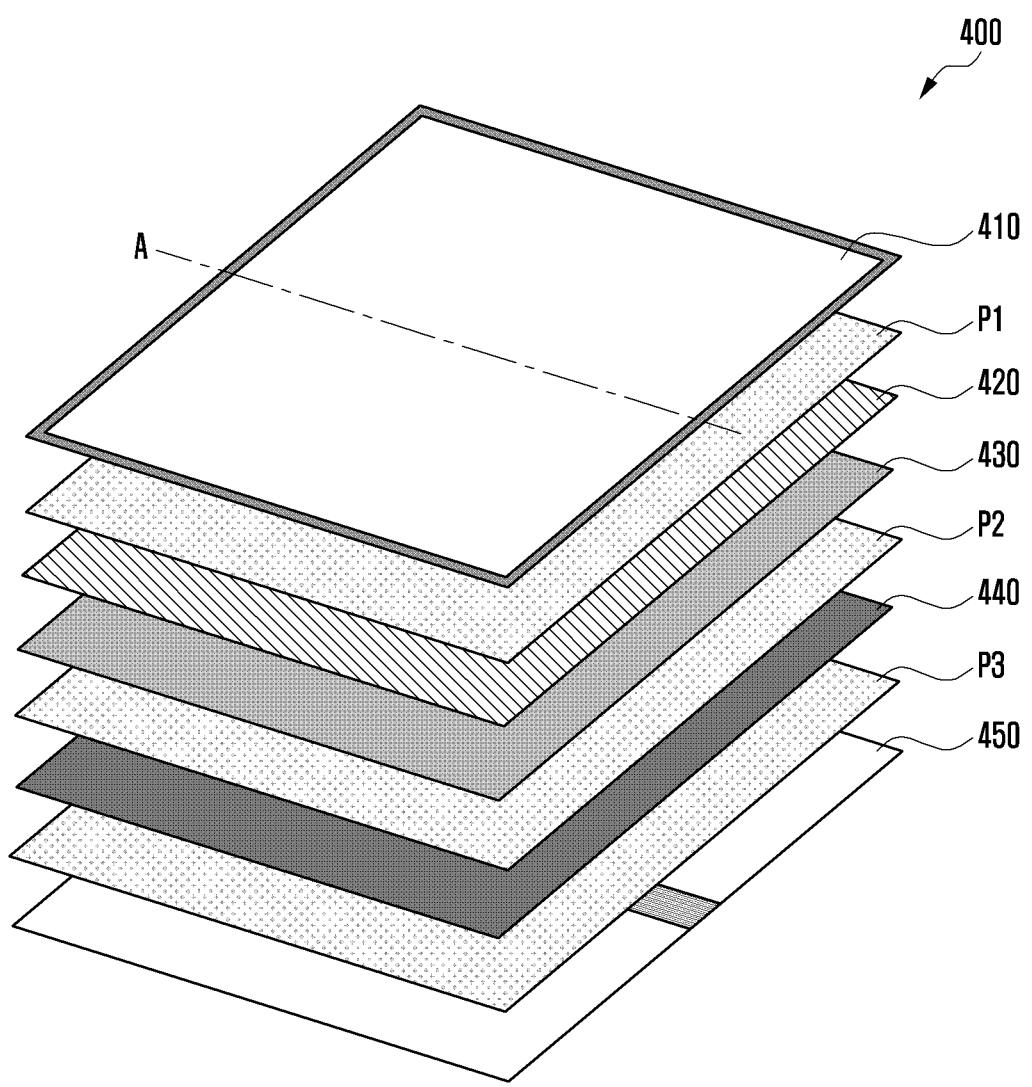
FIG. 4A is an exploded perspective view illustrating a stacking structure of a display according to various embodiments of the disclosure.
Figure 4B:
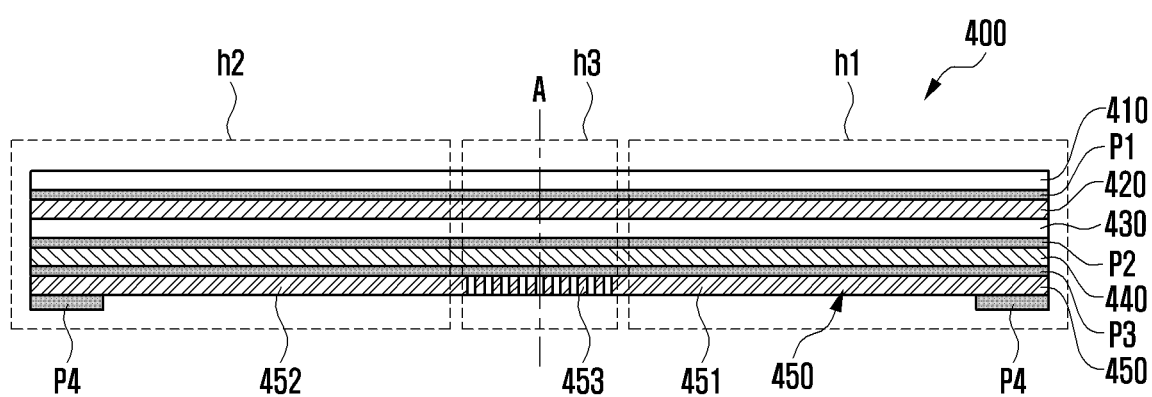
FIG. 4B is a cross-sectional view illustrating a stacking structure of a display according to various embodiments of the disclosure.

FIG. 4A is an exploded perspective view illustrating a stacking structure of a display 400 according to various embodiments of the disclosure. FIG. 4B is a cross-sectional view illustrating a stacking structure of the display 400 according to various embodiments of the disclosure.

The display 400 of FIGS. 4A and 4B may be at least partially similar to the display 130 of FIG. 3 or may further include other components of the display.

With reference to FIGS. 4A and 4B, the display 400 may include a window 410 (e.g., polyimide (PI) film, ultra thin glass (UTG)), a polarizer (POL) 420 (e.g., polarizing film), a display panel 430, a polymer member 440, and a conductive plate 450 sequentially disposed at a rear surface of the window 410. According to an embodiment, the window 410, the POL 420, the display panel 430, the polymer member 440, and the conductive plate 450 may be disposed to cross at least a portion of a first surface (e.g., the first surface 111 of FIG. 1) of a first housing structure (e.g., the first housing structure 110 of FIG. 1) and a third surface (e.g., the third surface 121 of FIG. 1) of a second housing structure (e.g., the second housing structure 120 of FIG. 1). According to an embodiment, a first area h1, which is a flat area corresponding to the first housing structure 110 of the electronic device (e.g., the electronic device 100 of FIG. 1) and a second area h2, which is a flat area corresponding to the second housing structure 120 may be configured to fold or unfold based on a third area h3 facing a hinge structure (e.g., the hinge structure 164 of FIG. 3) and including at least partially folding area. According to an embodiment, the POL 420, the display panel 430, the polymer member 440, and the conductive plate 450 may be attached to each other through adhesive members P1, P2, and P3. For example, the adhesive members P1, P2, and P3 may include at least one of an optical clear adhesive (OCA), a pressure sensitive adhesive (PSA), a thermally reactive adhesive, a general adhesive, or a double-sided tape. According to an embodiment, the display 400 may include another adhesive member P4 (e.g., double-sided tape or waterproof member) disposed along an edge at one surface of the conductive plate 450. According to an embodiment, the display 400 may be attached to a support member assembly (e.g., the support member assembly 160 of FIG. 3) of the electronic device (e.g., the electronic device 100 of FIG. 3) through another adhesive member P4.

According to various embodiments, the polymer member 440 may be applied with a dark color (e.g., black) to help implement a background when the display is turned off According to an embodiment, the polymer member 440 may operate as a cushion to absorb an impact from the outside of the electronic device to prevent damage of the display 400. According to one embodiment, the conductive plate 450 may be formed in the form of a metal sheet, which may help reinforce rigidity of the electronic device, shield ambient noise, and be used for dissipating a heat emitted from neighboring heat dissipating components. According to an embodiment, the conductive plate 450 may include at least one of Cu, Al, SUS, or CLAD (e.g., a stacking member in which SUS and Al are alternately disposed). In another embodiment, the conductive plate 450 may include other alloy materials.

According to various embodiments, the display 400 may include at least one functional member disposed between the polymer member 440 and the conductive plate 450. According to one embodiment, the functional member may include a graphite sheet for heat dissipation, an added display, a force touch flexible printed circuit board (FPCB), a fingerprint sensor FPCB, a communication antenna radiator, a heat dissipation sheet, a conductive/non-conductive tape, or an open cell sponge. According to an embodiment, when the functional member is bendable, the functional member may be disposed from a first housing structure (e.g., the first housing structure 110 of FIG. 3) to at least a portion of a second housing structure (e.g., the second housing structure 120 of FIG. 3) through a hinge structure (e.g., the hinge structure 164 of FIG. 3). In another embodiment, the display 400 may further include a detection member for detecting an input by a writing member of an electromagnetic induction method. According to an embodiment, the detecting member may include a digitizer.

Figure 4C:
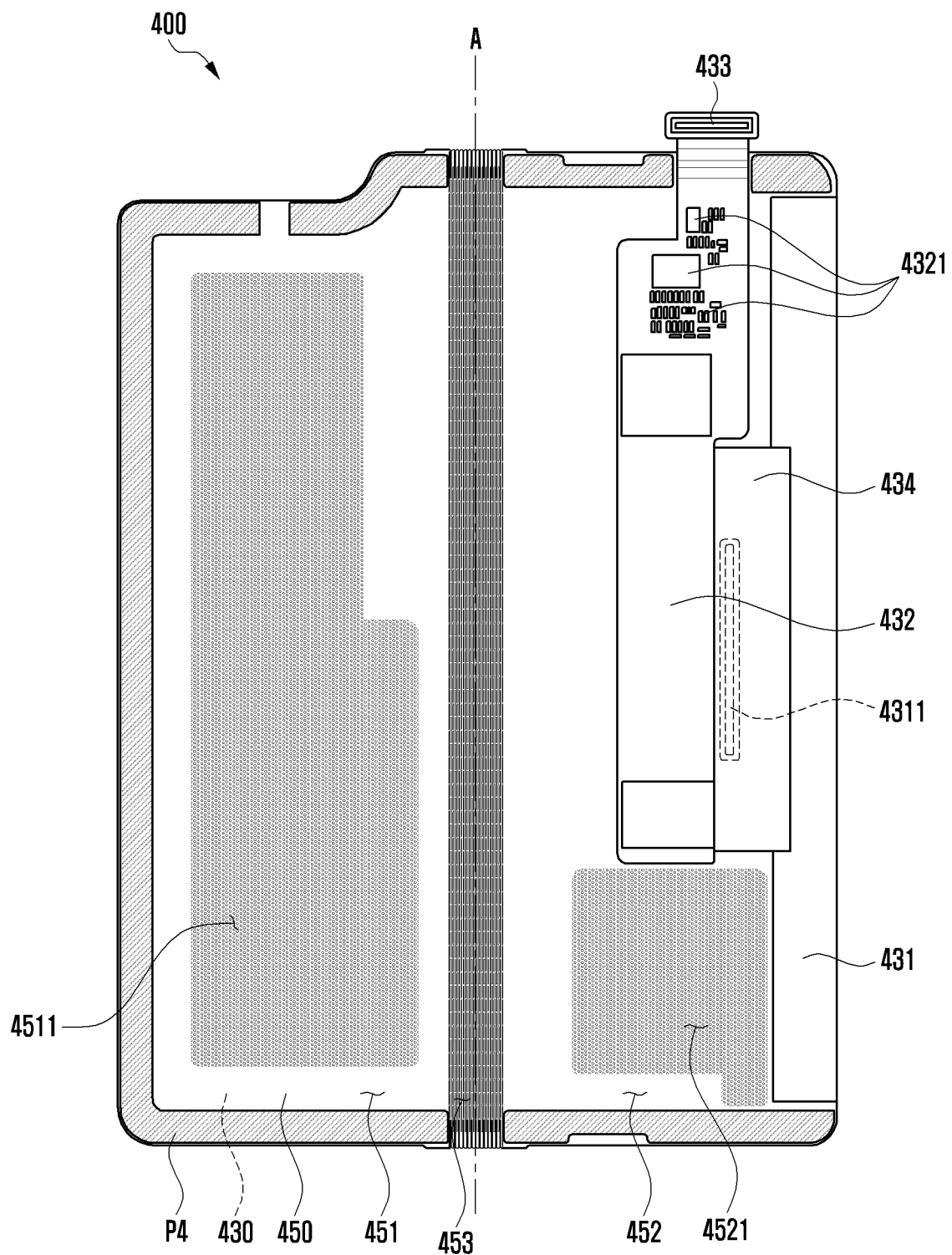
FIG. 4C is a diagram illustrating a rear surface of a display according to various embodiments of the disclosure.

FIG. 4C is a diagram illustrating a rear surface of the display 400 according to various embodiments of the disclosure.

With reference to FIG. 4C, the display 400 may include an extension portion 431 disposed in a folding manner from the display panel 430 to at least a partial area of a rear surface thereof. According to one embodiment, the display 400 may include a connection pad 434 electrically connected to the extension portion 431 and having an electrical wiring structure including a control circuit 4311 and a flexible printed circuit board (FPCB) 432 electrically connected to the connection pad 434. According to an embodiment, the control circuit 4311 may include a display driver IC (DDI) or a touch display driver IC (TDDI) mounted in the connection pad 434 having an electrical wiring structure. According to an embodiment, the connection pad 434 may include a separate FPCB or film including a control circuit 4311 disposed in a chip on film (COF) manner. In another embodiment, the control circuit 4311 may have a chip on panel (COP) structure directly mounted in the extension portion 431 without the connection pad 434. According to an embodiment, the FPCB 432 may include an electrical connector 433 that may be mounted with a plurality of elements 4321 and electrically connected to a second printed circuit board (e.g., the second printed circuit board 172 of FIG. 3) of the electronic device (e.g., the electronic device 100 of FIG. 3). According to an embodiment, the plurality of elements 4321 may include a passive element such as a touch IC, a display flash memory, an ESD protection diode, a pressure sensor, or a decap. In another embodiment, when the extension portion 431, the connection pad 434, and the FPCB 432 are disposed in an area facing the first housing structure (e.g., the first housing structure 110 of FIG. 1) of the display 400, the electrical connector 433 may be electrically connected to a first printed circuit board (e.g., the first printed circuit board 171 of FIG. 3) of the electronic device (e.g., the electronic device 100 of FIG. 1).

According to various embodiments, the display 400 may include a conductive plate 450 having substantially the same size and shape as those of the display panel 430. According to an embodiment, the conductive plate 450 may include a first flat portion 451 facing a first area (e.g., the first area h1 of FIG. 4B) of the display 400, a second flat portion 452 facing a second area (e.g., a second area h2 of FIG. 4B) of the display 400, and a flexible portion 453 facing a third area (e.g., a third area h3 of FIG. 4B) of the display 400. According to one embodiment, in the conductive plate 450, the first flat portion 451, the second flat portion 452, and the flexible portion 453 may be formed integrally. According to an embodiment, the conductive plate 450 may be attached to a rear surface of the polymer member (e.g., the polymer member 440 of FIG. 4B) through the adhesive member (e.g., an adhesive member P3 of FIG. 4B) so as to be folded or unfolded together with the display panel 430 through at least a portion of the flexible portion 453. Accordingly, when a pair of conductive plates are dividedly disposed based on the third area h3, a folded mark of the display panel generated by boundary edges of the conductive plates may be prevented by receiving the support of the flexible portion 453 of the exemplary integrated conductive plate 450 of the disclosure.

Hereinafter, a configuration of the conductive plate 450 will be described in detail.

Figure 5:
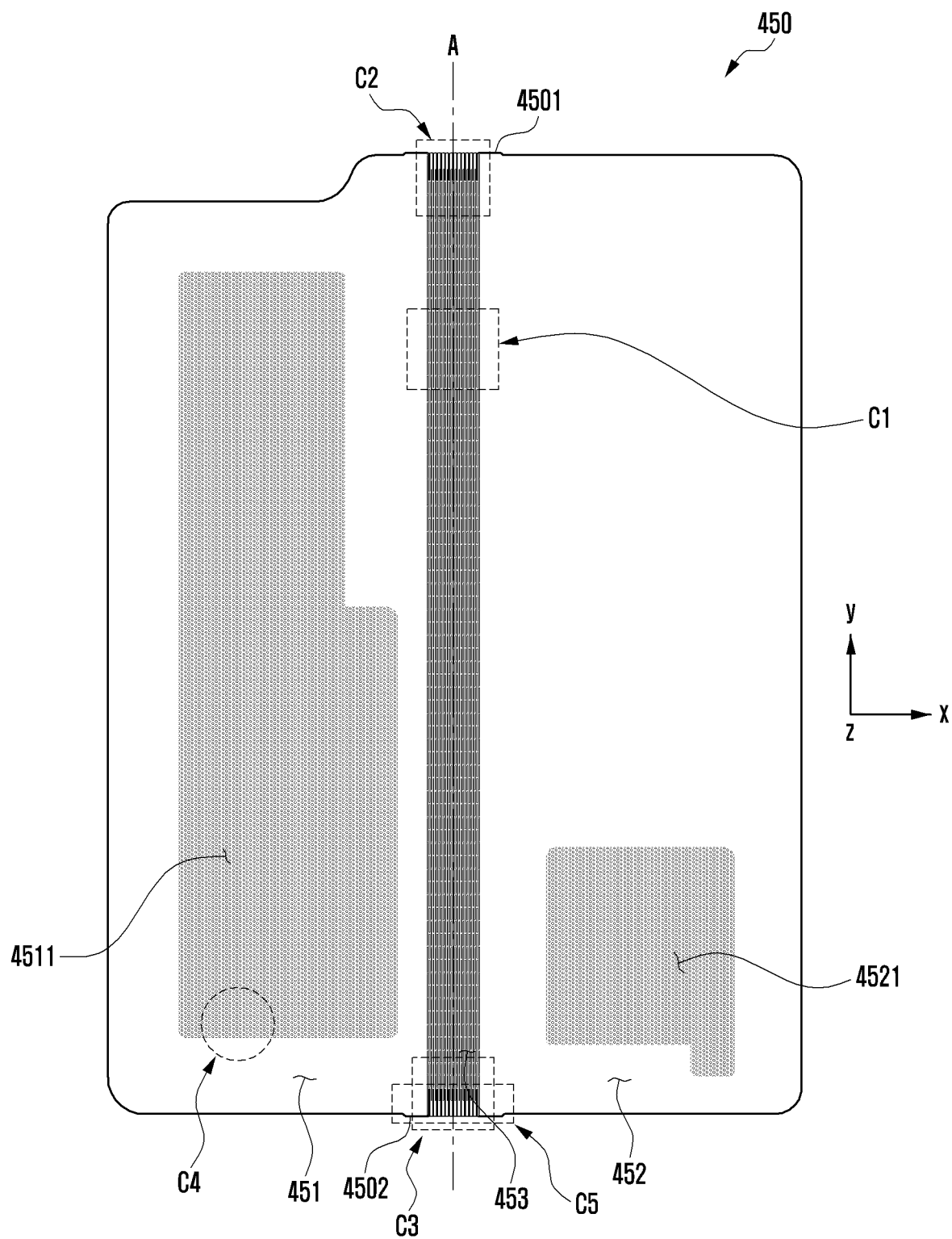
FIG. 5 is a diagram illustrating a conductive plate according to various embodiments of the disclosure.

FIG. 5 is a diagram illustrating a conductive plate 450 according to various embodiments of the disclosure.

With reference to FIG. 5, the conductive plate 450 may include a first flat portion 451 facing the first area (e.g., the first area h1 of FIG. 4B) of the display (e.g., the display 400 of FIG. 4B), a second flat portion 452 facing the second area (e.g., the second area h2 of FIG. 4B) of the display 400, and a flexible portion 453 facing the three area h3 (e.g., the three area h3 of FIG. 4B) of the display 400. According to an embodiment, the conductive plate 450 may include lightweight areas 4511 and 4521 disposed in at least some areas of the first flat portion 451 and the second flat portion 452. According to an embodiment, the lightweight areas 4511 and 4521 may be configured through a plurality of holes (e.g., holes 4512 of FIG. 6D) spaced apart from each other. In another embodiment, the lightweight areas 4511 and 4521 may be configured through one relatively large hole.

According to various embodiments, the conductive plate 450 may be folded together with the display (e.g., the display 400 of FIG. 4B) through at least a portion of the flexible portion 453. According to an embodiment, when bending occurs in the third area h3 of the display 400, at least a portion of the flexible portion 453 may be disposed to support the rear surface of the display panel (e.g., the display panel 430 of FIG. 4B). In another embodiment, the third area h3 may correspond only to at least a portion of the flexible portion 453. In this case, at least a portion of the flexible portion 453 may be applied as an attachment area flatly attached to the housing structures; thus, at least the portion may not be deformed when the display is bent.

FIGS. 6A to 6E are enlarged views illustrating various portions of FIG. 5.

Figure 6A:
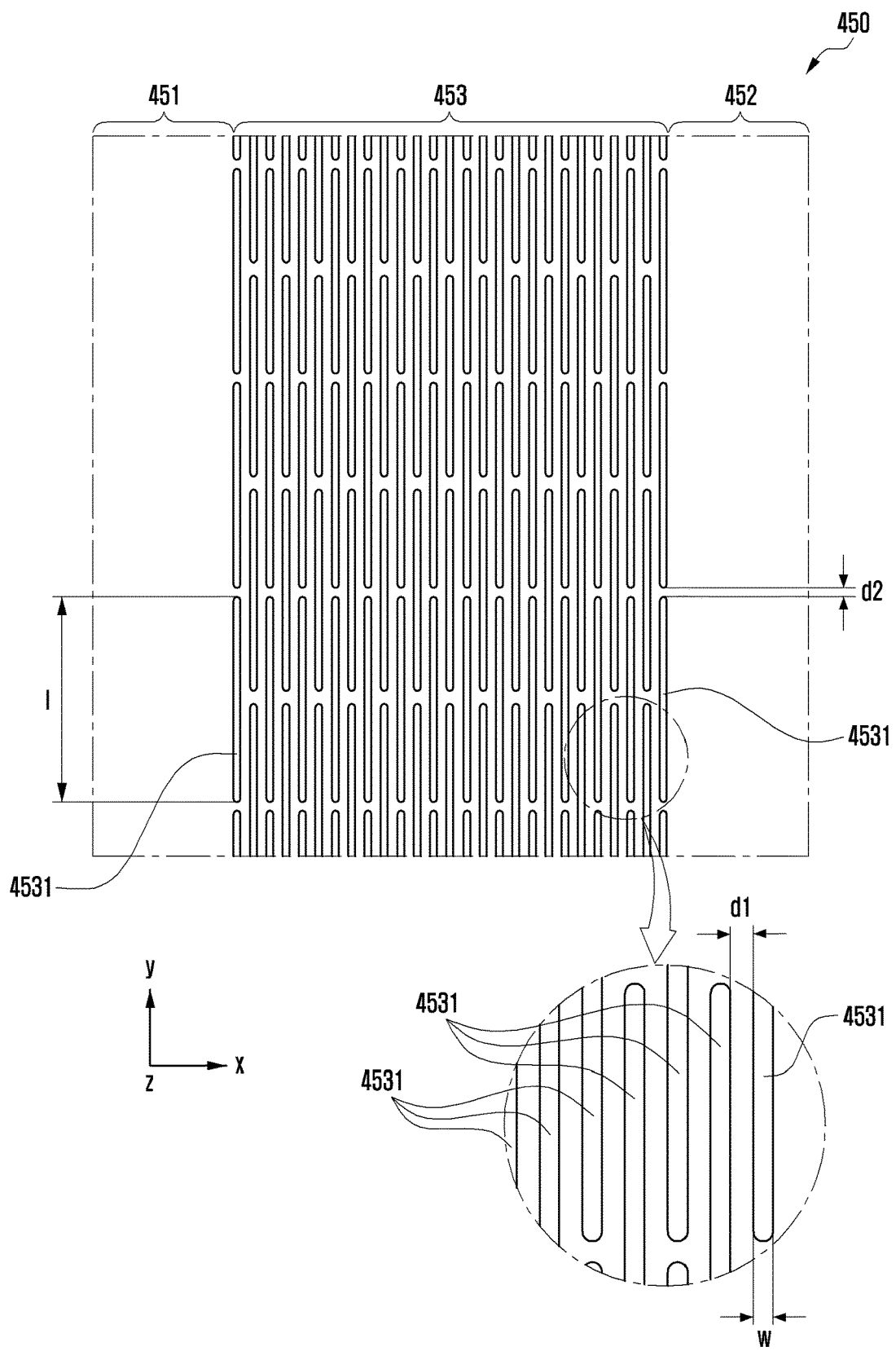
FIG. 6A is an enlarged view illustrating an area C1 of FIG. 5 according to various embodiments of the disclosure.

FIG. 6A is an enlarged view illustrating an area C1 of FIG. 5 according to various embodiments of the disclosure, and although FIG. 6A is an enlarged view of a partial area (e.g., the area C1) of the flexible portion 453 of the conductive plate 450, the partial area may be formed in substantially the entire area of the flexible portion 453.

With reference to FIG. 6A, the flexible portion 453 may include a pattern. According to one embodiment, the pattern may include a plurality of openings 4531 spaced apart from each other. In some embodiments, the plurality of openings 4531 may be replaced with a plurality of recesses. According to an embodiment, the plurality of openings 4531 may be formed in an elliptical shape of a long hole in a first direction (e.g., y-axis direction) of the flexible portion 453. According to an exemplary embodiment, the plurality of openings 4531 may be alternately disposed to coincide with each other in the second direction (e.g., x-axis direction) of the flexible portion 453. According to an embodiment, the plurality of openings 4531 may be disposed at regular or irregular intervals in the first direction (e.g., y-axis direction) and/or the second direction (e.g., x-axis direction). According to an embodiment, the plurality of openings 4531 may be formed in the same shape or different shapes. According to an embodiment, the flexible portion 453 may exhibit an elastic force to restore to an original state after being deformed through a punch lattice structure (lattice structure, slit structure, or opening structure) by the plurality of openings 4531, and such an elastic force may contribute to providing flexibility of the flexible portion.

According to various embodiments, flexibility of the flexible portion 453 may be determined through a gap, a shape, or a disposition density between the plurality of openings 4531. For example, flexibility of the flexible portion 453 may be determined by a length l of a unit opening. According to an embodiment, flexibility of the flexible portion 453 may be determined by a width w of the unit opening. According to an embodiment, flexibility of the flexible portion 453 may be determined through a first gap d1 between the openings 4531 formed in the second direction (e.g., x-axis direction). According to an embodiment, flexibility of the flexible portion 453 may be determined through a second gap d2 between the openings 4531 formed in the first direction (e.g., y-axis direction). As will be described later, flexibility of the flexible portion 453 may be determined through a disposition density between the plurality of openings 4531 disposed in the first direction (e.g., y-axis direction) and/or the second direction (e.g., x-axis direction).

Figure 6B:
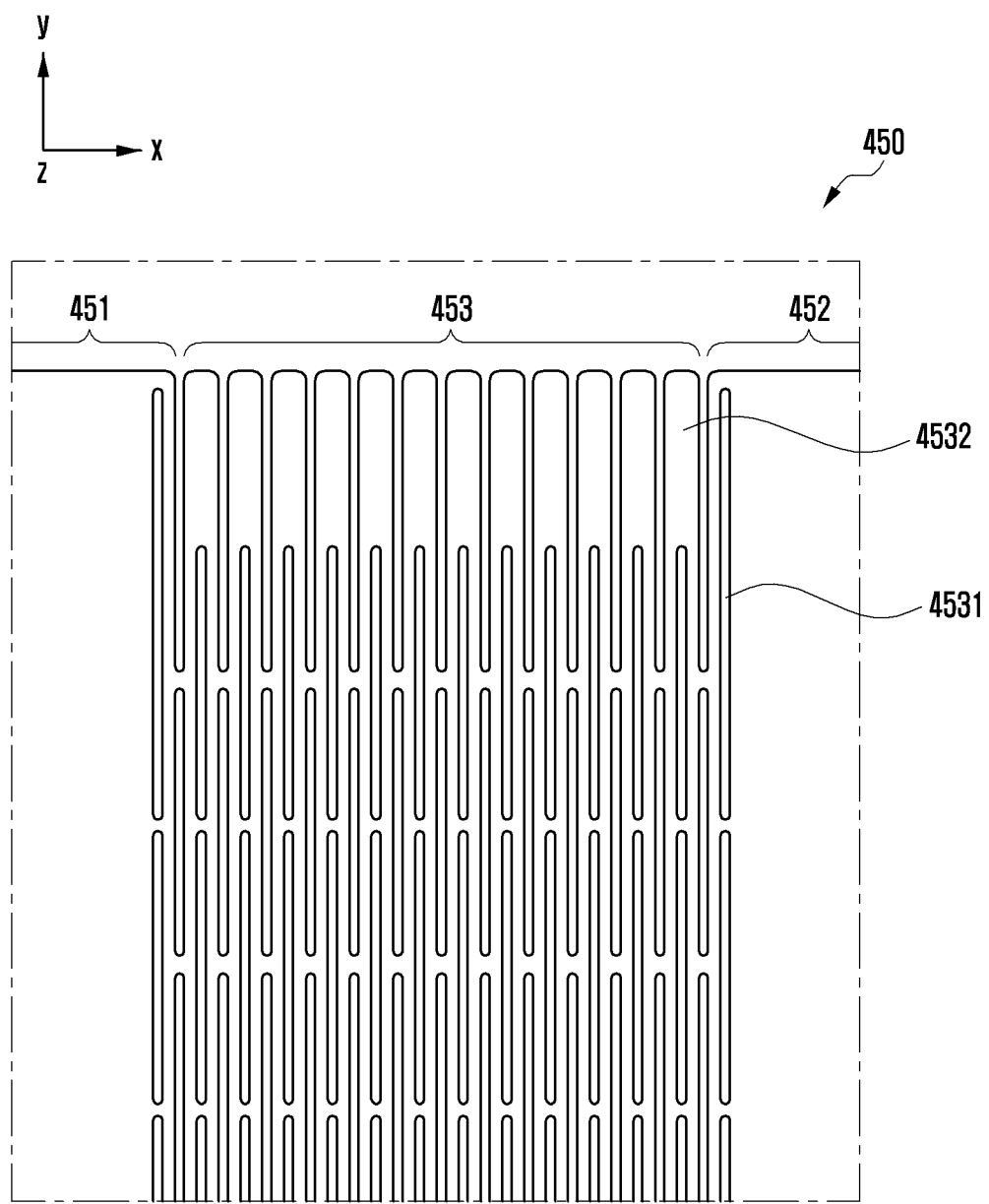
FIG. 6B is an enlarged view illustrating an area C2 of FIG. 5 according to various embodiments of the disclosure.
Figure 6C:
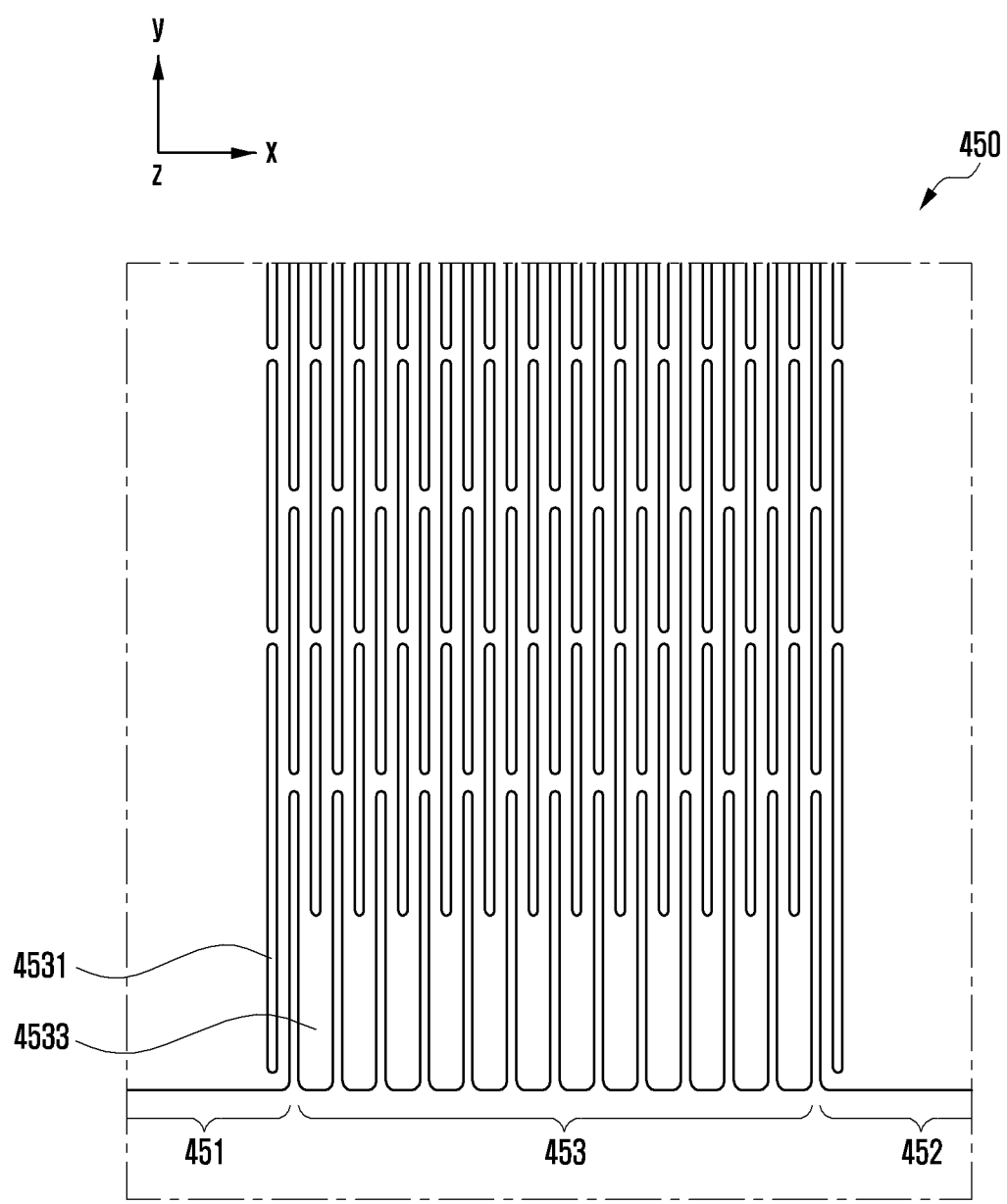
FIG. 6C is an enlarged view illustrating an area C3 of FIG. 5 according to various embodiments of the disclosure.

FIG. 6B is an enlarged view illustrating an area C2 of FIG. 5 according to various embodiments of the disclosure. FIG. 6C is an enlarged view illustrating an area C3 of FIG. 5 according to various embodiments of the disclosure.

With reference to FIGS. 6B and 6C, the conductive plate 450 may include rigid reinforcement parts 4532 and 4533 having reinforced rigidity formed at upper and lower ends of the flexible portion 453. According to one embodiment, the rigid reinforcement portion 4532 disposed at the upper end of the flexible portion 453 and the rigid reinforcement portion 4533 disposed at the lower end of the flexible portion 453 may support an upper end area and a lower end area of the third area (e.g., the third area h3 of FIG. 4B) in which fatigue may accumulate relatively largely according to a frequent folding operation of the display (e.g., the display 400 of FIG. 4B). According to one embodiment, the rigid reinforcement portions 4532 and 4533 may include relatively wide non-perforated areas formed by omitting at least a portion of the plurality of openings 4531 disposed in the second direction (e.g., x-axis direction) in the upper end portion and the lower end portion of the flexible portion 453.

Figure 6D:
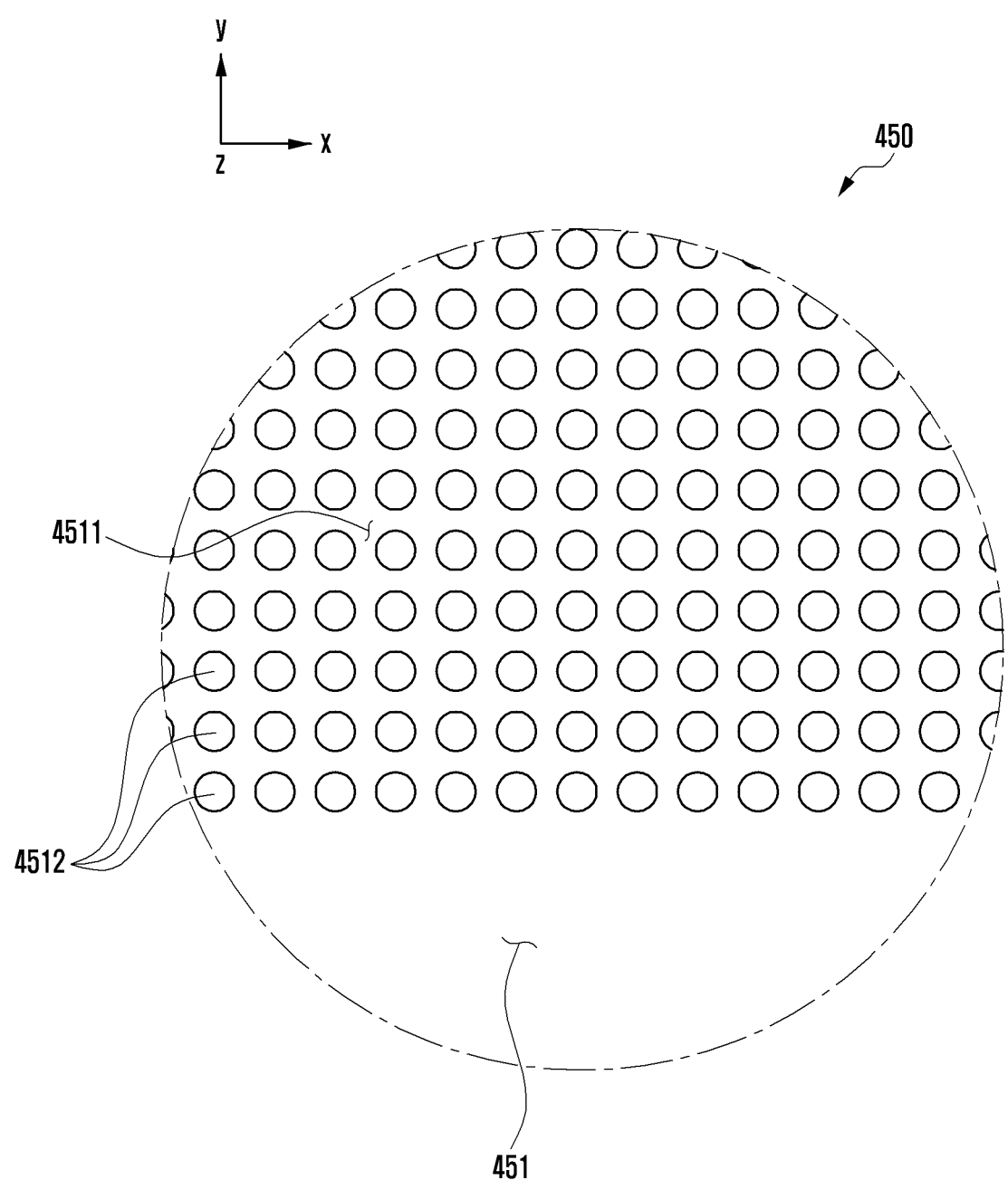
FIG. 6D is an enlarged view illustrating an area C4 of FIG. 5 according to various embodiments of the disclosure.

FIG. 6D is an enlarged view illustrating the area C4 of FIG. 5 according to various embodiments of the disclosure. For lightweight of the electronic device, the conductive plate may include a lightweight area 4511 formed in at least a partial area. According to an embodiment, the lightweight area 4511 may include a plurality of holes 4512 that may be formed in a first flat portion (e.g., the first flat portion 451 of FIG. 5) and/or a second flat portion (e.g., the second flat portion 452 of FIG. 5) and spaced apart from each other at predetermined intervals. According to one embodiment, the plurality of holes 4512 may be formed in a circle. In another embodiment, the plurality of holes 4512 may be formed in various shapes such as an ellipse, a square, or a polygon instead of a circle. In another embodiment, the lightweight area 4511 (or the lightweight area 4521) may include a plurality of recesses formed in a predetermined depth and in which the conductive plate is perforated. In this case, a lightweight level of the conductive plate may be determined according to a shape, depth, or size of the recess. According to one embodiment, a size or a shape of the lightweight area 4511 may be determined under the condition that does not impair an original function such as a rigid reinforcement function, a heat radiation function, and/or a noise shielding function of the conductive plate 450.

Figure 6E:
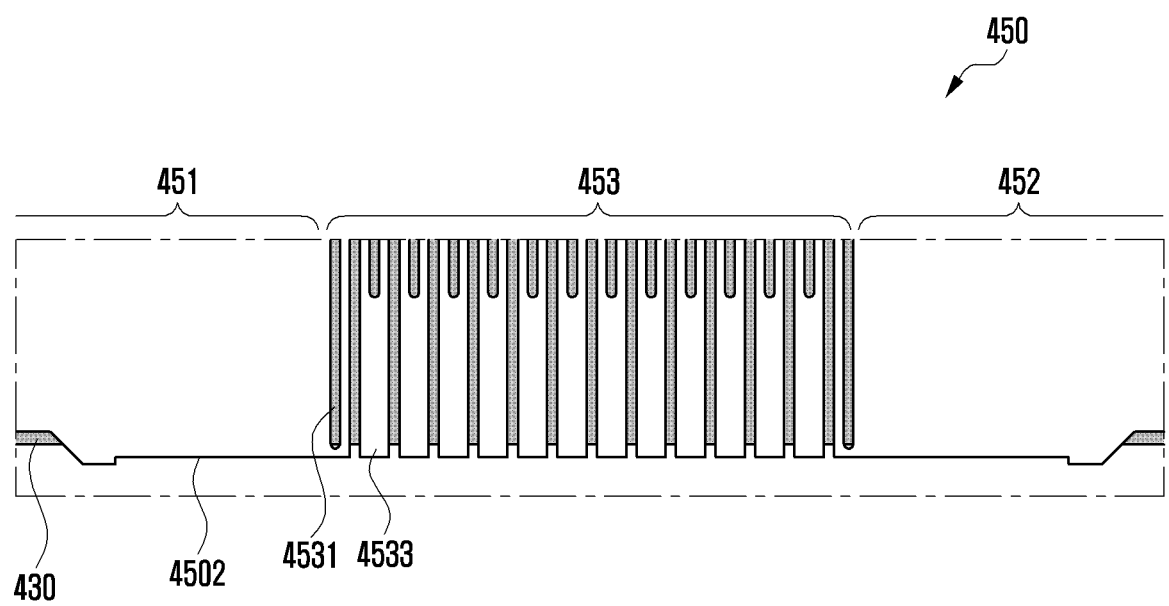
FIG. 6E is an enlarged view illustrating an area C5 of FIG. 5 according to various embodiments of the disclosure.

FIG. 6E is an enlarged view illustrating the area C5 of FIG. 5 according to various embodiments of the disclosure, and the conductive plate 450 may include a support piece 4502 protruded along an edge of the flexible portion 453 in a length including at least the flexible portion 453 in order to support a lower end portion in a third area (e.g., the third area h3 of FIG. 4B) of the display (e.g., the display 400 of FIG. 4B). In another embodiment, the conductive plate 450 may include a support piece (e.g., the support piece 4501 of FIG. 5) formed in the same manner in order to support an upper end portion of the third area (e.g., the third area h3 of FIG. 4B) of the display (e.g., the display 400 of FIG. 4B). According to one embodiment, the support pieces 4501 and 4502 may be formed in a size protruded further than edges of the upper end portion and the lower end portion of the display panel 430 in the flexible portion 453 when viewed from above the display (e.g., the display 400 of FIG. 4B). In another embodiment, the support piece 4502 may be the same as the display panel 430. According to one embodiment, the support pieces 4501 and 4502 include a flexible portion 453 and may be extended to at least a portion of the first flat portion 451 and/or at least a portion of the second flat portion 452. In another embodiment, the support pieces 4501 and 4502 may be extended to the entire edge of the first flat portion 451 and/or the entire edge of the second flat portion 452.

FIGS. 7A to 7E are diagrams illustrating various modifications of the area C2 of FIG. 5 according to various embodiments of the disclosure. In FIGS. 7A to 7E, although a modified disposition structure of the opening 4531 for rigidity reinforcement of the upper end portion of the conductive plate 450 is illustrated and described, a rigid reinforcement structure of the lower end portion of the conductive plate 450 may also have substantially the same configuration.

Figure 7A:
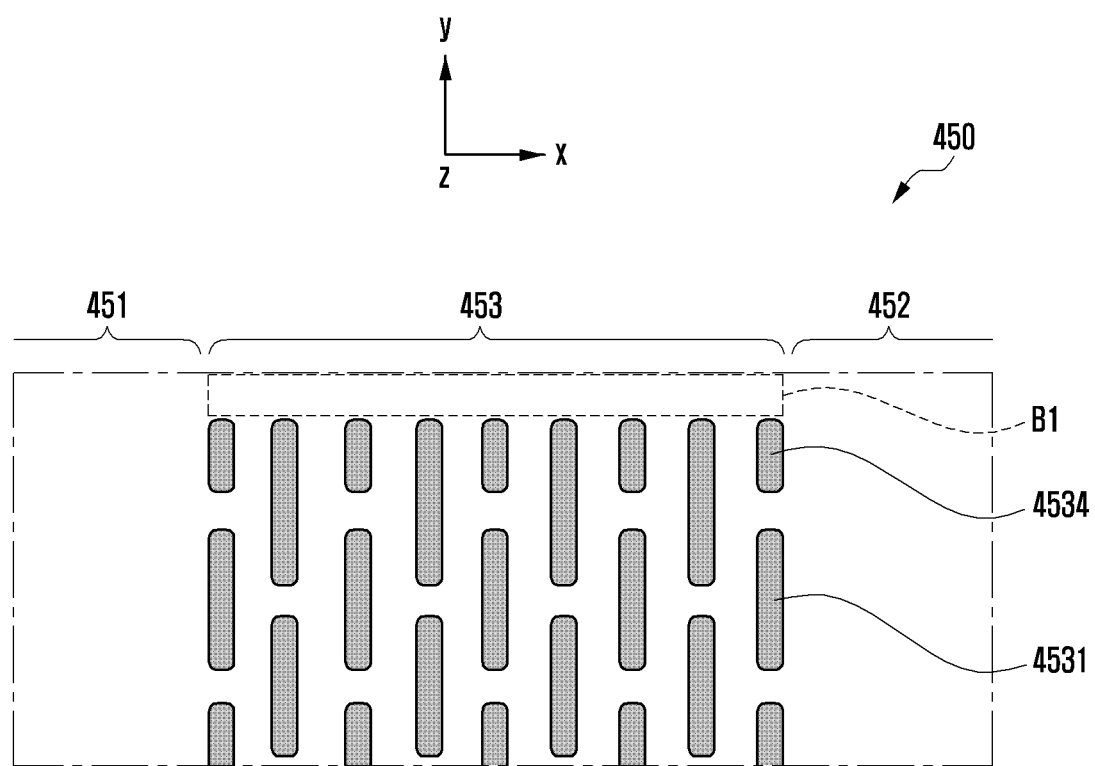
FIGS. 7A to 7E are diagrams illustrating various modifications of the area C2 of FIG. 5 according to various embodiments of the disclosure.

With reference to FIG. 7A, for rigidity reinforcement of the upper end portion of the conductive plate 450, the upper end area of the flexible portion 453 may include a rigid reinforcement portion (portion B1) formed so that no opening exists through modified openings 4534 in which some of openings 4531 are removed or by omitting all openings 4531 in the second direction (e.g., x-axis direction).

Figure 7B:
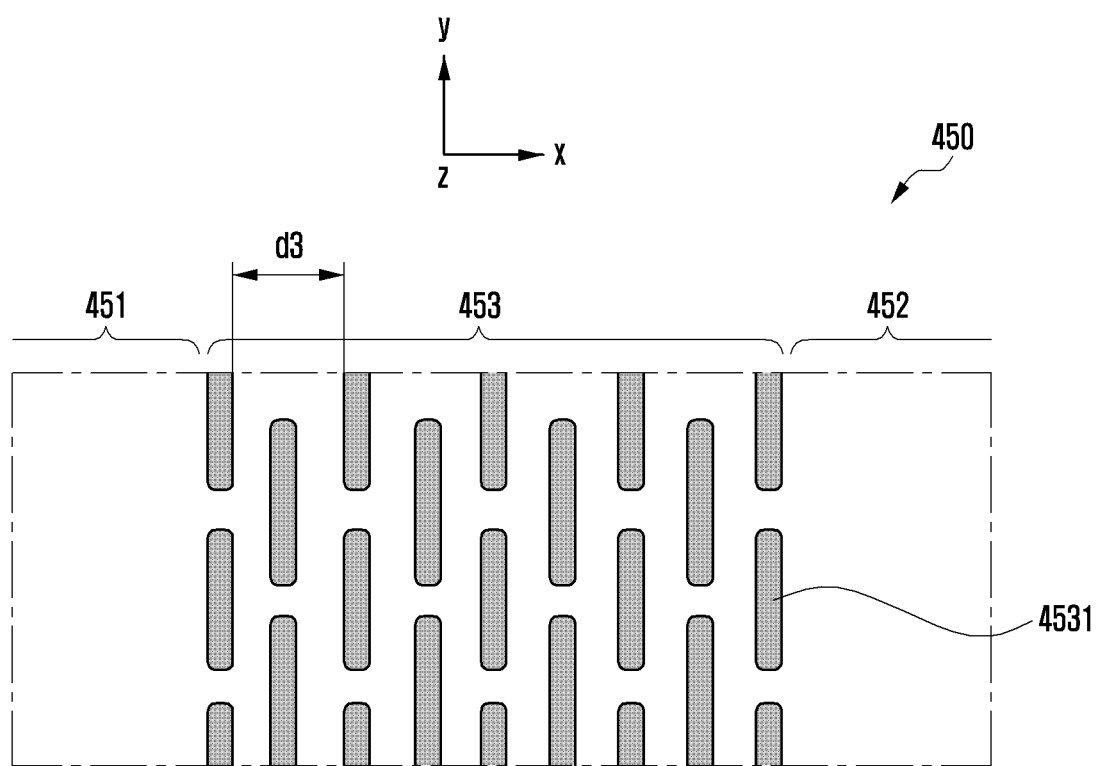

With reference to FIG. 7B, for rigidity reinforcement of the upper end portion of the conductive plate 450, the upper end area of the flexible portion 453 may be formed to have a third interval d3 wider than that of the periphery by disposing to alternately omit one opening 4531 in the second direction (e.g., x-axis direction) of the flexible portion 453.

Figure 7C:
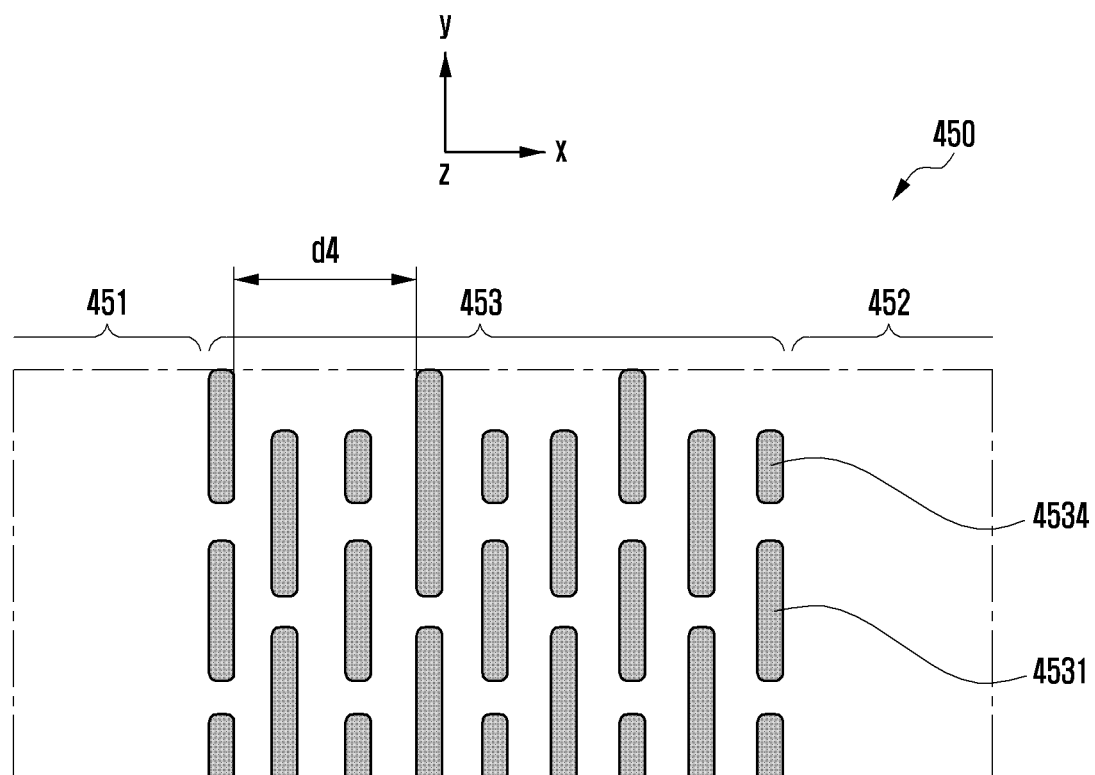

With reference to FIG. 7C, for rigidity reinforcement of the upper end portion of the conductive plate 450, the upper end area of the flexible portion 453 may be formed to have a fourth interval d4 wider than that of the periphery through modified openings 4534 in which a portion of the opening 4531 is removed or by disposing to alternately omit two openings 4531 in the second direction (e.g., x-axis direction) of the flexible portion 453.

Figure 7D:
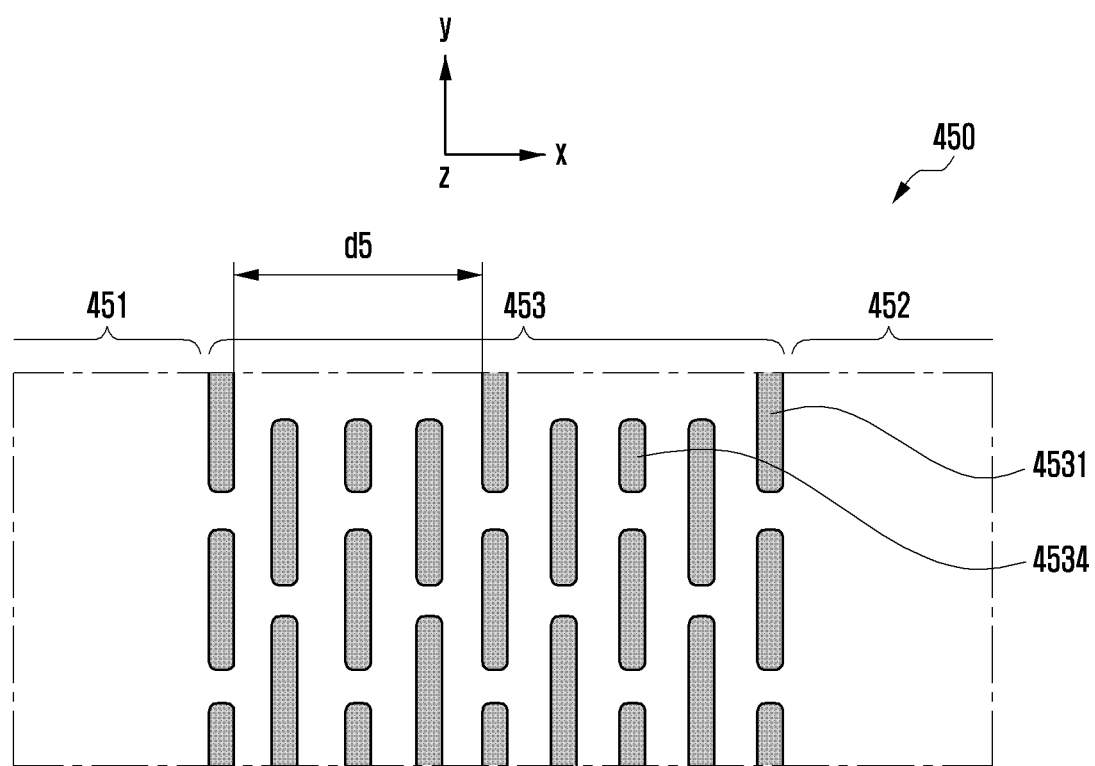

With reference to FIG. 7D, for rigidity reinforcement of the upper end portion of the conductive plate 450, the upper end area of the flexible portion 453 may be formed to have a fifth interval d5 wider than that of the periphery through modified openings 4534 in which a portion of the opening 4531 is removed or by disposing to alternately omit three openings 4531 in the first direction (e.g., x-axis direction) of the flexible portion 453.

Figure 7E:
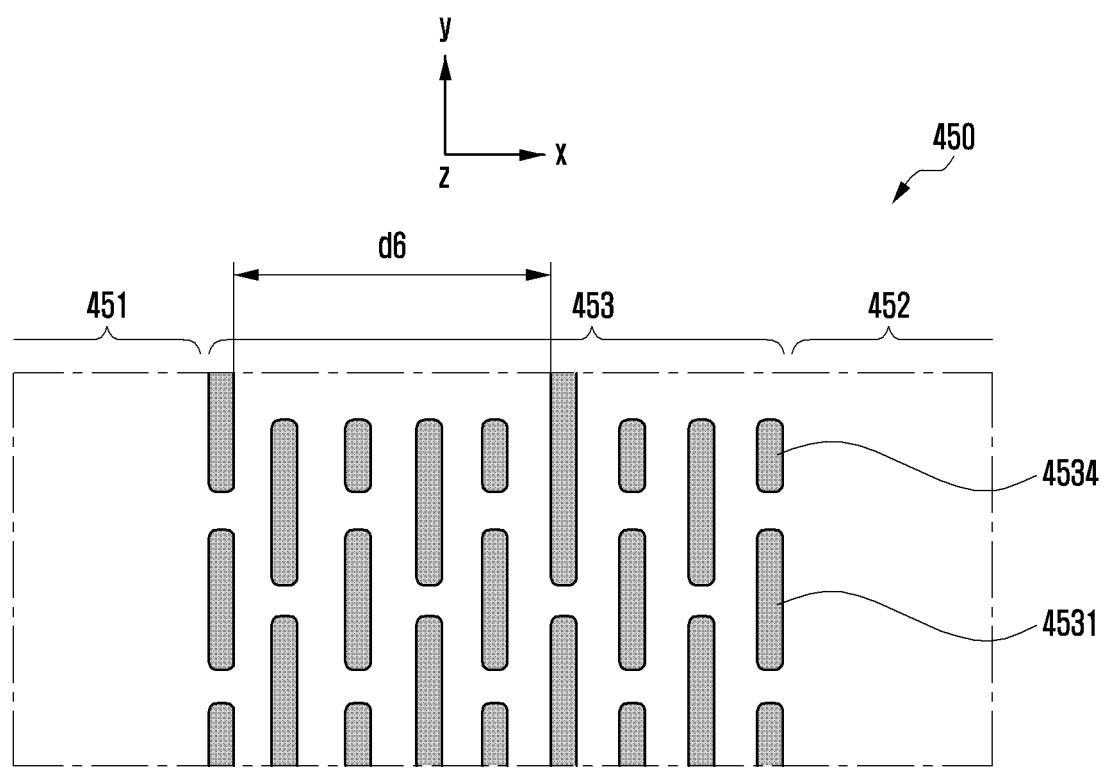

With reference to FIG. 7E, for rigidity reinforcement of the upper end portion of the conductive plate 450, the upper end area of the flexible portion 453 may be formed to have a sixth interval d6 wider than that of the periphery through modified openings 4534 in which a portion of the opening 4531 is removed or by disposing to alternately omit four openings 4531 in the first direction (e.g., x-axis direction) of the flexible portion 453.

Figure 7F:
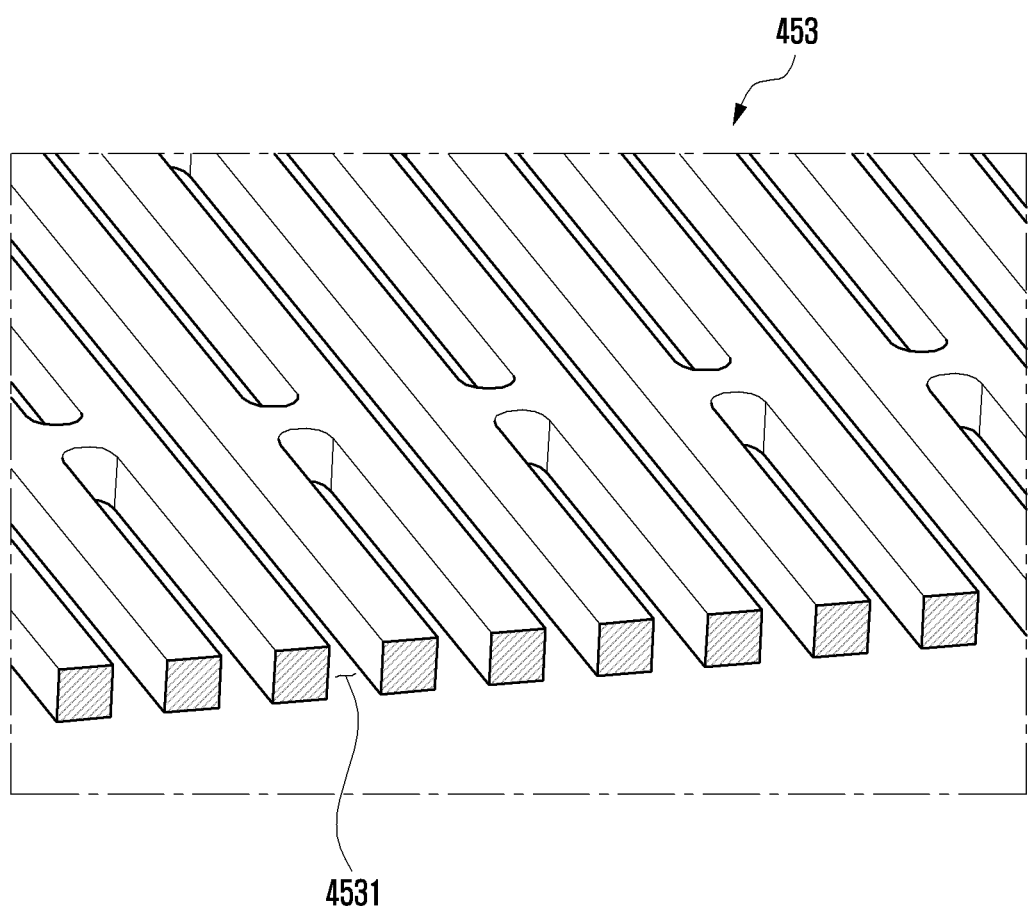
FIGS. 7F and 7G are perspective views illustrating some cross-sections of a flexible portion according to various embodiments of the disclosure.
Figure 7G:
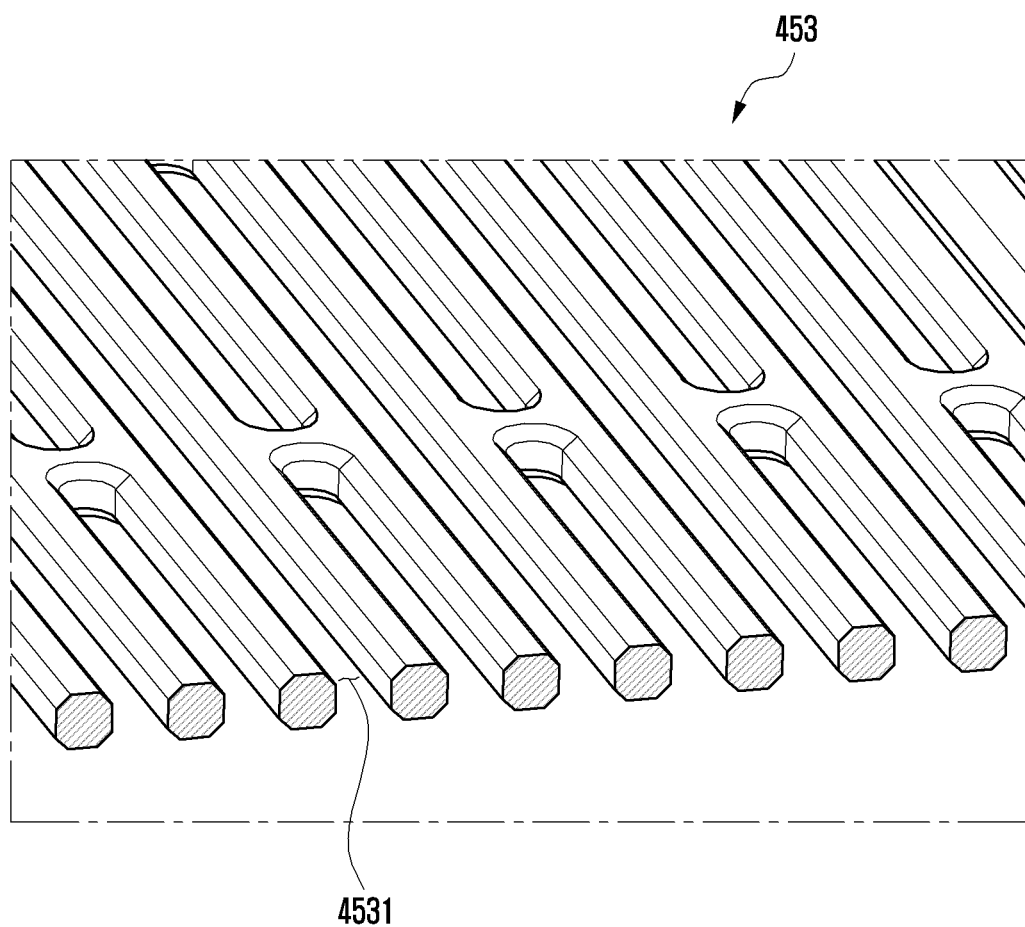

FIGS. 7F and 7G are perspective views illustrating some cross-sections of the flexible portion 453 according to various embodiments of the disclosure.

With reference to FIGS. 7F and 7G, the flexible portion 453 of the conductive plate 450 may be formed in a lattice structure through the plurality of openings 4531. In this case, a cross-sectional shape of the flexible portion 453 formed through the openings 4531 may be formed in a square or a polygon (e.g., octagon). In another embodiment, a cross-sectional shape of the flexible portion 453 may be formed in a circle or an oval. For example, when a cross-section of the flexible portion 453 is formed in a circle, an oval, or a polygon, the shape of the flexible portion 453 may help relieve a stress caused by a folding or unfolding operation of the electronic device and to lower a repulsive force by bending.

Figure 8A:
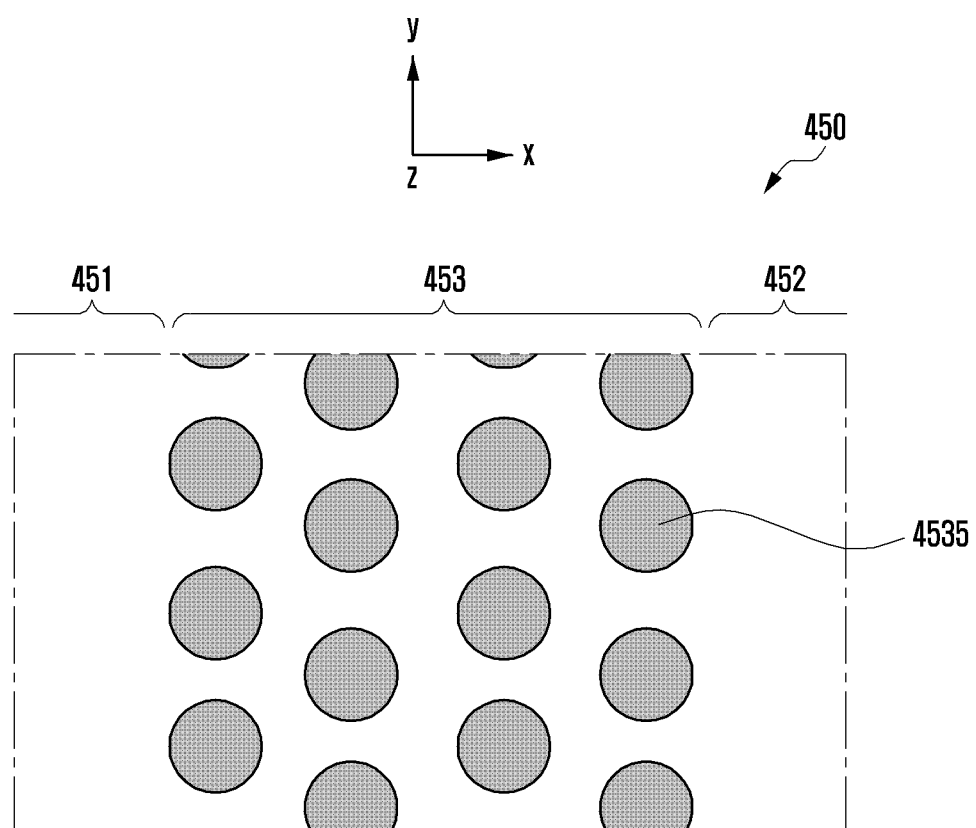
FIGS. 8A to 8C are diagrams illustrating various shapes of openings according to various embodiments of the disclosure.
Figure 8B:
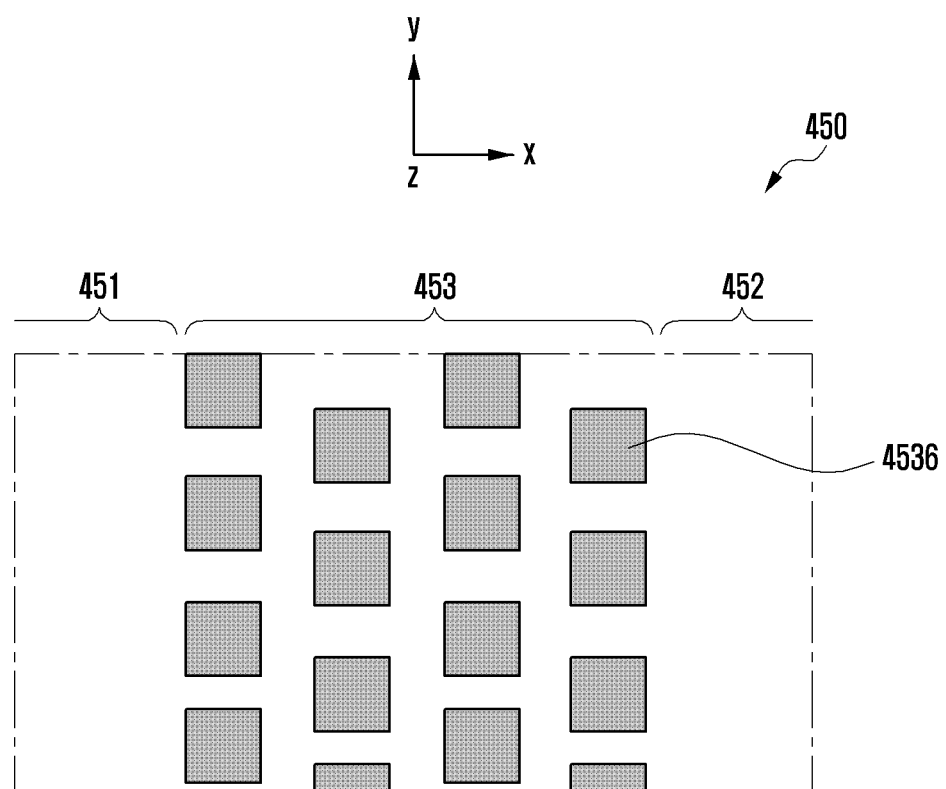
Figure 8C:
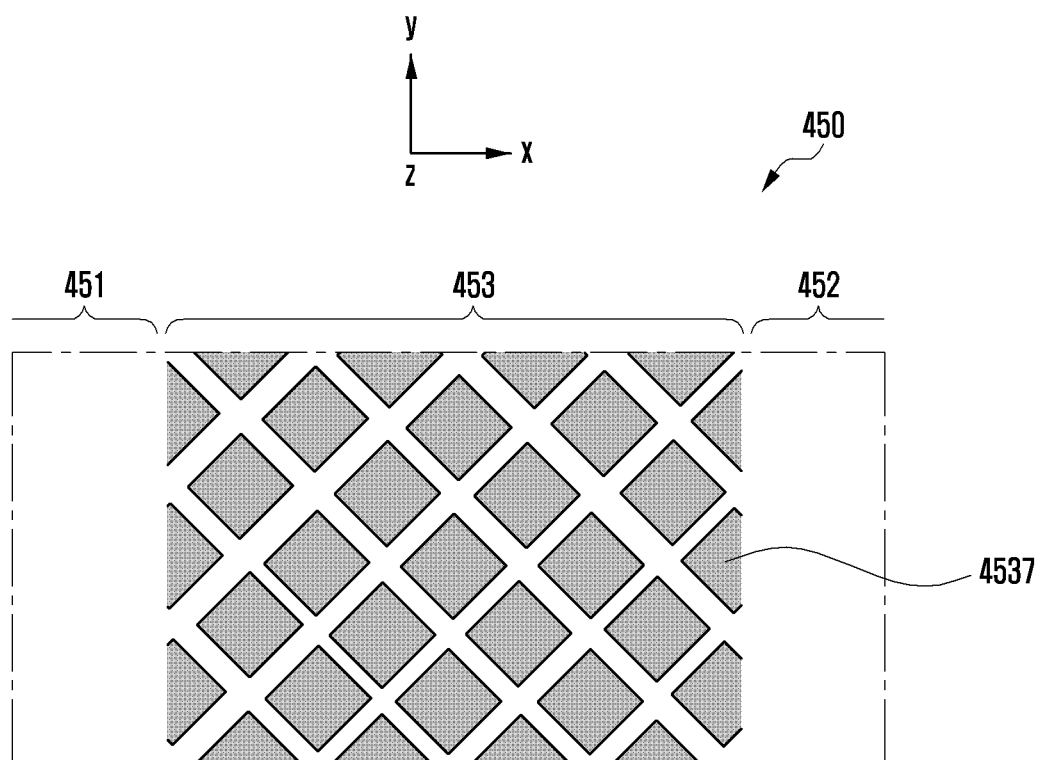

FIGS. 8A to 8C are diagrams illustrating various shapes of openings 4535, 4536, and 4537 according to various embodiments of the disclosure.

As illustrated in FIGS. 8A to 8C, the flexible portion 453 of the conductive plate 450 may be replaced with various shapes of openings 4535, 4536, and 4537 in consideration of perforation in addition to elliptical-shaped openings (e.g., the openings 4531 of FIG. 6A) extended in a first direction (y-axis direction), as described above. For example, the openings 4535, 4536, and 4537 may include circular openings 4535, rectangular openings 4536, and/or rhombus-shaped openings 4537 regularly or irregularly disposed in the first direction (y-axis direction) and/or the second direction (x-axis direction) of the flexible portion 453. Further, openings of various shapes may be formed. In other embodiments, the openings may be disposed to have at least partially different shapes.

Figure 9A:
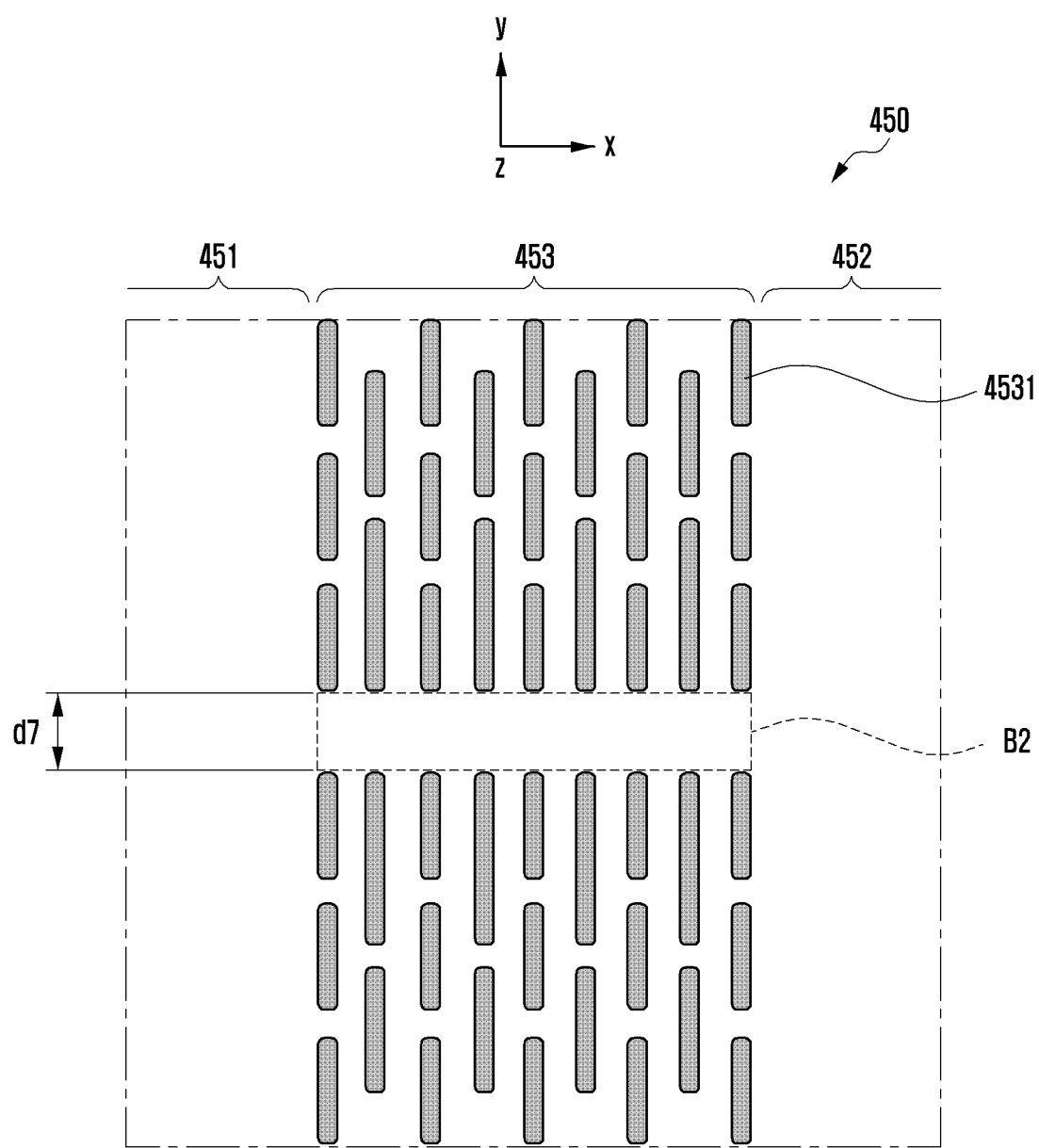
FIGS. 9A and 9B are diagrams illustrating various modifications of the area C1 of FIG. 5 according to various embodiments of the disclosure.
Figure 9B:
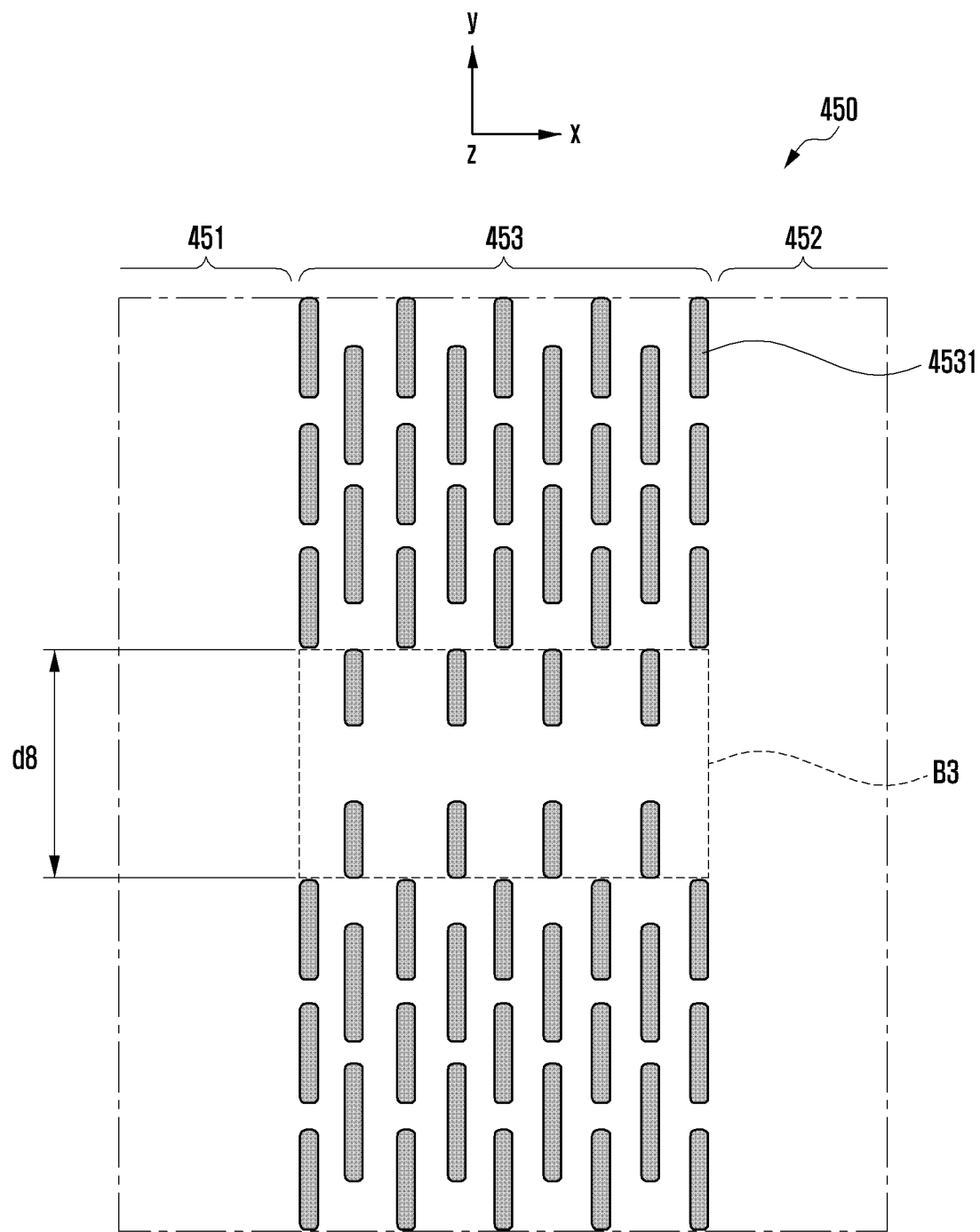

FIGS. 9A and 9B are diagrams illustrating various modifications of the area C1 of FIG. 5 according to various embodiments of the disclosure.

As described above, the flexible portion 453 of the conductive plate 450 according to various embodiments of the disclosure may further include rigid reinforcement portions B2 and B3 disposed at least partially in other areas as well as the upper end area and/or the lower end area. Further, the illustrated rigid reinforcement portions B2 and B3 may be disposed in at least one area of the flexible portion 453 other than the area C1.

With reference to FIG. 9A, the flexible portion 453 of the conductive plate 450 may include a plurality of openings 4531 spaced apart from each other in a first direction (y-axis direction) and/or a second direction (x-axis direction). According to an embodiment, the flexible portion 453 may include a rigid reinforcement portion B2 in which the openings 4531 are omitted in the second direction (x-axis direction). According to one embodiment, the rigid reinforcement portion B2 may not only firmly support the display panel (e.g., the display panel 430 of FIG. 4B) at the rear surface of the display (e.g., the display 400 of FIG. 4B) but also determine flexibility of the flexible portion 453. According to one embodiment, the rigid reinforcement portion B2 may be disposed in various areas of the flexible portion 453. According to one embodiment, flexibility of the flexible portion 453 may be determined by the number of the rigid reinforcement portion B2 and/or a separation distance d7 between peripheral openings 4531 by the rigid reinforcement portion B2.

With reference to FIG. 9B, the flexible portion 453 of the conductive plate 450 may include a plurality of openings 4531 spaced apart from each other in the first direction (y-axis direction) and/or the second direction (x-axis direction). According to an embodiment, the flexible portion 453 may include a rigid reinforcement portion B3 in which the openings 4531 are omitted in the second direction (x-axis direction). According to one embodiment, by adjusting a disposition density of the openings 4531 disposed in the rigid reinforcement portion B3 to be lower than that of the openings 4531 disposed in a peripheral area, rigidity reinforcement and/or flexibility may be adjusted. According to one embodiment, flexibility of the flexible portion 453 may be determined by the number of the rigid reinforcement portions B3, the disposition density of the openings 4531, and/or a separation distance d8 between the openings 4531 at a periphery of the rigid reinforcement portion B3.

FIG. 10 is a diagram illustrating a disposition configuration of openings 4531 in consideration of flexibility of the flexible portion 453 of the conductive plate 450 in each area according to a folding operation of the display 400 according to various embodiments of the disclosure.

With reference to FIG. 10, a bending characteristic of the flexible portion 453 of the conductive plate 450 may be adjusted in each area. According to an embodiment, in a state in which the first flat portion 451 and the second flat portion 452 are folded to face each other (in-folding state), the flexible portion 453 may be bent with different radii of curvature in each area and the resulting bending characteristics may be applied differently. This is because, in an area where excessive bendability is not required, the reduced number of openings 4531 may assist rigidity reinforcement. For example, as illustrated in FIG. 10, in a state in which the first flat portion 451 and the second flat portion 452 are folded to face each other, and it may be advantageous that flexibility of a first bending area B4 of the flexible portion 453 positioned farthest from the first flat portion 451 and the second flat portion 452 is determined larger than that of a second bending area B5 of the flexible portion 453 positioned close to the first flat portion 451 and the second flat portion 452. Therefore, by setting a disposition density of the plurality of openings 4531 in the first bending area B4 to be higher than that of the plurality of openings 4531 in the second bending area B5, a bending characteristic of the flexible portion 453 in each area may be adjusted. In another embodiment, in the case of the second bending area B5 requiring relatively less flexibility, by forming the opening 4531 to be thinner and shorter than that in the first bending area B4 or by reducing a disposition density thereof, an attachment surface may be increased and rigidity may be secured. In another embodiment, in the case of the first bending area B4 requiring relatively more flexibility, by forming the opening 4531 thicker and longer than that in the second bending area B5 or by increasing the disposition density thereof, the attachment surface may be reduced. In another embodiment, when the display 400 is in an out-folding form in which the first flat portion 451 and the second flat portion 452 are folded in reverse, the disposition density of the plurality of openings 4531 in the first bending area B4 may be set lower than that of the plurality of openings 4531 in the second bending area B5. In another embodiment, the bending characteristic of the flexible portion 453 in each area may be determined through a change in a shape of the plurality of openings 4531, spacing adjustment of openings 4531 in a first direction (y-axis direction) and/or a second direction (x-axis direction), or partial disposition of at least one area in which openings 4531 are omitted in addition to adjustment of the disposition density of the plurality of openings 4531. In another embodiment, when a plurality of curvature values are formed in the flexible portion 453, the density of the opening 4531 may be designed to adjust according to a curvature value. In particular, by setting the density of the opening to be low when the curvature value is large, and by setting the density of the opening to be large when the curvature value is small, flexibility and rigidity may be adjusted.

In another embodiment, the flexible display 400 including a foldable conductive plate 450 according to exemplary embodiments of the disclosure may be applied to a foldable electronic device operating in an in-folding and/or out-folding manner in a range of 0° to 360°. In another embodiment, the flexible display 400 including a foldable conductive plate 450 according to exemplary embodiments of the disclosure may be applied to a multi-foldable electronic device operating in a multi-folding manner in which a plurality of housings (e.g., three or more housings) is configured to alternately fold opposite to each other. In another embodiment, the flexible display 400 including the foldable conductive plate 450 according to the exemplary embodiments of the disclosure may be also be applied to a rollable electronic device configured to selectively extend a display area by enabling the second housing to at least partially slide from the first housing. For example, a flexible display 400 including a foldable conductive plate 450 according to exemplary embodiments of the disclosure may be applied to various deformable electronic devices in which a shape and/or a display area of the display is correspondingly changed through an operative change of at least one housing.

According to exemplary embodiments of the disclosure, the conductive plate may be attached to the polymer layer through an adhesive member. In this case, the conductive plate may further include an additional structure for preventing degradation of flexibility by an attachment force to a peripheral area of the opening or introduction of the adhesive member to the openings.

Figure 11A:
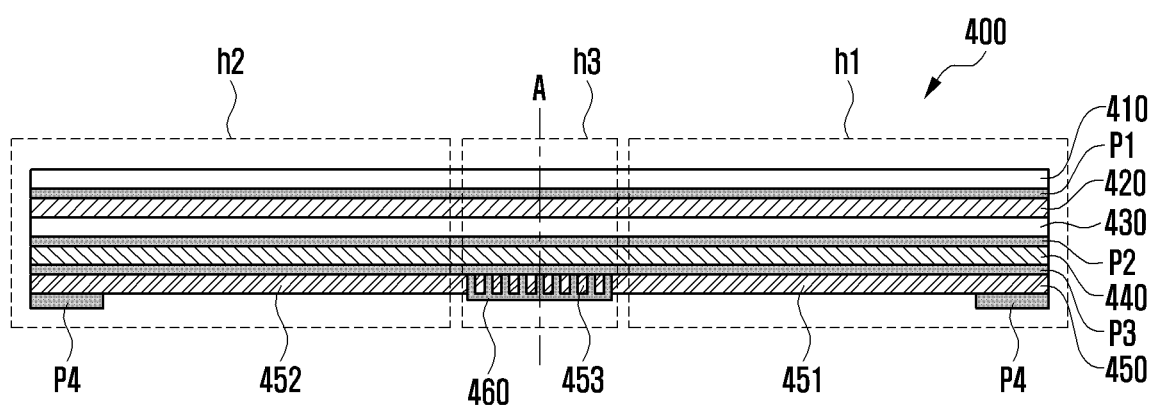
FIG. 11A is a cross-sectional view illustrating a stacking structure of a display according to various embodiments of the disclosure.
Figure 11B:
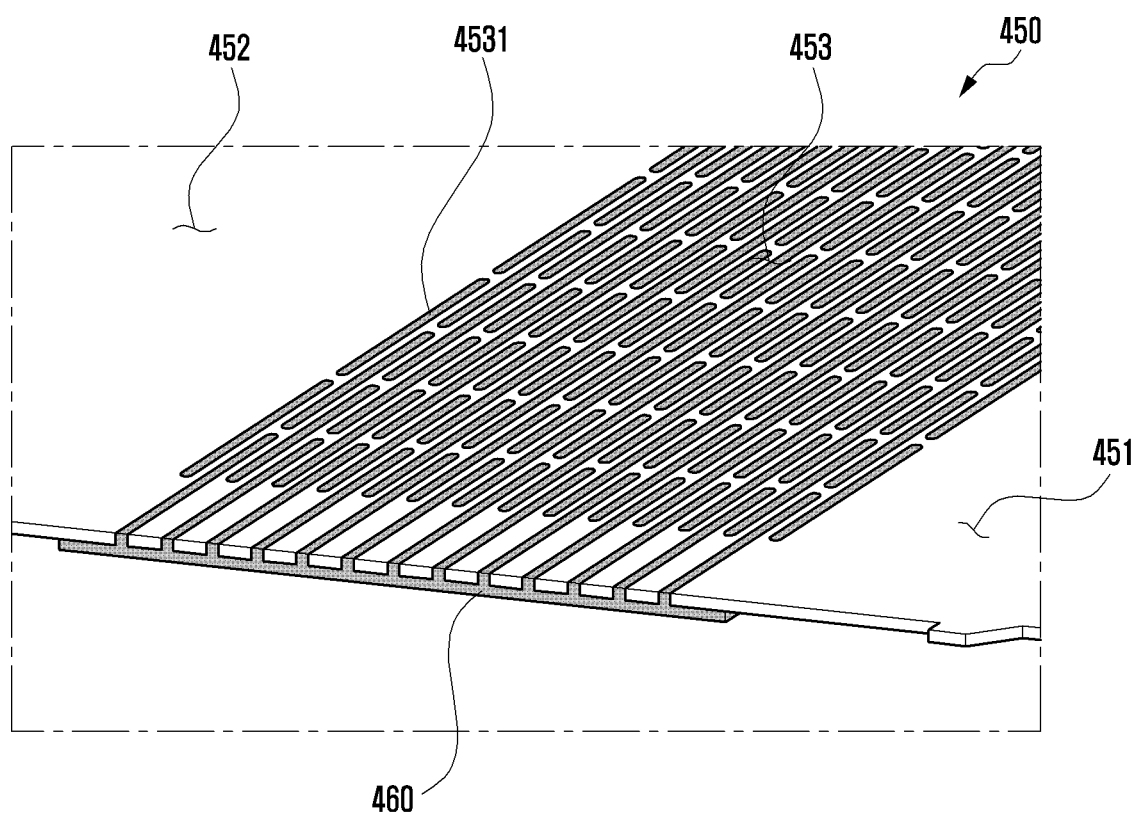
FIG. 11B is a partial perspective view illustrating a conductive plate illustrating a state in which a filling member is applied to a flexible portion according to various embodiments of the disclosure.

FIG. 11A is a cross-sectional view illustrating a stacking structure of a display 400 according to various embodiments of the disclosure. FIG. 11B is a partial perspective view of a conductive plate 450 illustrating a state in which a filling member 460 is applied to a flexible portion 453 according to various embodiments of the disclosure.

With reference to FIGS. 11A and 11B, the display 400 may include a filling member 460 filled in a plurality of openings 4531 formed in the flexible portion 453 of the conductive plate 450. According to an embodiment, the flexible portion 453 of the conductive plate 450 may be formed to have a flat surface with respect to an adhesive member P3 at the front surface through the filling member 460 and be formed to have a flat surface at a rear surface thereof. According to an embodiment, the filling member 460 may include an elastic material filled in the plurality of openings 4531 of the flexible portion 453 of the conductive plate 450 and then cured and/or solidified. According to an embodiment, the filling member 460 may include resin, urethane, silicone, or rubber.

According to various embodiments, when the conductive plate 450 in which the plurality of openings 4531 is filled through the filling member 460 is attached to a polymer member 440 through the adhesive member P3, deterioration of flexibility and opening visibility by inflow of the adhesive member P3 into the opening 4531 may be prevented.

Figure 12A:
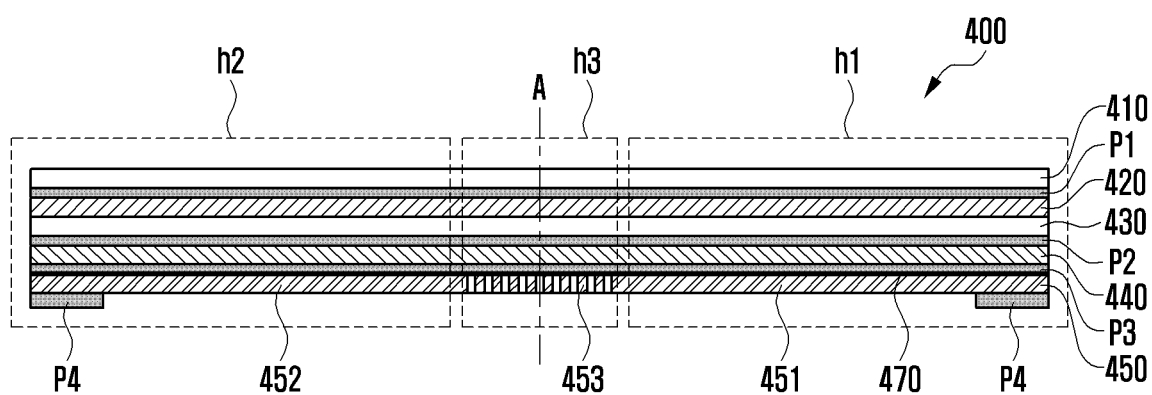
FIG. 12A is a cross-sectional view illustrating a stacking structure of a display according to various embodiments of the disclosure.
Figure 12B:
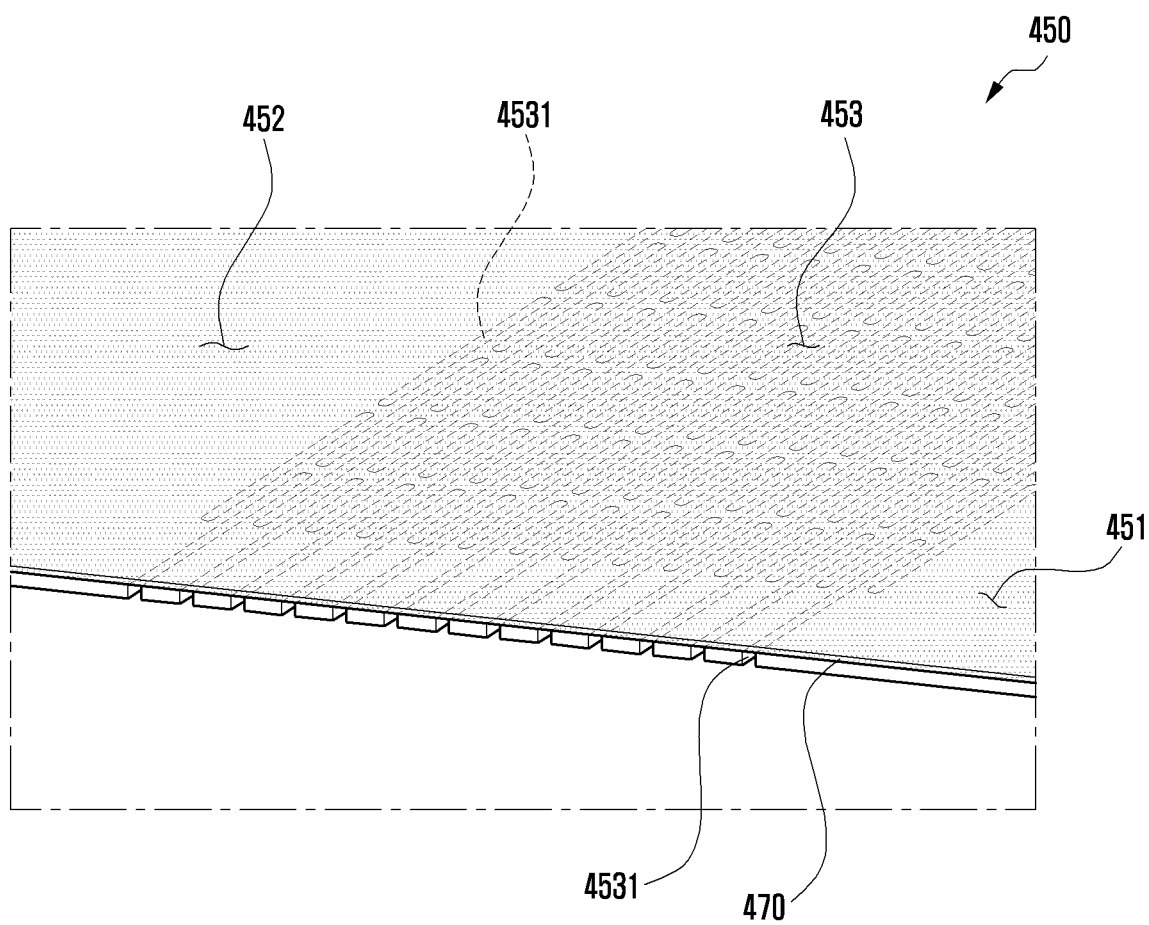
FIG. 12B is a partial perspective view illustrating a state in which a film member is applied between a conductive plate and an adhesive member according to various embodiments of the disclosure.

FIG. 12A is a cross-sectional view illustrating a stacking structure of a display 400 according to various embodiments of the disclosure. FIG. 12B is a partial perspective view illustrating a state in which a film member 470 is applied between a conductive plate 450 and an adhesive member P3 according to various embodiments of the disclosure.

With reference to FIGS. 12A and 12B, the display 400 may include a film member (e.g., thermo plastic polyurethane (TPU)) 470 disposed between the conductive plate 450 and the adhesive member P3. According to an embodiment, the film member 470 may include a flexible portion 453 of the conductive plate 450 and be formed in a size covering a first flat portion 451 and a second flat portion 452. In another embodiment, the film member 470 may be formed in a size that may cover only the flexible portion 453 of the conductive plate 450. According to an embodiment, as the adhesive member P3 enters into the plurality of openings 4531, the film member 470 may be prevented from being viewed from the front surface of the display 400. In another embodiment, the display 400 may include a printing area disposed between the conductive plate 450 and the adhesive member P3 instead of the film member 470. According to one embodiment, when the film member 470 and/or the print area is applied only to the flexible portion 453, an adhesive force of the adhesive member P3 to the flexible portion 453 is excluded or weakened; thus, degradation of bending characteristics of the flexible portion 453 by an adhesive force of the adhesive member may be prevented.

According to various embodiments, although not illustrated, the adhesive member P3 of the display 400 may be disposed to omit an area overlapped with the flexible portion 453 when viewed from above the display. In another embodiment, by differently setting a modulus characteristic of an area overlapped with the flexible portion 453 and a modulus characteristic of an area overlapped with the first flat portion 451 and the second flat portion 452 when viewed from above the display 400, the adhesive member P3 may be prevented in advance from entering into the plurality of openings 4531 of the flexible portion 453. For example, in the case of the adhesive member P3 corresponding to the flexible portion 453, an adhesive member having a soft type attribute may be applied. In the case of such an adhesive member, as the polymer, a (meth)acrylic copolymer such as (meth)acrylate or urethane acrylate or a silicone copolymer such as (dimethyl)siloxane may be used. According to an embodiment, in the case of the adhesive member P3 corresponding to the flexible portion 453, an adhesive member having a modulus characteristic of less than $5 \times 10^5$ Pascal (Pa) may be applied. According to an embodiment, in the case of the adhesive member P3 corresponding to the first flat portion 451 and the second flat portion 452, an adhesive member having a hard type attribute may be applied. In the case of such an adhesive member P3, as the polymer, a (meth)acrylic copolymer such as (meth)acrylate and urethane acrylate or a silicone copolymer such as (dimethyl)siloxane may be used. According to an embodiment, in the case of the adhesive member corresponding to the first flat portion 451 and the second flat portion 452, an adhesive member having a modulus characteristic of $5 \times 10^5$ Pascal (Pa) or more may be applied.

Figure 13A:
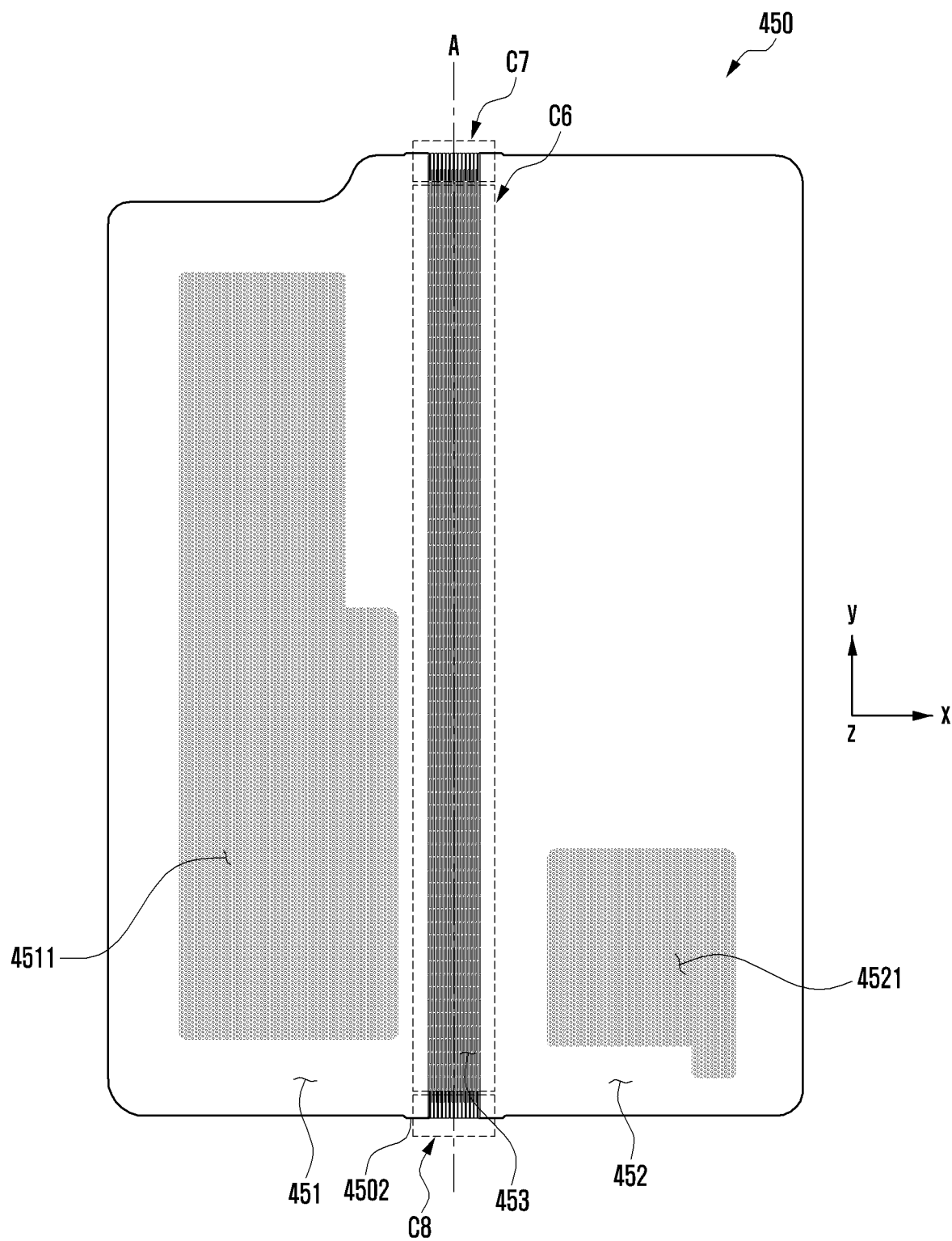
FIG. 13A is a diagram illustrating a conductive plate according to various embodiments of the disclosure.
Figure 13B:
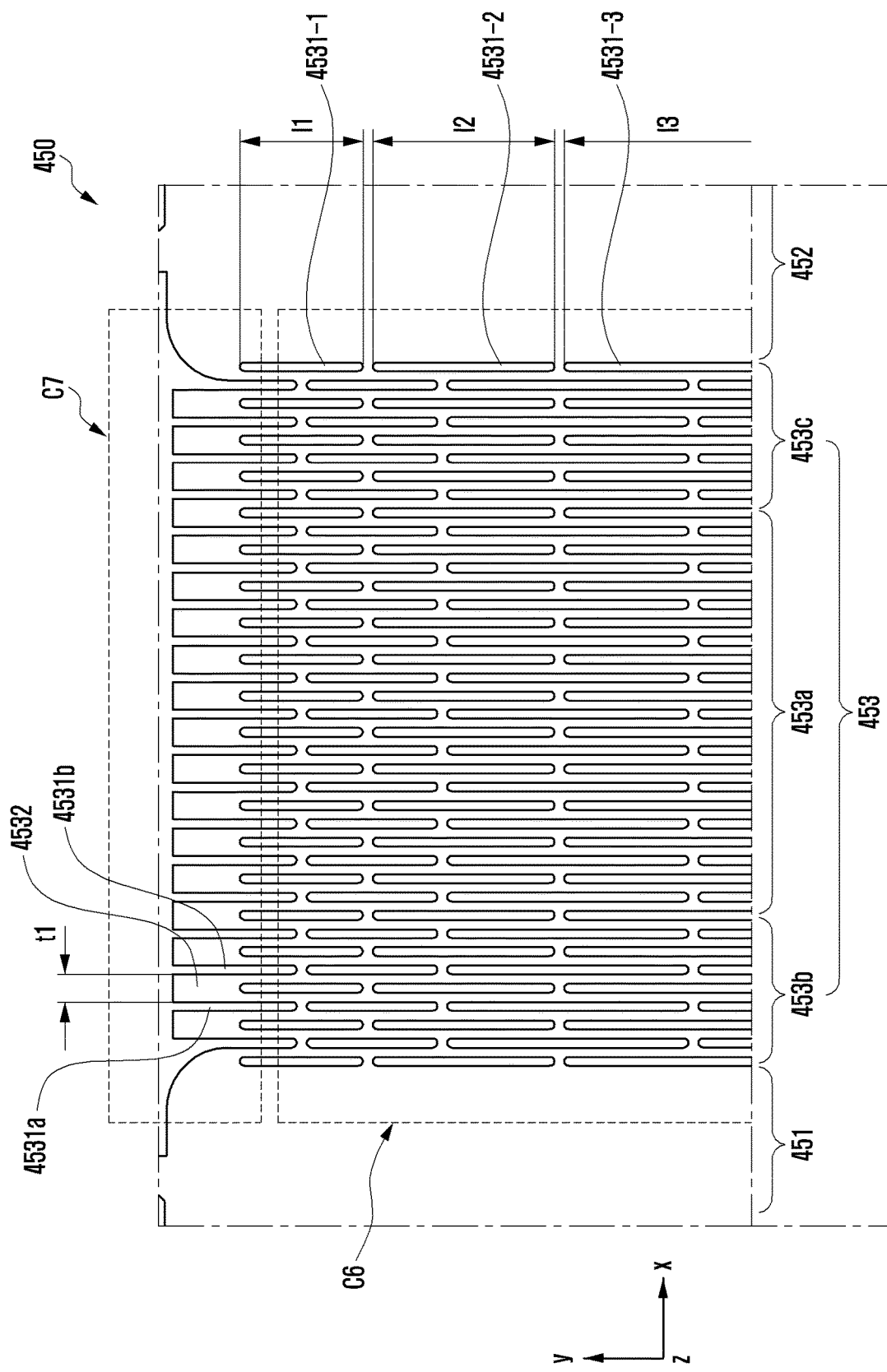
FIG. 13B is an enlarged view illustrating a portion of an area C6 and an area C7 of FIG. 13A according to various embodiments of the disclosure.

FIG. 13A is a diagram illustrating a conductive plate 450 according to various embodiments of the disclosure. FIG. 13B is an enlarged view illustrating a portion of an area C6 and an area C7 of FIG. 13A according to various embodiments of the disclosure.

With reference to FIGS. 13A and 13B, the conductive plate 450 may include a first flat portion 451 facing a first area (e.g., the first area h1 of FIG. 4B) of the display (e.g., the display 400 of FIG. 4B), a second flat portion 452 facing a second area (e.g., the second area h2 of FIG. 4B) of the display 400, and a flexible portion 453 facing a third area (e.g., the third area h3 of FIG. 4B) of the display 400. According to an embodiment, the flexible portion 453 may include an area in which a plurality of openings 4531 is formed. According to an embodiment, when a first housing structure (e.g., the first housing structure 110 of FIG. 1) and a second housing structure (e.g., the second housing structure 120 of FIG. 1) are in a substantially folded state, the flexible portion 453 may include a bending portion 453a bent together, a first lower attachment portion 453b connected from the bending portion 453a to the first flat portion 451, and a second lower attachment portion 453c connected from the bending portion 453a to the second flat portion 452. According to one embodiment, the first lower attachment portion 453b and the second lower attachment portion 453c are areas in which the plurality of openings 4531 are extended from the bending portion 453a and may be attached, for example, to the first housing structure 110 and the second housing structure 120 through an adhesive member. According to one embodiment, a stress concentration phenomenon according to bending of the bending portion 453a may be solved through an attachment structure in which the first lower attachment portion 453b and the second lower attachment portion 453c in which the plurality of openings 4531 is extended are attached to the housing structures 110 and 120.

According to various embodiments, the conductive plate 450 may include a first rigid reinforcement area C7 and a second rigid reinforcement area C8 disposed in the upper and lower end areas in which fatigue may be relatively largely accumulated by frequent folding operations in the flexible portion 453. According to an embodiment, the flexible portion 453 may include a general folding area C6 extended from the first rigid reinforcing area C7 to the second rigid reinforcing area C8.

According to various embodiments, the flexible portion 453 may include a rigid reinforcement portion 4532 formed to have a relatively large width t1 by forming a gap between one opening 4531a and another neighboring opening 4531b to be farther than a gap between the openings 4531 disposed in the general folding area C6 by omitting at least a portion of the plurality of openings 4531 disposed in a second direction (x-axis direction) in the first rigid reinforcement area C7. According to one embodiment, the rigid reinforcement portion 4532 may be formed by omitting one, two, three, or more openings between one opening 4531*a* and another neighboring opening 4531*b*. Although not illustrated, the second rigid reinforcement area C8 may also have substantially the same configuration as that of the first rigid reinforcement area C7.

According to various embodiments, the flexible portion 453 may at least partially adjust bendability in the general folding area C6. According to one embodiment, the bending portion 453*a* of the flexible portion 453 may at least partially adjust bendability in the general folding area C6. According to one embodiment, by differently forming lengths of the openings 4531 disposed in the first direction (y-axis direction) in the general folding area C6, a bending characteristic of the flexible portion 453 may be adjusted. For example, the flexible portion 453 may include a plurality of openings 4531 disposed side by side in the first direction (y-axis direction) in the same manner as a first opening 4531-1 disposed in the first direction (y-axis direction) and having a first length l1 in the general folding area C6, a second opening 4531-2 disposed along the same axis (y-axis) as that of the first opening 4531-1 and having a second length l2 longer than the first length l1, and a third opening 4531-3 disposed along the same axis (y-axis) as that of the second opening 4531-2 and having a third length l3 longer than the second length l2. In this case, the openings 4531 may have the same gap (e.g., the gap d1 of FIG. 6A) in the second direction (x-axis direction), the same gap (e.g., the gap d2 of FIG. 6A) in the first direction (y-axis direction), and the same width itself (e.g., width w of FIG. 6A) and be disposed in such a manner that only a length (e.g., the length l of FIG. 6A) thereof is changed. For example, because there may be a limit in reducing a size of a width (e.g., the width w of FIG. 6A) of the minute openings 4531, it may be advantageous to adjust bending characteristics of the flexible portion 453 by adjusting a length thereof while having the relatively same width. According to an embodiment, the openings 4531 disposed in a progressively longer manner in the first direction (y-axis direction) may be disposed in the second direction (x-axis direction) in the same manner. In another embodiment, a length of the openings 4531 may be gradually shortened from the first rigid reinforcement area C7 and the second rigid reinforcement area C8 toward the center of the general folding area C6 or may be formed in such a way that a length thereof increases gradually. In another embodiment, the openings 4531 may be formed in a manner that a length of the openings 4531 gradually decreases or gradually increases from the first rigid reinforcement area C7 toward the second rigid reinforcement area C8. In another embodiment, the plurality of openings 4531 may be disposed to gradually increase or reduce a length thereof in a second direction (x-axis direction) perpendicular to the first direction (y-axis direction). In this case, the plurality of openings 4531 may be disposed to gradually increase a length thereof as advancing from the edge near the first flat portion 451 and the second flat portion 452 to a central portion in a second direction (x-axis direction) in the flexible portion 453. This is because relatively large flexibility is required as the flexible portion 453 advances from the first flat portion and the second flat portion to the center portion. In other words, it may mean that bending characteristics of the flexible portion 453 may be adjusted to have relatively high rigidity as advancing from the central portion of the bending portion 453*a* to the first lower attachment portion 453*b* and the second lower attachment portion 453*c*. In another embodiment, a length of the openings 4531 may be formed to gradually reduce or gradually increase in the first direction (y-axis direction) and/or the second direction (x-axis direction) in only at least partially defined portion in the general folding area C6. In another embodiment, the length of the openings 4531 may vary irregularly instead of changing gradually.

Figure 14A:
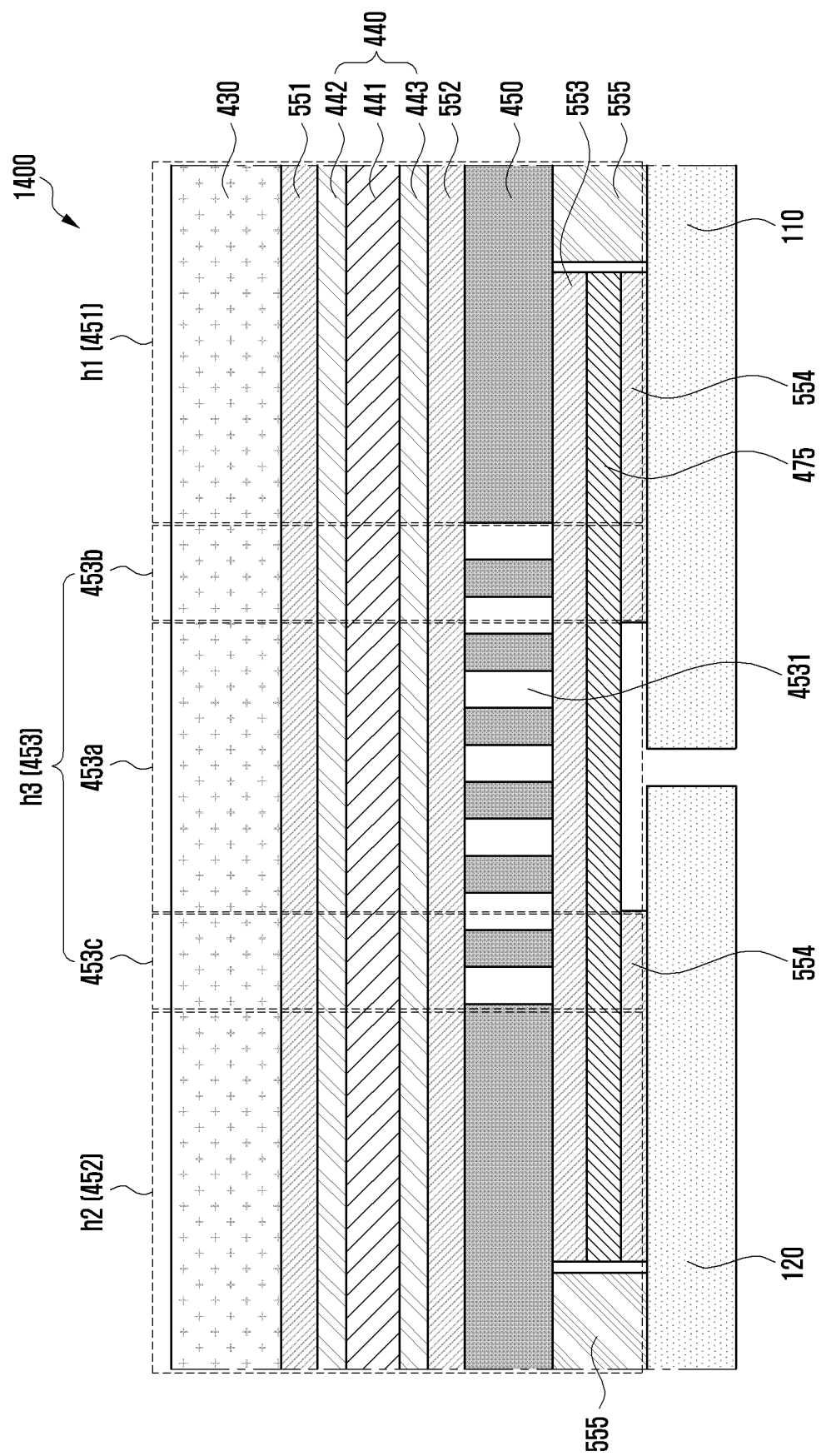
FIG. 14A is a partial cross-sectional view illustrating a stacking structure of a display according to various embodiments of the disclosure.

FIG. 14A is a partial cross-sectional view illustrating a stacking structure of a display 1400 according to various embodiments of the disclosure.

The display 1400 of FIG. 14A may be at least partially similar to the display 130 of FIG. 3 or may further include other components of the display.

With reference to FIG. 14A, the display 1400 may include a display panel 430 and at least one polymer member 440, a conductive plate 450, and a blocking member 475 (e.g., polymer layer) disposed to block a flexible portion 453 having a plurality of openings 4531 of the conductive plate 450 sequentially disposed at the display panel 430. According to one embodiment, the blocking member 475 may form a polymer layer and include at least one of TPU, silicone, rubber, or urethane. According to an embodiment, the display 1400 may be disposed to cross at least a portion of a first surface (e.g., the first surface 111 of FIG. 1) of the first housing structure 110 (e.g., the first housing structure 110 of FIG. 1) and a third surface (e.g., the third surface 121 of FIG. 1) of the second housing structure 120 (e.g., the second housing structure 120 of FIG. 1). According to an embodiment, the display 1400 may include a first area h1, which is a flat area corresponding to the first housing structure 110 of the electronic device (e.g., the electronic device 100 of FIG. 1), a second area h2, which is a flat area corresponding to the second housing structure 120, and a third area h3 facing the hinge structure (e.g., the hinge structure 164 of FIG. 3). According to an embodiment, the first area h1 and the second area h2 of the display 1400 may be configured to be folded or unfolded to each other based on at least a portion of the third area h3. According to an embodiment, the conductive plate 450 may include a flexible portion 453 corresponding to the third area h3 of the display 1400. According to an embodiment, the flexible portion 453 may include a bending portion 453*a* that may be folded and a first lower attachment portion 453*b* and a second lower attachment portion 453*c* extended to both sides of the bending portion 453*a* and connected to the first flat portion 451 and the second flat portion 452, respectively.

According to various embodiments, at least one polymer member 440 may include a cushion layer 441 and a first layer 442 (e.g., first polymer layer) and a second layer 443 (e.g., second polymer layer) stacked with the cushion layer 441 interposed therebetween. According to one embodiment, at least one polymer member 440 may have a stacking structure for blocking a foreign material from entering through the plurality of openings 4531 formed in the flexible portion 453 of the conductive plate 450 and preventing visibility of a folding boundary area of the display 1400 according to the folding and unfolding operations of the electronic device. According to an embodiment, the cushion layer 441 may be made of a material (e.g., sponge or poron) for cushioning. According to an embodiment, the first layer 442 (e.g., first polymer layer) disposed on the cushion layer and the second layer 443 (e.g., second polymer layer) disposed beneath the cushion layer 441 may be made of a material (e.g., TPU) for improving a surface quality (visibility improvement). According to an embodiment, surface roughness of the first layer 442 (e.g., first polymer layer) and surface roughness of the second layer 443 (e.g., second polymer layer) may be the same or different. For example, in order to improve visibility, surface roughness of the first layer may be lower than that of the second layer 443 (e.g., second polymer layer).

According to various embodiments, the display panel 430, the at least one polymer member 440, the conductive plate 450, and the blocking member 475 (e.g., polymer layer) may be attached to each other through adhesive members 551, 552, 553, and 554. For example, the adhesive members 551, 552, 553, and 554 may include at least one of an optical clear adhesive (OCA), a pressure sensitive adhesive (PSA), a thermally reactive adhesive, a general adhesive, or a double-sided tape. According to an embodiment, the at least one polymer member 440 may be attached to the rear surface of the display panel 430 through the first adhesive member 551. According to an embodiment, the conductive plate 450 may be attached to a rear surface of the polymer member 440 through the second adhesive member 552. According to an embodiment, the blocking member 475 (e.g., polymer layer) may be attached to a rear surface of the conductive plate 450 through the third adhesive member 553. According to an embodiment, the display 1400 may be at least partially attached to the first housing structure 110 and the second housing structure 120 through the fourth adhesive member 554 and the fifth adhesive member 555.

According to various embodiments, the blocking member 475 (e.g., polymer layer) may be at least partially attached to the first housing structure 110 and the second housing structure 120 through the fourth adhesive member 554. According to one embodiment, the blocking member 475 (e.g., polymer layer) may include a first lower attachment portion 453b and a second lower attachment portion 453c except for an area overlapped with the bending portion 453a of the flexible portion 453 when viewed from above the display to be attached to the first housing structure 110 and the second housing structure 120 through the fourth adhesive member 554. This may be to provide a non-adhesive section to an area of the blocking member 475 (e.g., polymer layer) corresponding to the bending portion 453a, thereby relieving a stress concentration phenomenon according to the folding operation and to separate the first housing structure 110 and the second housing structure 120 from the surface of the display 1400 during the folding operation. In another embodiment, the non-adhesive section may be disposed to overlap with an area larger than the bending portion 453a and smaller than the flexible portion 453 when viewed from above the display 1400. In another embodiment, the non-adhesive section may be disposed to overlap with an area larger than the flexible portion 453 when viewed from above the display 1400. According to one embodiment, the conductive plate 450 may be directly attached to the first housing structure 110 and the second housing structure 120 through the fifth adhesive member 555 in an edge area except for the blocking member 475 (e.g., polymer layer). According to an embodiment, the fifth adhesive member 555 may be formed in a thickness to compensate for thicknesses of the third adhesive member 553, the blocking member 475 (e.g., polymer layer), and the fourth adhesive member 554. According to one embodiment, the fifth adhesive member 555 may include a double-sided tape or a waterproof tape.

Figure 14B:
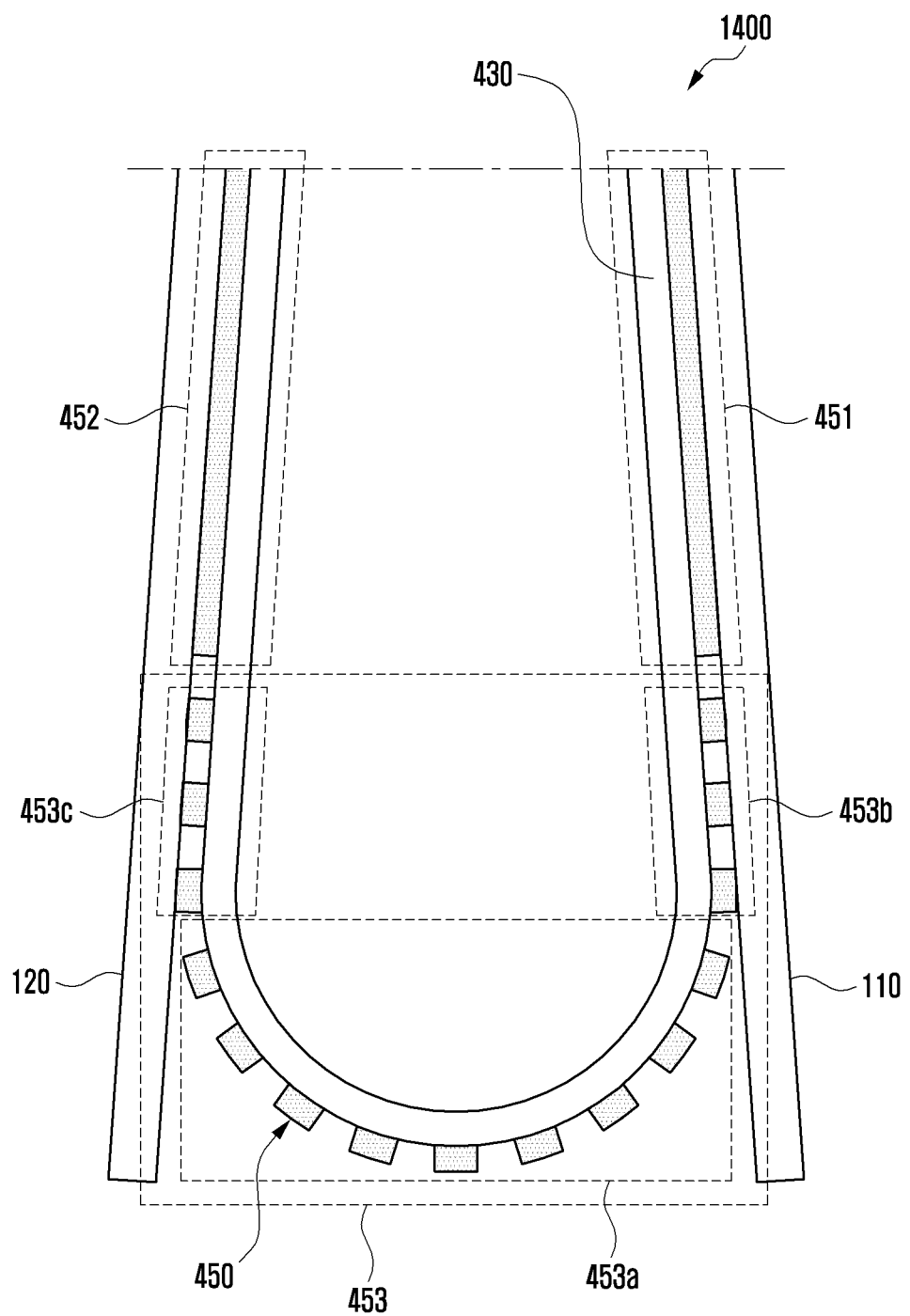
FIG. 14B is a partial cross-sectional view of a display illustrating a folded structure of a conductive plate in a folded state of an electronic device according to various embodiments of the disclosure.

FIG. 14B is a partial cross-sectional view of a display 1400 illustrating a folded structure of a conductive plate in a folded state according to various embodiments of the disclosure.

With reference to FIG. 14B, the conductive plate 450 may include a first flat portion 451 at least partially attached to the first housing structure 110, a second flat portion 452 at least partially attached to the second housing structure 120, and a flexible portion 453 for connecting the first flat portion 451 and the second flat portion 452 and providing at least partially a bending property through the plurality of openings 4531. According to an embodiment, the flexible portion 453 may include a bending portion 453a to be bent together when the display 1400 is folded, a first lower attachment portion 453b extended from the bending portion 453a to the first flat portion 451, and a second lower attachment portion 453c extended from the bending portion 453a to the second flat portion 452. According to one embodiment, in order to solve a stress concentration phenomenon generated at a periphery of each of the flat portions 451 and 452 according to a folding operation of the conductive plate 450, the first lower attachment portion 453b and the second lower attachment portion 453c may be attached to the first housing structure 110 and the second housing structure 120, respectively. For example, when the flexible portion 453 coincides with the bending portion 453a, a stress is concentrated at both left and right ends of the bending portion 453a, and a problem may occur that connected portions are disconnected by the opening 4531 in the corresponding area according to a folding or unfolding operation of the electronic device. Accordingly, a stress concentrated in the stress concentration area according to the folding or unfolding operation of the electronic device may be relaxed through the first lower attachment portion 453b and the second lower attachment portion 453c extended from the bending portion 453a through extension of the openings 4531 and at least partially attached to the first housing structure 110 and the second housing structure 120.

According to various embodiments, areas of the first lower attachment portion 453b and the second lower attachment portion 453c may be determined by an end point of the last opening 4531 disposed at left and right ends of the flexible portion 453 from the bending portion 453a, a point including at least a portion of the first flat portions 451 and the second flat portion 452 after the end point of the last opening 4531, or a point including a portion of the last opening 4531.

Figure 15A:
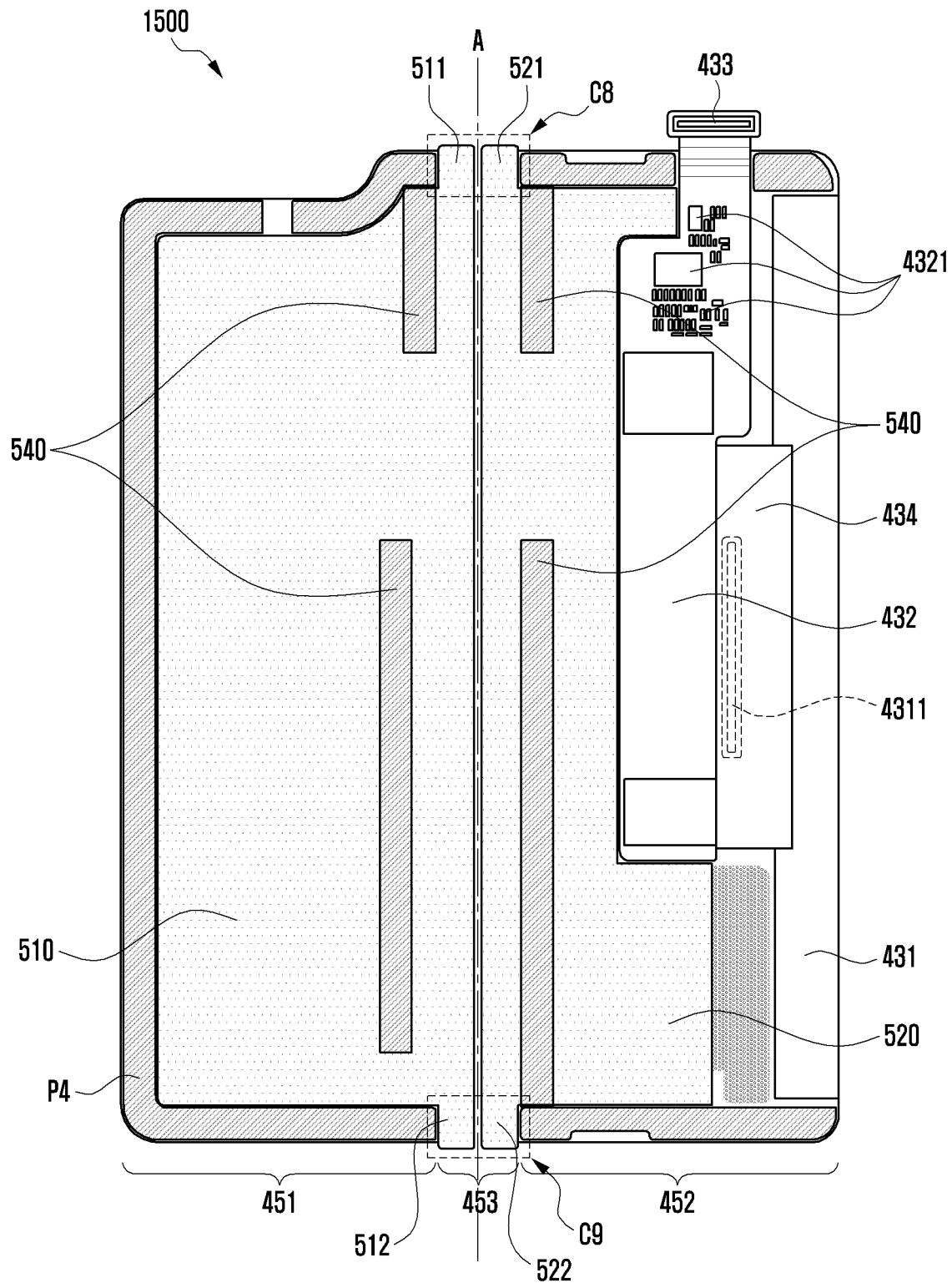
FIG. 15A is a diagram illustrating a rear surface of a display according to various embodiments of the disclosure.
Figure 15B:
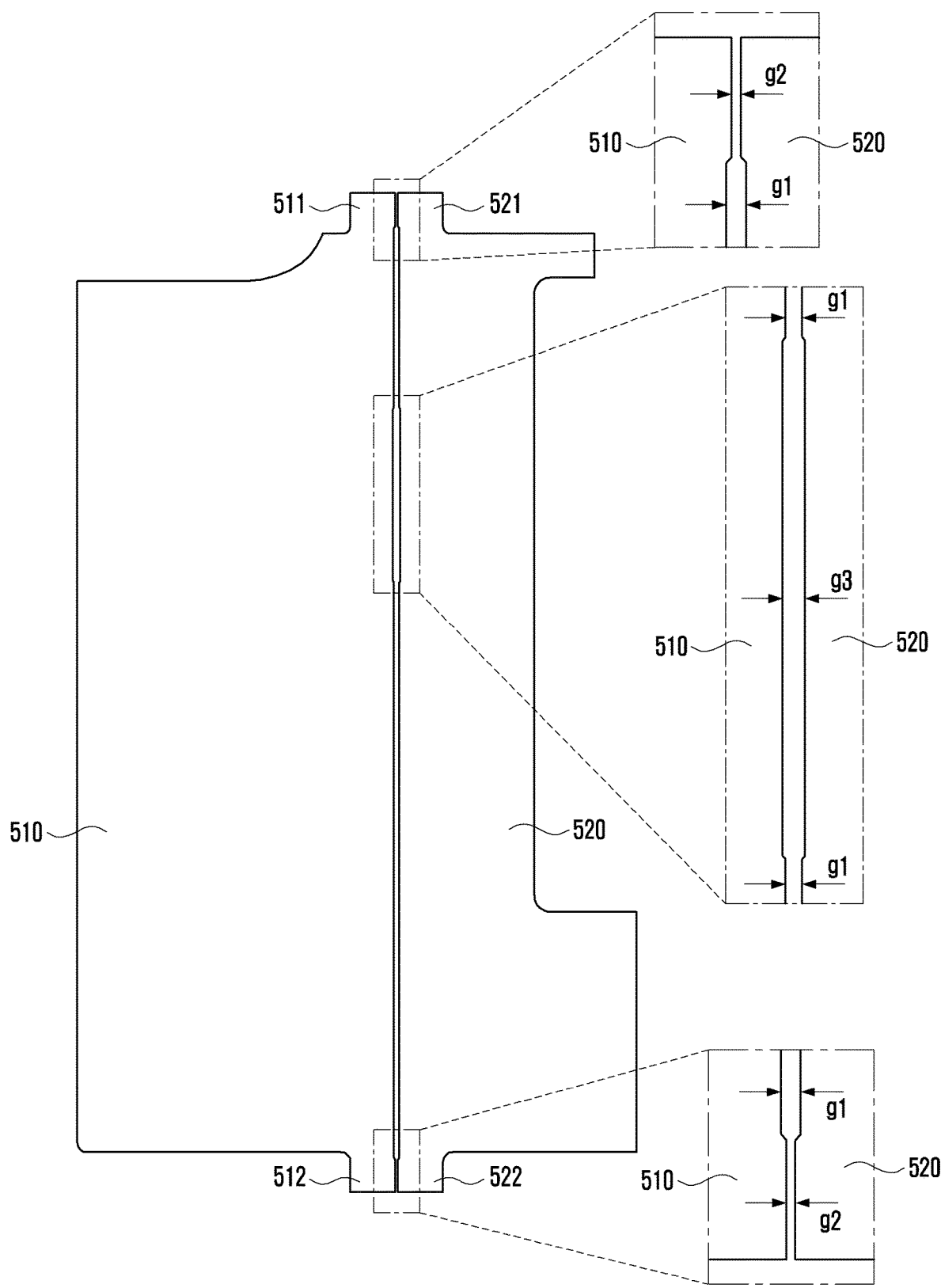
FIG. 15B is a diagram illustrating a state in which a first reinforcing plate and a second reinforcing plate are disposed in close proximity to each other according to various embodiments of the disclosure.

FIG. 15A is a diagram illustrating a rear surface of a display 1500 according to various embodiments of the disclosure. FIG. 15B is a diagram illustrating a state in which a first reinforcing plate 510 and a second reinforcing plate 520 are disposed in close proximity to each other according to various embodiments of the disclosure.

The display 1500 of FIG. 15A may be at least partially similar to the display 130 of FIG. 3 or may further include other components of the display.

When describing FIGS. 15A and 15B, at least some components of the display 1500 may be substantially the same as the components of FIG. 4C, and the same reference numerals may be given to the same components, and a detailed description thereof may be omitted.

With reference to FIGS. 15A and 15B, the display 1500 may include a pair of reinforcing plates 510 and 520 disposed at a rear surface of the conductive plate 450 to assist rigidity reinforcement of the display 1500. According to one embodiment, the pair of reinforcing plates 510 and 520 may include a first reinforcing plate 510 disposed to be extended from at least a portion of the first flat portion 451 of the conductive plate 450 to at least a portion of the flexible portion 453 and a second reinforcing plate 520 disposed to be extended from at least a portion of the second flat portion 452 of the conductive plate 450 to at least a portion of the flexible portion 453. According to one embodiment, the first reinforcing plate 510 and the second reinforcing plate 520 may be formed in a shape that avoids structures disposed at a rear surface of the conductive plate 450. For example, the first reinforcing plate 510 and the second reinforcing plate 520 may be formed in a shape that avoids an adhesive member P4 disposed along the edge of the rear surface of the conductive plate 450. According to an embodiment, the first reinforcing plate 510 and the second reinforcing plate 520 may be formed in a shape that avoids an extension portion 431, a connection pad 434, and an FPCB 432 folded from the display panel (e.g., the display panel 430 of FIG. 4C) and disposed at the rear surface of the conductive plate 450. This may be to prevent an increase in thickness of the display 1500 according to stacking of the reinforcing plates 510 and 520.

According to various embodiments, the first reinforcing plate 510 and the second reinforcing plate 520 may be disposed to have separated gaps g1, g2, and g3 having at least partially different intervals from each other based on an axis A in the flexible portion of the conductive plate 450. These gaps g1, g2, and g3 may enable the first reinforcing plate 510 and the second reinforcing plate 520 to be folded together with the first flat portion 451 and the second flat portion 452 of the conductive plate 450 when the display 1500 is folded based on the flexible portion 453.

According to various embodiments, the first reinforcing plate 510 and the second reinforcing plate 520 may be disposed to face each other with the first gap g1 for substantially most of the area. According to an embodiment, the first reinforcing plate 510 may include a first extension portion 511 and a second extension portion 512 for covering an upper end area (area C8) and a lower end area (area C9) of the flexible portion 453 of the conductive plate 450. According to an embodiment, the second reinforcing plate 520 may include a third extension portion 521 and a fourth extension portion 522 for covering the upper end area C8 and the lower end area C9 of the flexible portion 453 of the conductive plate 450. According to an embodiment, the first extension portion 511 and the third extension portion 521 may be disposed to face each other with a second gap g2 smaller than the first gap g1. According to an embodiment, the second extension portion 512 and the fourth extension portion 522 may also be disposed to face each other with the second gap g2. According to an embodiment, the first reinforcing plate 510 and the second reinforcing plate 520 may be disposed to have a third gap g3 larger than the first gap g1 in at least some areas facing each other. An area having the third gap g3 having a relatively large interval may assist a disposition space of the electrical connection member (e.g., FPCB) (e.g., at least one wiring member 163 of FIG. 3) extended from the first internal space of the first housing structure 110 of the electronic device to the second internal space of the second housing structure 120 through the hinge structure. According to an embodiment, in order to form a first gap g1, a second gap g2, and/or a third gap g3, the first reinforcing plate 510 and the second reinforcing plate 520 may be formed to have a protrusion at least partially protruded from the edge of the area or to include a recessed recess. According to one embodiment, the first reinforcing plate 510 and the second reinforcing plate 520 may be made of SUS or Al. In another embodiment, the first reinforcing plate 510, the second reinforcing plate 520, and/or the conductive plate 450 may be made of high strength nonmagnetic SUS for preventing a magnetization phenomenon by at least one magnet disposed inside the electronic device and used as a member to be detected of a detection sensor (e.g., hall sensor).

According to various embodiments, the display 1500 may further include at least one additional adhesive member 540 disposed in a longitudinal direction at a periphery of an area of the gaps g1, g2, and g3 facing each other at a rear surface of the first reinforcing plate 510 and the second reinforcing plate 520. According to one embodiment, through the additional adhesive member 540, bending deformation of the first reinforcing plate 510 and the second reinforcing plate 520 generated in portions of the gaps g1, g2, and g3 according to a folding operation or deformation and lifting by a drop impact may be prevented.

Figure 16A:
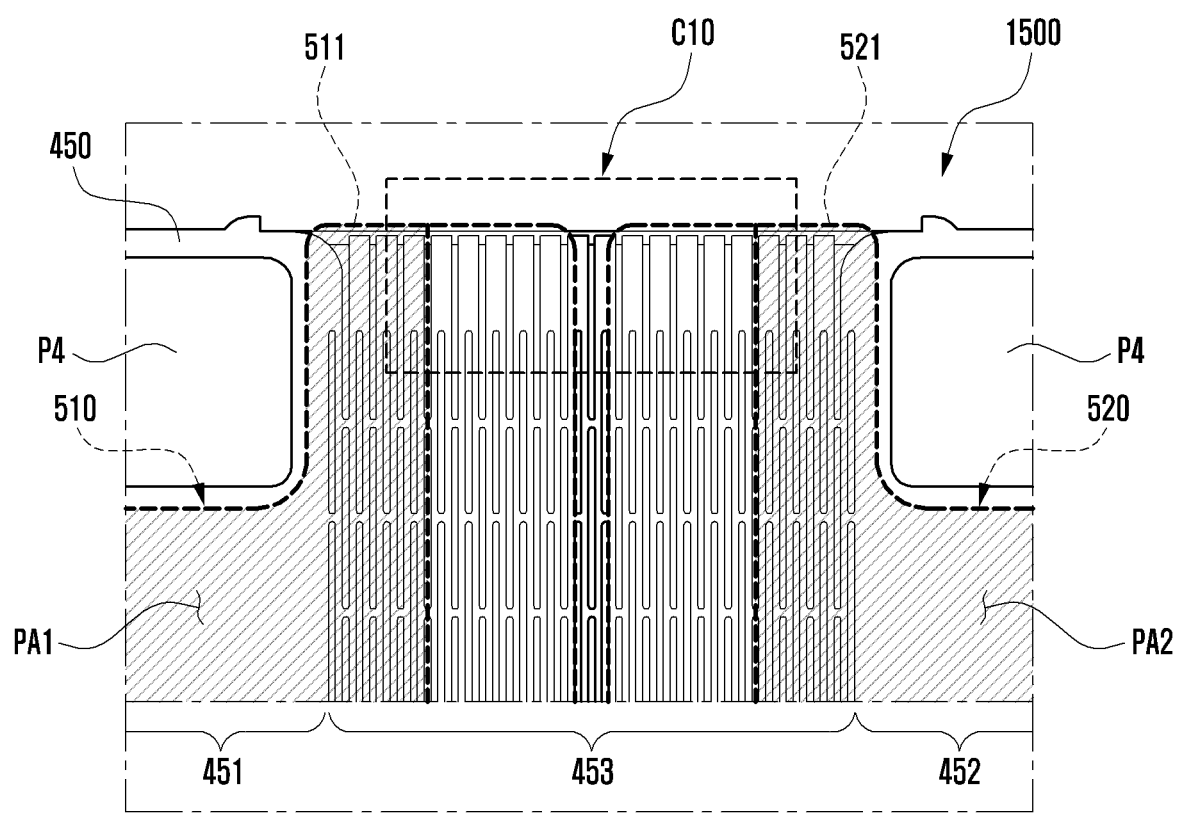
FIGS. 16A and 16B are enlarged views illustrating an area C8 of FIG. 15A according to various embodiments of the disclosure.
Figure 16B:
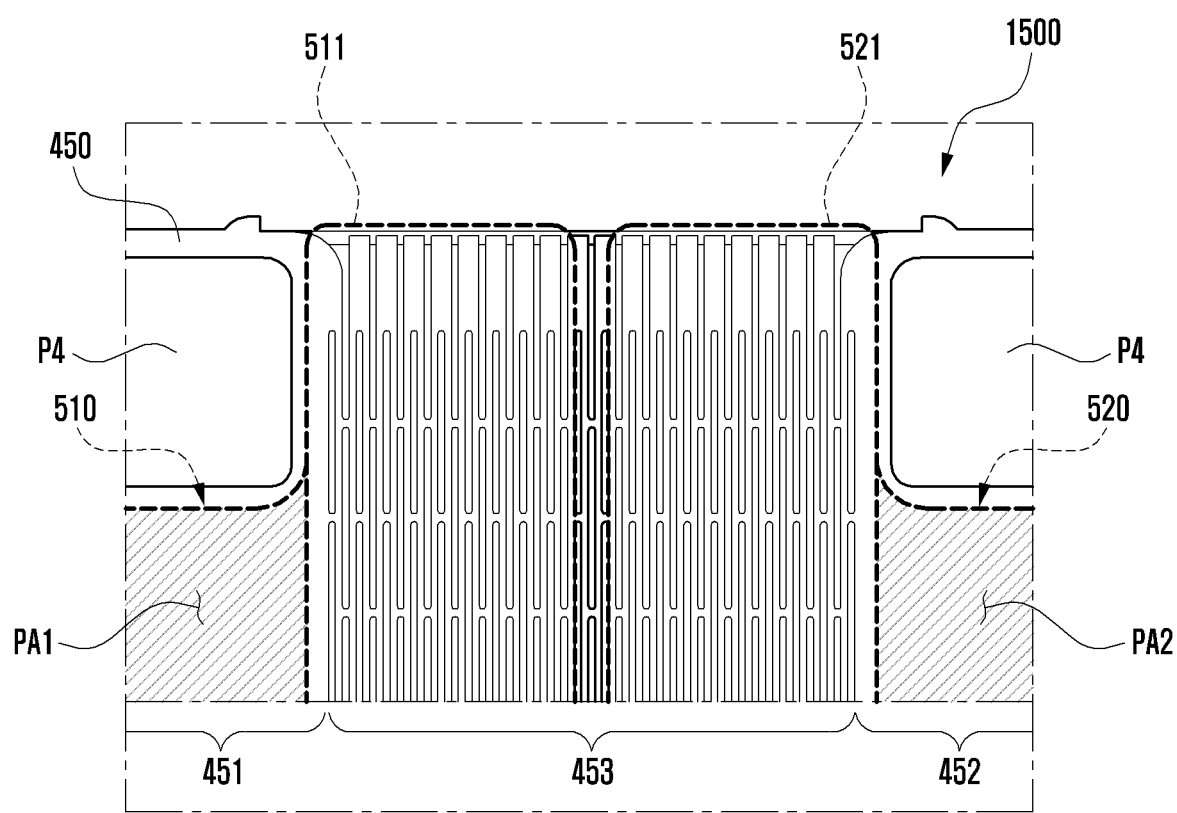

FIGS. 16A and 16B are enlarged views illustrating the area C8 of FIG. 15A according to various embodiments of the disclosure.

According to various embodiments, the first reinforcing plate 510 and the second reinforcing plate 520 may include attachment areas PA1 and PA2, respectively, at least partially attached through an adhesive member at a rear surface of the conductive plate 450.

With reference to FIG. 16A, the first reinforcing plate 510 may be attached to at least a portion of the conductive plate 450 in the first attaching area PA1 through an adhesive member. According to one embodiment, the first attachment area PA1 may include an area extended from at least a portion of the first flat portion 451 of the conductive plate 450 to at least a portion (e.g., the first lower attachment portion 453b of FIG. 13B) of the flexible portion 453. According to an embodiment, the second reinforcing plate 520 may be attached to at least a portion of the conductive plate 450 in the second attaching area PA2 through an adhesive member. According to one embodiment, the second attachment area PA2 may include an area extended from at least a portion of the second flat portion 452 of the conductive plate 450 to at least a portion (e.g., the second lower attachment portion 453c of FIG. 13B) of the flexible portion 453.

With reference to FIG. 16B, the first attachment area PA1 to which the first reinforcing plate 510 is attached may include an area corresponding to at least a portion of the first flat portion 451 except for the flexible portion 453 of the conductive plate 450. According to an embodiment, the second attachment area PA2 to which the second reinforcing plate 520 is attached may include an area corresponding to at least a portion of the second flat portion 452 except for the flexible portion 453 of the conductive plate 450. For example, the first attaching area PA1 and the second attaching area PA2 may at least partially include or may not include the flexible portion 453 according to a bending characteristic at least partially required by the flexible portion 453 of the conductive plate 450.

Figure 17:
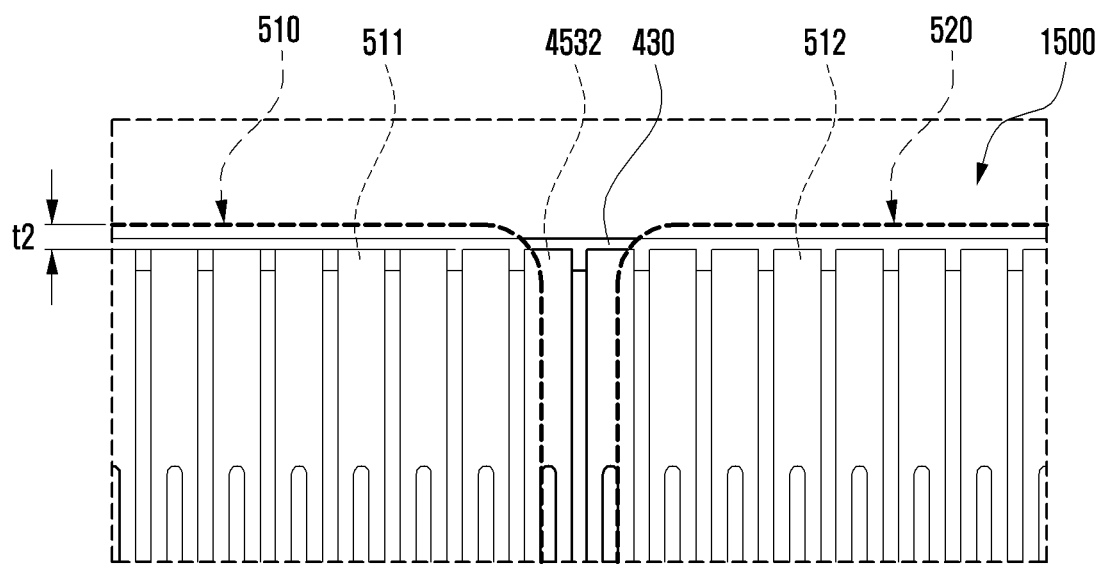
FIG. 17 is an enlarged view illustrating an area C10 of FIG. 16A according to various embodiments of the disclosure.

FIG. 17 is an enlarged view illustrating an area C10 of FIG. 15A according to various embodiments of the disclosure.

With reference to FIG. 17, the first extension portion 511 and the second extension portion 512 of the first reinforcing plate 510, and the third extension portion 521 and the fourth extension portion 522 of the second reinforcement plate 520 may be formed to have a protruding amount t2 protruded further than at least the flexible portion 453 in order to support and protect upper and lower edges of the flexible portion 453 in the third area (e.g., the third area h3 of FIG. 4B) of the display (e.g., the display 400 of FIG. 4B). According to an embodiment, the first extension portion 511 and the second extension portion 512, and the third extension portion 521 and the fourth extension portion 522 of the second reinforcing plate 520 may be extended to protrude further than the display panel 430.

Figure 18:
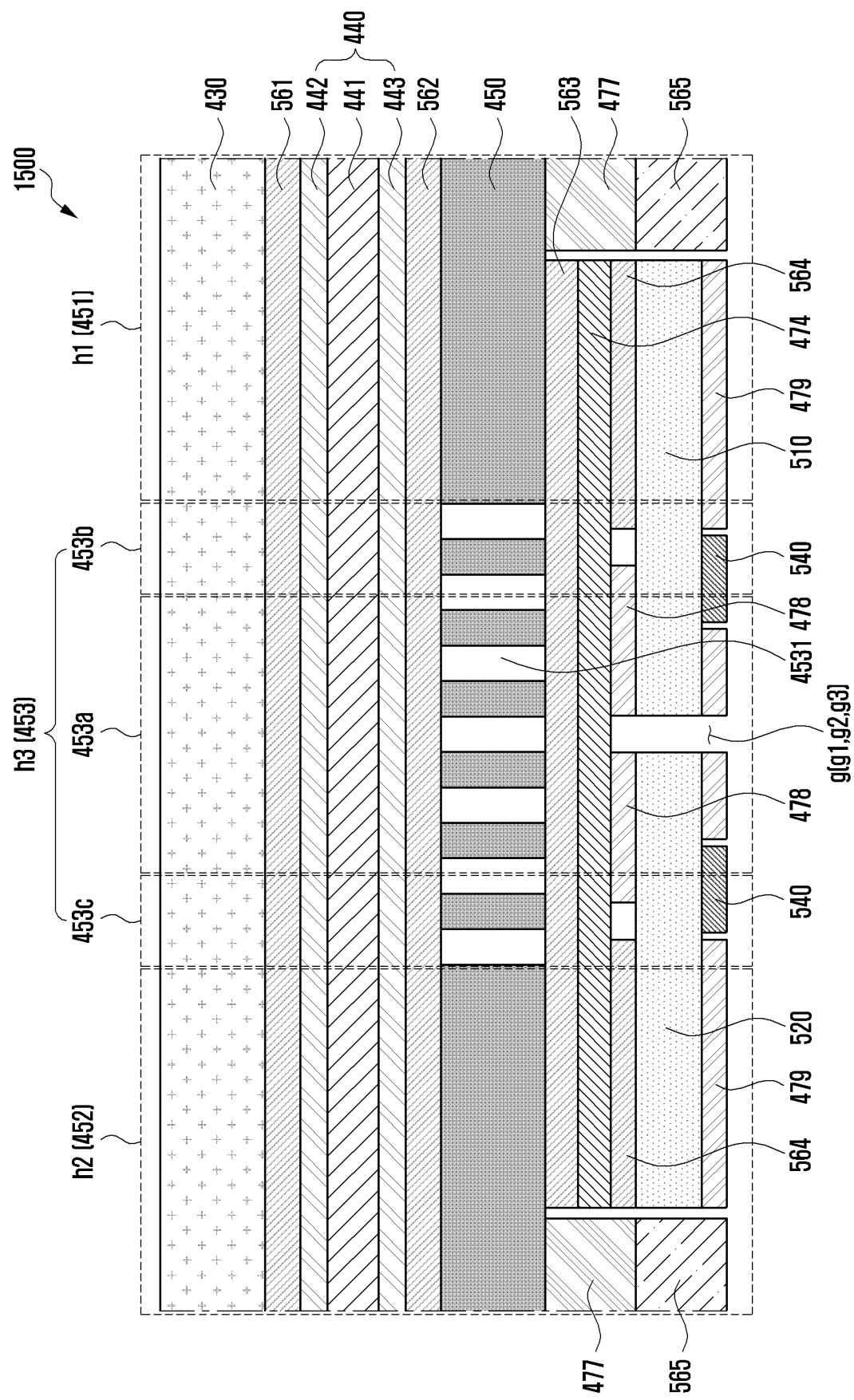
FIGS. 18 and 19 are partial cross-sectional views illustrating a stacking structure of a display according to various embodiments of the disclosure.
Figure 19:
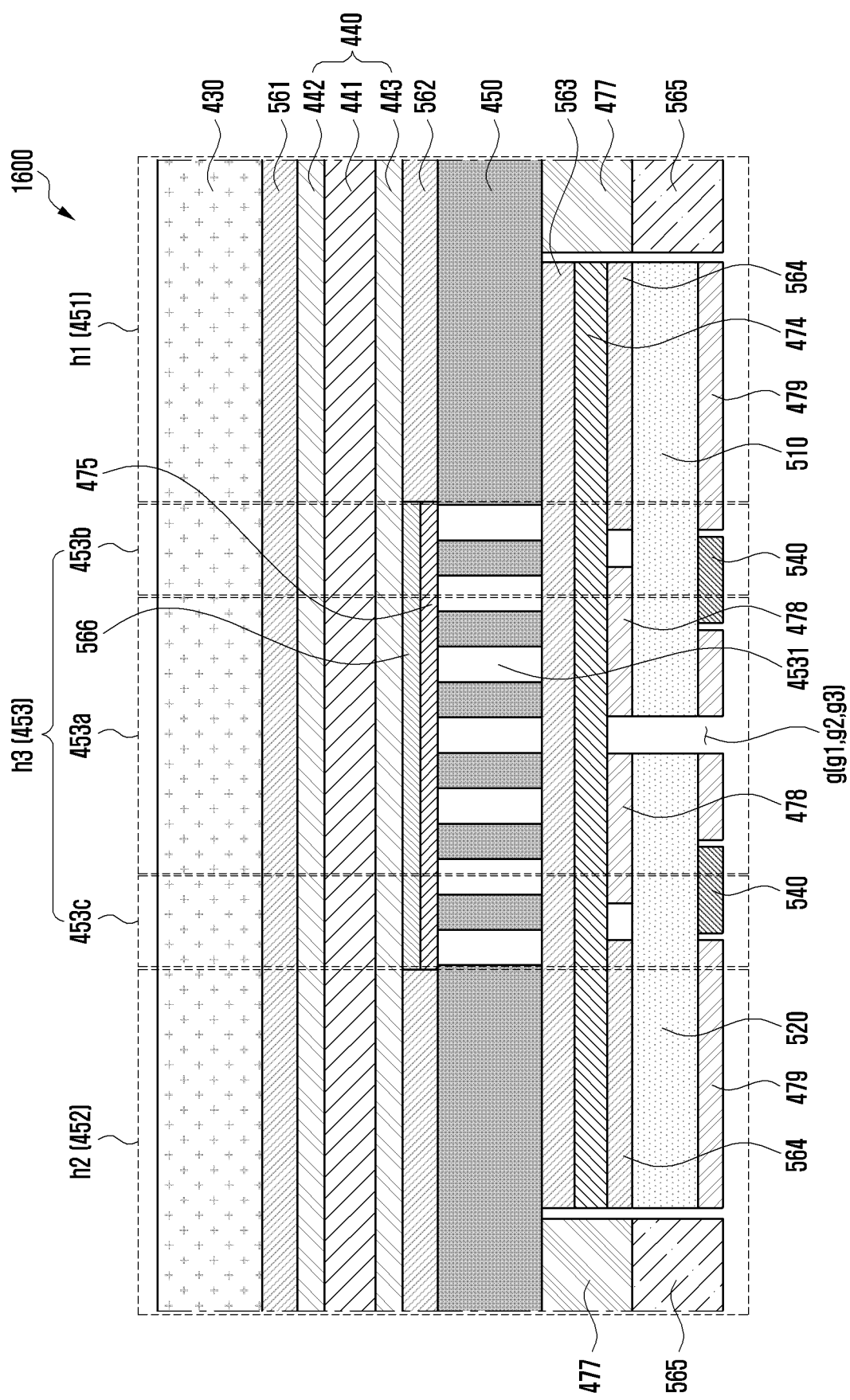

FIGS. 18 and 19 are partial cross-sectional views illustrating stacking structures of displays 1500 and 1600 according to various embodiments of the disclosure.

The displays 1500 and 1600 of FIGS. 18 and 19 may be at least partially similar to the display 130 of FIG. 3 or may include other components of the display.

With reference to FIG. 18, the display 1500 may include a display panel 430, a polymer member 440, a conductive plate 450, a first blocking member 474 (e.g., polymer layer), and a pair of reinforcing plates 510 and 520 sequentially disposed at the display panel 430. According to an embodiment, the display panel 430, the polymer member 440, the conductive plate 450, the first blocking member 474 (e.g., polymer layer), and a pair of reinforcing plates 510 and 520 may be attached to each other through the adhesive members 561, 562, 563, and 564. For example, the adhesive members 561, 562, 563, and 564 may include at least one of an optical clear adhesive (OCA), a pressure sensitive adhesive (PSA), a thermally reactive adhesive, a general adhesive, or a double-sided tape.

According to various embodiments, the conductive plate 450 may include a flexible portion 453 corresponding to the third area h3 of the display 1500 and in which a plurality of openings 4531 are formed. According to an embodiment, the flexible portion 453 may include a bending portion 453a that may be folded and a first lower attachment portion 453b and a second lower attachment portion 453c extended to both sides of the bending portion 453a and connected to the first flat portion 451 and the second flat portion 452, respectively and applied to a stress relaxation section for releasing a concentrated stress according to a folding or unfolding operation of the electronic device.

According to various embodiments, at least one polymer member 440 may include a cushion layer 441 and a first layer 442 (e.g., first polymer layer) and a second layer 443 (e.g., second polymer layer) stacked with the cushion layer 441 interposed therebetween. According to one embodiment, the at least one polymer member 440 may have a stacking structure for blocking inflow of a foreign material through the plurality of openings 4531 formed in the flexible portion 453 of the conductive plate 450 and preventing visibility of a folding boundary area of the display 1500 according to folding and unfolding operations of the electronic device. According to an embodiment, the cushion layer 441 may be made of a material (e.g., sponge or poron) for cushioning. According to an embodiment, the first layer 442 (e.g., first polymer layer) disposed on the cushion layer and the second layer 443 (e.g., second polymer layer) disposed beneath the cushion layer 441 may be made of a material (e.g., TPU) for improving a surface quality (visibility improvement). According to one embodiment, surface roughness (e.g., surface profile) of the first layer 442 (e.g., first polymer layer) and surface roughness of the second layer 443 (e.g., second polymer layer) may be the same or different. For example, in order to improve visibility, surface roughness of the first layer may be lower than that of the second layer 443 (e.g., second polymer layer).

According to various embodiments, the polymer member 440 may be attached to a rear surface of the display panel 430 through the first adhesive member 561. According to an embodiment, the conductive plate 450 may be attached to a rear surface of the polymer member 440 through the second adhesive member 562. According to an embodiment, the first blocking member 474 (e.g., polymer layer) may be attached to a rear surface of the conductive plate 450 through the third adhesive member 563. According to an embodiment, the first blocking member 474 (e.g., polymer layer) may be attached to at least a portion of the first flat portion 451 and the flexible portion 453 of the conductive plate 450 and at least a portion of the second flat portion 452 through the third adhesive member 563. According to an embodiment, the first reinforcing plate 510 and the second reinforcing plate 520 may be at least partially attached through the fourth adhesive member 564 at a rear surface of the first blocking member 474 (e.g., polymer layer). For example, the first reinforcing plate 510 and the second reinforcing plate 520 may be attached to a portion of the first lower attachment portion (e.g., the first lower attachment portion 453b of FIG. 4A), the second lower attachment portion (e.g., the second lower attachment portion 453c of FIG. 4B), the first flat portion 451, and the second flat portion 452 except for the bending portion (e.g., the bending portion 453a of FIG. 4A) of the flexible portion 453 through the fourth adhesive member 564.

According to various embodiments, the conductive plate 450 may include a fifth adhesive member 565 (e.g., double-sided tape or waterproof tape) disposed in an area in which the first reinforcing plate 510 and the second reinforcing plate 520 are not disposed along an edge thereof. According to an embodiment, the display 1500 may be attached to the first housing structure 110 and the second housing structure 120 of the electronic device (e.g., the electronic device 100 of FIG. 3) through the fifth adhesive member 565. According to an embodiment, the display 1500 may include a first step compensation member 477 disposed between the conductive plate 450 and the fifth adhesive member 565 to compensate for a step generated by the third adhesive member 563, the first blocking member 474 (e.g., polymer layer), and the fourth adhesive member 564. According to an embodiment, the display 1500 may further include a second step compensation member 478 disposed between the first blocking member 474 (e.g., polymer layer) and the first reinforcement plate 510 and the second reinforcing plate 520 at a bending portion (e.g., the bending portion 453a of FIG. 4A) of the flexible portion 453 of the conductive plate 450. According to an embodiment, the second step compensation member 478 may be disposed to have the same thickness as that of the fourth adhesive member 564. According to an embodiment, the display 1500 may include a third step compensation member 479 attached to at least a portion of the first reinforcing plate 510 and at least a portion of the second reinforcing plate 520. For example, the third step compensation member 479 may be replaced with an insulating member. According to an embodiment, the display 1500 may further include an additional adhesive member 540 at least partially replaced in an area in which the third step compensation member is disposed.

Because a structure of the display 1600 of FIG. 19 includes substantially the same components as those of the structure of the display 1500 of FIG. 18, the same reference numerals are used for the same components, and a detailed description thereof may be omitted.

With reference to FIG. 19, the display 1600 may further include a second blocking member 475 (e.g., polymer layer) disposed in a position overlapped with at least the flexible portion 453 between the conductive plate 450 and the polymer member 440 when viewed from above the display 1600. According to an embodiment, the second blocking member 475 (e.g., polymer layer) may be attached to a rear surface of the polymer member 440 through a sixth adhesive member 566. According to one embodiment, the second blocking member 475 (e.g., polymer layer) and the sixth adhesive member 566 may be disposed in a manner replaced with a portion in which the second adhesive member 562 is omitted. Therefore, the sum of thicknesses of the second blocking member 475 (e.g., polymer layer) and the sixth adhesive member 566 may be formed to have the same thickness as that of the second adhesive member 562.

FIGS. 20 to 24 are partial cross-sectional views illustrating stacking structures of displays 1700, 1800, 1900, 2000, and 2100 according to various embodiments of the disclosure.

Hereinafter, while describing the drawings on a stacking state, even if the same materials (e.g., adhesive members, insulating members, or step compensating members) disposed at the same layer have disposition configurations separated from each other in the same layer, the materials perform substantially the same functions and thus the same reference numerals may be given thereto.

Figure 20:
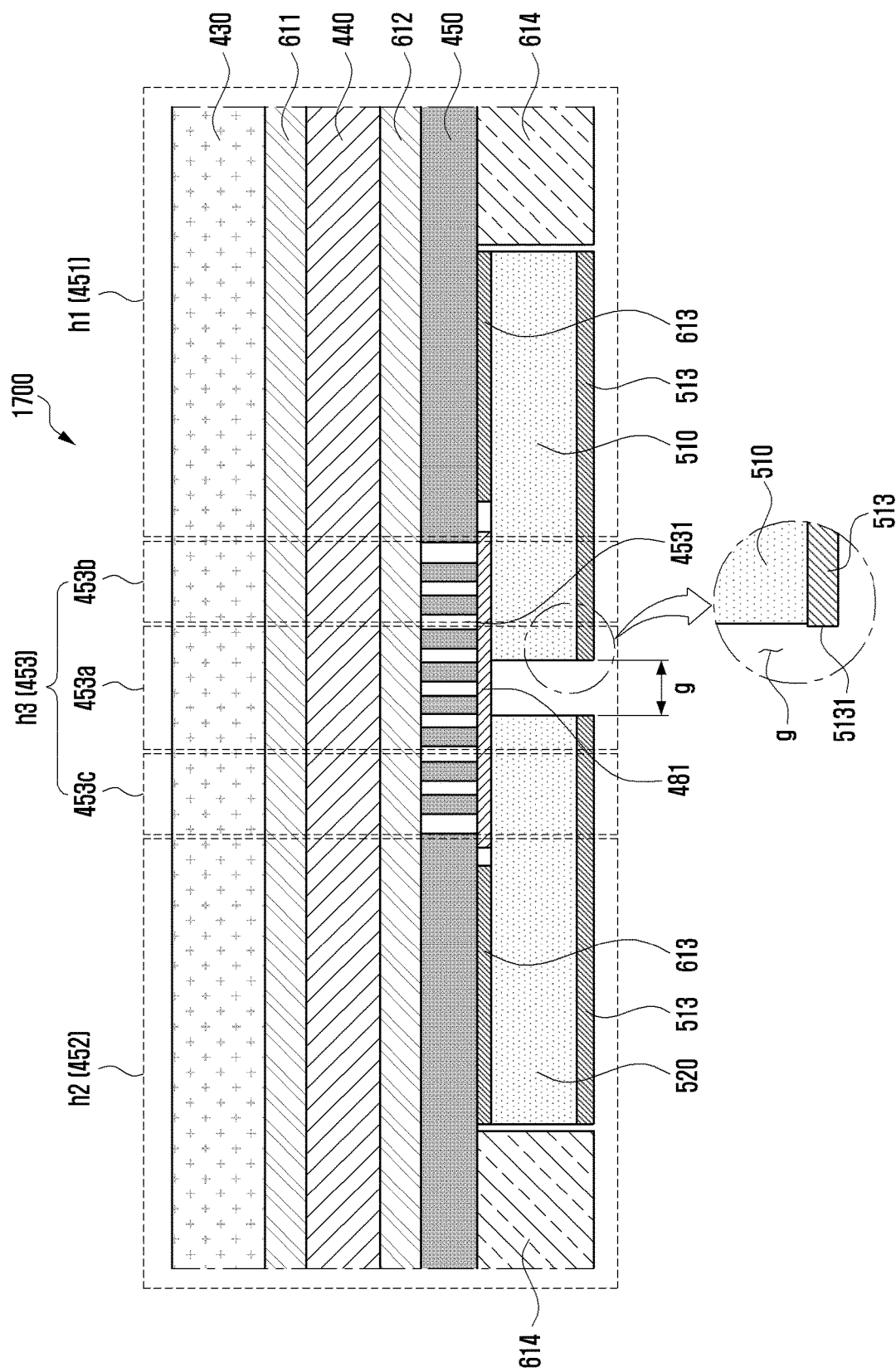
FIGS. 20 to 24 are partial cross-sectional views illustrating a stacking structure of a display according to various embodiments of the disclosure.

With reference to FIG. 20, the display 1700 may include a display panel 430, a polymer member 440, a conductive plate 450, and a pair of reinforcement plates 510 and 520 sequentially disposed in the display panel 430. According to an embodiment, the display panel 430, the polymer member 440, and the conductive plate 450 may be disposed to cross at least a portion of a first surface (e.g., the first surface 111 of FIG. 1) of a first housing structure (e.g., the first housing structure 110 of FIG. 1) and a third surface (e.g., the third surface 121 of FIG. 1) of the second housing structure (e.g., the second housing structure 120 of FIG. 1). According to an embodiment, the display 1700 may include a first area h1, which is a flat area corresponding to the first housing structure 110 of the electronic device (e.g., the electronic device 100 of FIG. 1), a second area h2, which is a flat area corresponding to the second housing structure 120, and a third area h3 facing the hinge structure (e.g., the hinge structure 164 of FIG. 3). According to an embodiment, the first area h1 and the second area h2 of the display 1700 may be configured to be folded or unfolded with respect to each other based on at least a portion of the third area h3. According to an embodiment, the first reinforcing plate 510 may be disposed to face at least a portion of the first flat portion 451 and at least a portion of the flexible portion 453 at the rear surface of the conductive plate 450. According to an embodiment, the second reinforcing plate 520 may face at least a portion of the second flat portion 452 and at least a portion of the flexible portion 453 at the rear surface of the conductive plate 450 and be separately disposed to have a predetermined gap g from the first reinforcing plate 510 at the flexible portion 453.

According to various embodiments, the display panel 430, the polymer member 440, the conductive plate 450, and the pair of reinforcing plates 510 and 520 may be attached to each other through adhesive members 611, 612, and 613. For example, the adhesive members 611, 612, and 613 may include at least one of an optical clear adhesive (OCA), a pressure sensitive adhesive (PSA), a thermally reactive adhesive, a general adhesive, or a double-sided tape. According to an embodiment, the polymer member 440 may be attached to a rear surface of the display panel 430 through the first adhesive member 611. According to an embodiment, the conductive plate 450 may be attached to a rear surface of the polymer member through the second adhesive member 612. According to an embodiment, the first reinforcing plate 510 and the second reinforcing plate 520 may be attached to a rear surface of the conductive plate 450 through the third adhesive member 613.

According to various embodiments, the first reinforcing plate 510 may be disposed in at least a partial area of the first flat portion 451 except for the flexible portion 453 of the conductive plate 450 through the third adhesive member 613. According to one embodiment, the second reinforcing plate 520 may be disposed in at least a partial area of the second flat portion 452 except for the flexible portion 453 of the conductive plate 450 through the third adhesive member 613. According to one embodiment, the conductive plate 450 may include a fourth adhesive member 614 (e.g., double-sided tape or waterproof tape) disposed in an area in which the first reinforcing plate 510 and the second reinforcing plate 520 are not disposed along the edge. According to an embodiment, the display 1700 may be attached to a support member assembly (e.g., the support member assembly 160 of FIG. 3) of the electronic device (e.g., the electronic device 100 of FIG. 3) through the fourth adhesive member 614.

According to various embodiments, a third adhesive member 613 may not be disposed between the flexible portion 453 of the conductive plate 450 included in the third area h3, and the first reinforcing plate 510 and the second reinforcing plate 520. This may be to prevent degradation of bendability caused when the third adhesive member 613 enters into the plurality of openings 4531 formed in the flexible portion.

According to various embodiments, the display 1700 may further include a blocking member 481 (e.g., polymer layer) disposed between the first reinforcing plate 510 and the second reinforcing plate 520 and the conductive plate 450 in the third area h3. According to one embodiment, the blocking member 481 (e.g., polymer layer) may prevent a foreign material from entering into the opening 4531 through a gap g and compensate for a thickness of the third adhesive member 613 disposed between the first reinforcing plate 510 and the second reinforcing plate 520 and the conductive plate 450. According to an embodiment, the blocking member 481 (e.g., polymer layer) may include a thermoplastic polyurethane (TPU), silicone, or sponge having the same thickness as that of the third adhesive member 613. According to an embodiment, the blocking member 481 (e.g., polymer layer) may be attached to the flexible portion 453 of the conductive plate 450 or may be attached to a portion of the first reinforcing plate 510, a portion of the second reinforcing plate 520, or both sides thereof.

According to various embodiments, the display 1700 may further include an insulating member 513 attached to at least a portion of the first reinforcing plate 510 and at least a portion of the second reinforcing plate 520. For example, through the insulating member 513, an electric shock accident that may occur when the first reinforcing plate 510 and the second reinforcing plate 520 of a conductive material directly contact a support member assembly (e.g., the support member assembly 160 of FIG. 3) of the conductive material may be prevented. According to an embodiment, the insulating member 513 may include at least one of an insulating film, an insulating spray, an insulating cushion, or an insulating tape disposed at a rear surface of the first reinforcing plate 510 and the second reinforcing plate 520. According to an embodiment, by configuring a thickness of a fourth adhesive member 614 disposed at a rear surface of the conductive plate 450 to be the same as the sum of a thickness of the third adhesive member 613, a thickness of the first reinforcing plate 510, and a thickness of the insulating member 513, it is possible to prevent a step problem that may occur with the fourth adhesive member 614 at a rear surface of the first reinforcing plate 510 and/or the second reinforcing plate 520.

According to various embodiments, by disposing the insulating member 513 to have a protrusion 5131 attached to a rear surfaces of the first reinforcing plate 510 and the second reinforcing plate 520 and protruded at least partially in a gap g direction, it is possible to prevent an electric shock accident that may occur when the ends of the first reinforcing plate 510 and the second reinforcing plate 520 are exposed to the outside by a folding operation of the display 1700.

Figure 21:
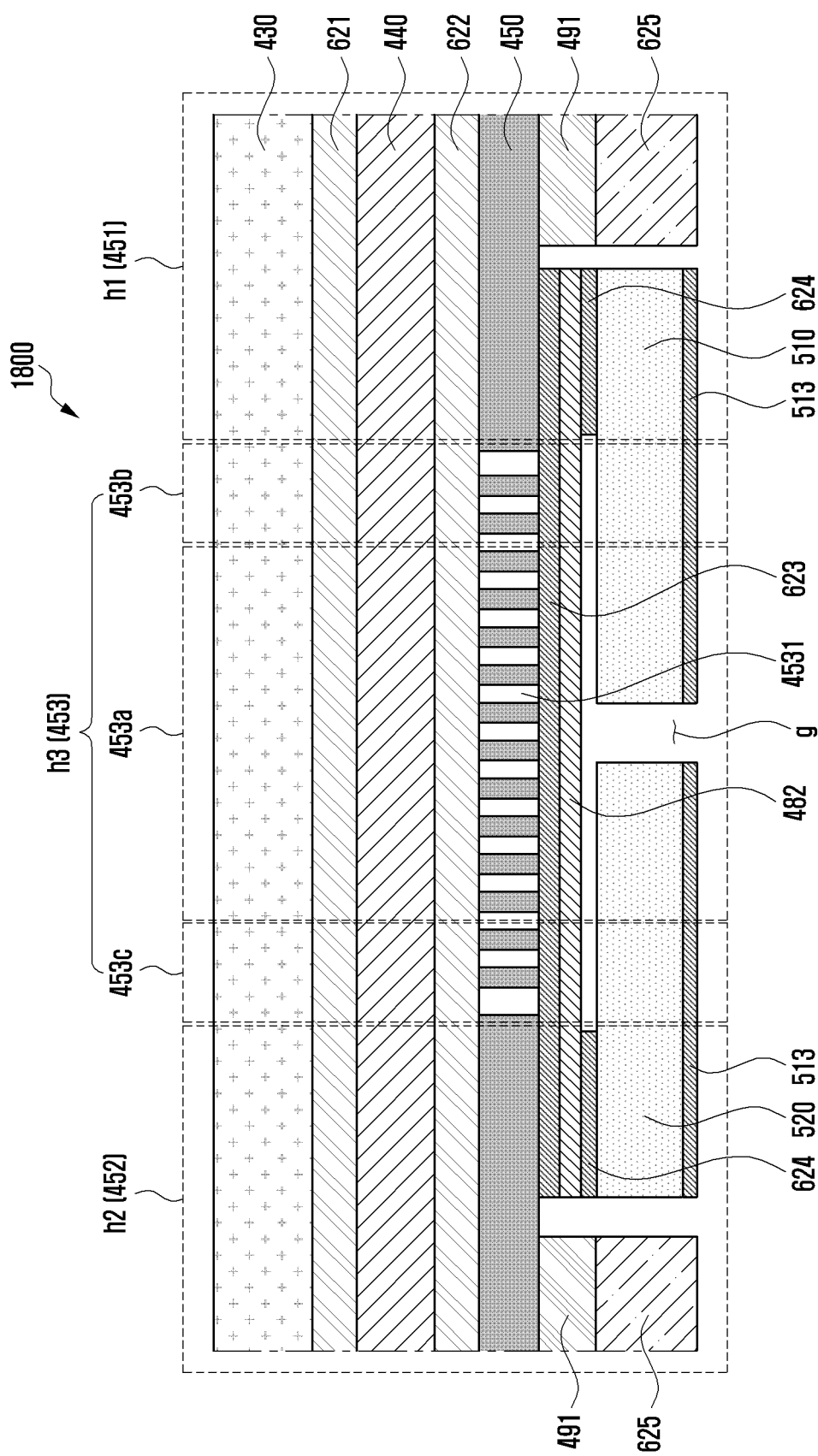

With reference to FIG. 21, the display 1800 may include a display panel 430, a polymer member 440, a conductive plate 450, a first blocking member 482 (e.g., polymer layer), and a pair of reinforcing plates 510 and 520 sequentially disposed in the display panel 430. According to an embodiment, the display panel 430, the polymer member 440, the conductive plate 450, the first blocking member 482 (e.g., polymer layer), and the pair of reinforcing plates 510 and 520 may be attached to each other through adhesive member 621, 622, 623, and 624. For example, the adhesive members 621, 622, 623, and 624 may include at least one of an optical clear adhesive (OCA), a pressure sensitive adhesive (PSA), a thermally reactive adhesive, a general adhesive, or a double-sided tape. According to an embodiment, the polymer member 440 may be attached to a rear surface of the display panel 430 through the first adhesive member 621. According to one embodiment, the conductive plate 450 may be attached to a rear surface of the polymer member through the second adhesive member 622. According to an embodiment, the first blocking member 482 (e.g., polymer layer) may be attached to a rear surface of the conductive plate 450 through the third adhesive member 623. According to an embodiment, the first blocking member 482 (e.g., polymer layer) may be attached to the flexible portion 453 of the conductive plate 450, at least a portion of the first flat portion 451, and at least a portion of the second flat portion 452 through the third adhesive member 623. According to an embodiment, the first reinforcing plate 510 and the second reinforcing plate 520 may be attached at least partially through the fourth adhesive member 624 at a rear surface of the first blocking member 482 (e.g., polymer layer). For example, the first reinforcing plate 510 and the second reinforcing plate 520 may be attached to a portion of the first flat portion 451 and a portion of the second flat portion 452 except for the flexible portion 453 of the conductive plate 450 through the fourth adhesive member 624.

According to various embodiments, the conductive plate 450 may include a fifth adhesive member 625 (e.g., double-sided tape or waterproof tape) disposed in an area in which the first reinforcing plate 510 and the second reinforcing plate 520 are not disposed along an edge thereof. According to an embodiment, the display 1800 may be attached to the support member assembly (e.g., the support member assembly 160 of FIG. 3) of the electronic device (e.g., the electronic device 100 of FIG. 3) through the fifth adhesive member 625. According to one embodiment, the display 1800 may include a first step compensation member 491 disposed between the conductive plate 450 and the fifth adhesive member 625 to compensate for a step generated by the third adhesive member 623, the first blocking member 482 (e.g., polymer layer), the fourth adhesive member 624.

According to various embodiments, the display 1800 may include an insulating member 513 attached to at least a portion of the first reinforcing plate 510 and at least a portion of the second reinforcing plate 520. For example, through the insulating member 513, an electric shock accident may be prevented that may be caused when the first reinforcing plate 510 and the second reinforcing plate 520 of a conductive material directly contact a support member assembly (e.g., the support member assembly 160 of FIG. 3) of a conductive material.

Figure 22:
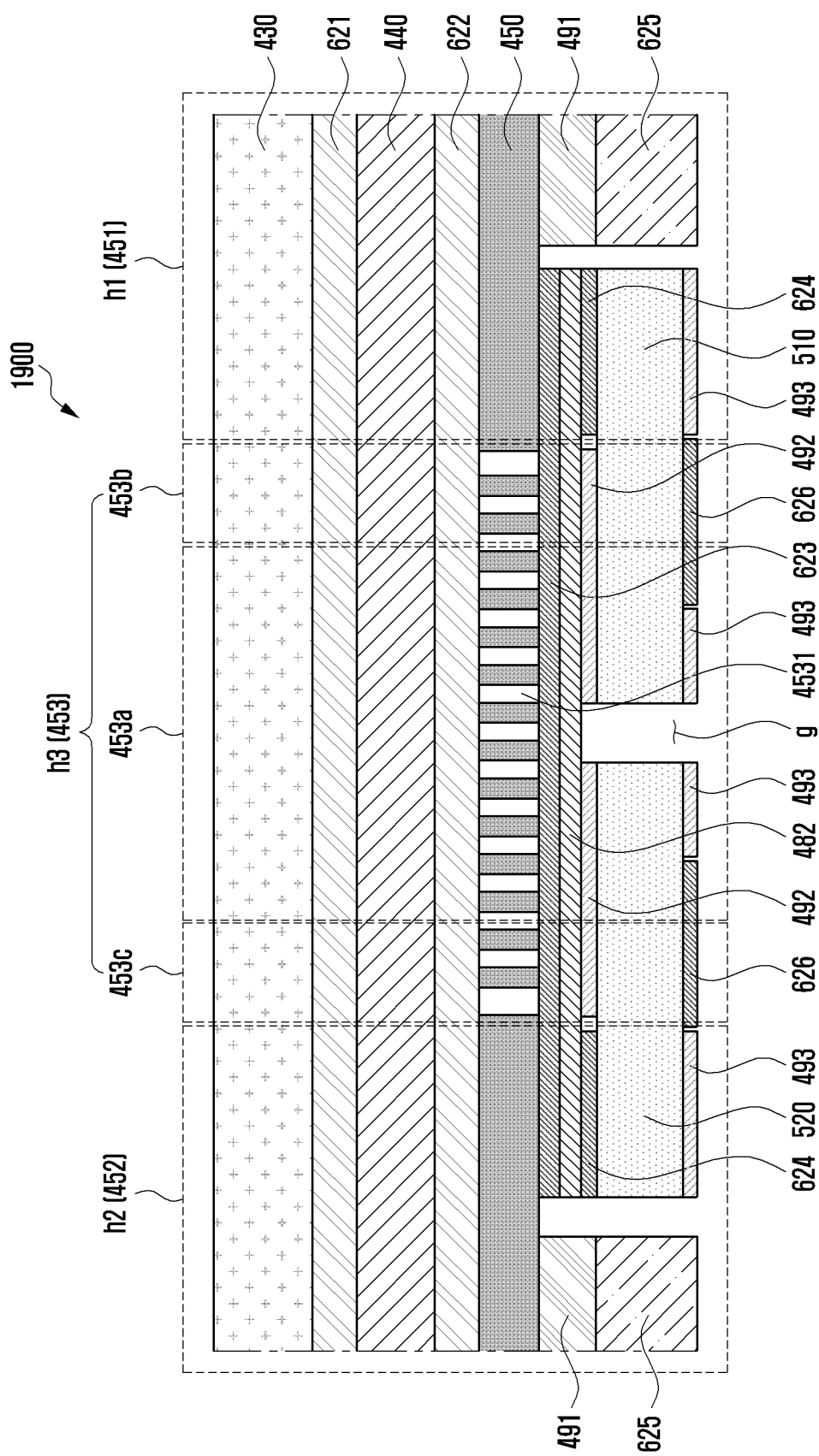

Because a structure of the display 1900 of FIG. 22 includes substantially the same components as those of the structure of the display 1800 of FIG. 21, the same reference numerals are used for the same components, and a detailed description thereof may be omitted.

With reference to FIG. 22, the display 1900 may further include a second step compensation member 492 disposed between the first blocking member 482 (e.g., polymer layer), the first reinforcing plate 510, and the second reinforcing plate 520 in the flexible portion 453 of the conductive plate 450. According to one embodiment, the second step compensation member 492 may be disposed to have the same thickness as that of the fourth adhesive member 624.

According to various embodiments, the display 1900 may further include a sixth adhesive member 626 disposed at least partially at a rear surfaces of the first reinforcing plate 510 and the second reinforcing plate 520 to reinforce an adhesive force. According to one embodiment, the sixth adhesive member 626 may be made of an insulating material. According to an embodiment, the display 1900 may further include a third step compensation member 493 disposed to compensate for a thickness of the sixth adhesive member 626 in an area in which the sixth adhesive member 626 is not disposed in the rear surfaces of the first reinforcing plate 510 and the second reinforcing plate 520.

Figure 23:
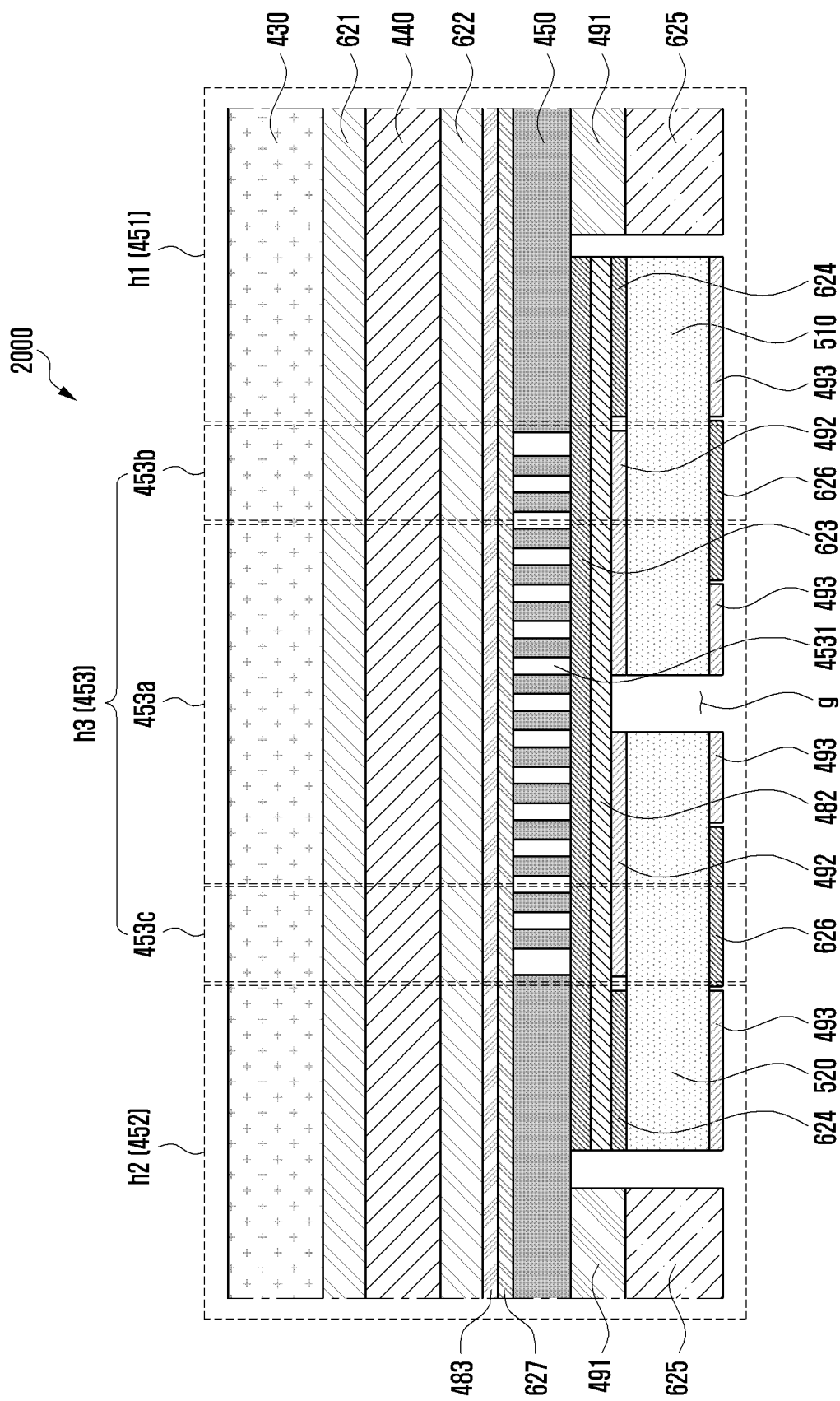

Because a structure of a display 2000 of FIG. 23 includes substantially the same components as those of the structure of the display 1900 of FIG. 22, the same reference numerals are used for the same components, and a detailed description thereof may be omitted.

With reference to FIG. 23, the display 2000 may further include a second blocking member 483 disposed between the polymer member 440 and the conductive plate 450. According to an embodiment, the second blocking member 483 may be attached to the conductive plate 450 through a seventh adhesive member 627. According to one embodiment, the second blocking member 483 may include a flexible portion 453 of the conductive plate 450 and be disposed to extend to at least a portion of the first flat portion 451 and at least a portion of the second flat portion 452.

Figure 24:
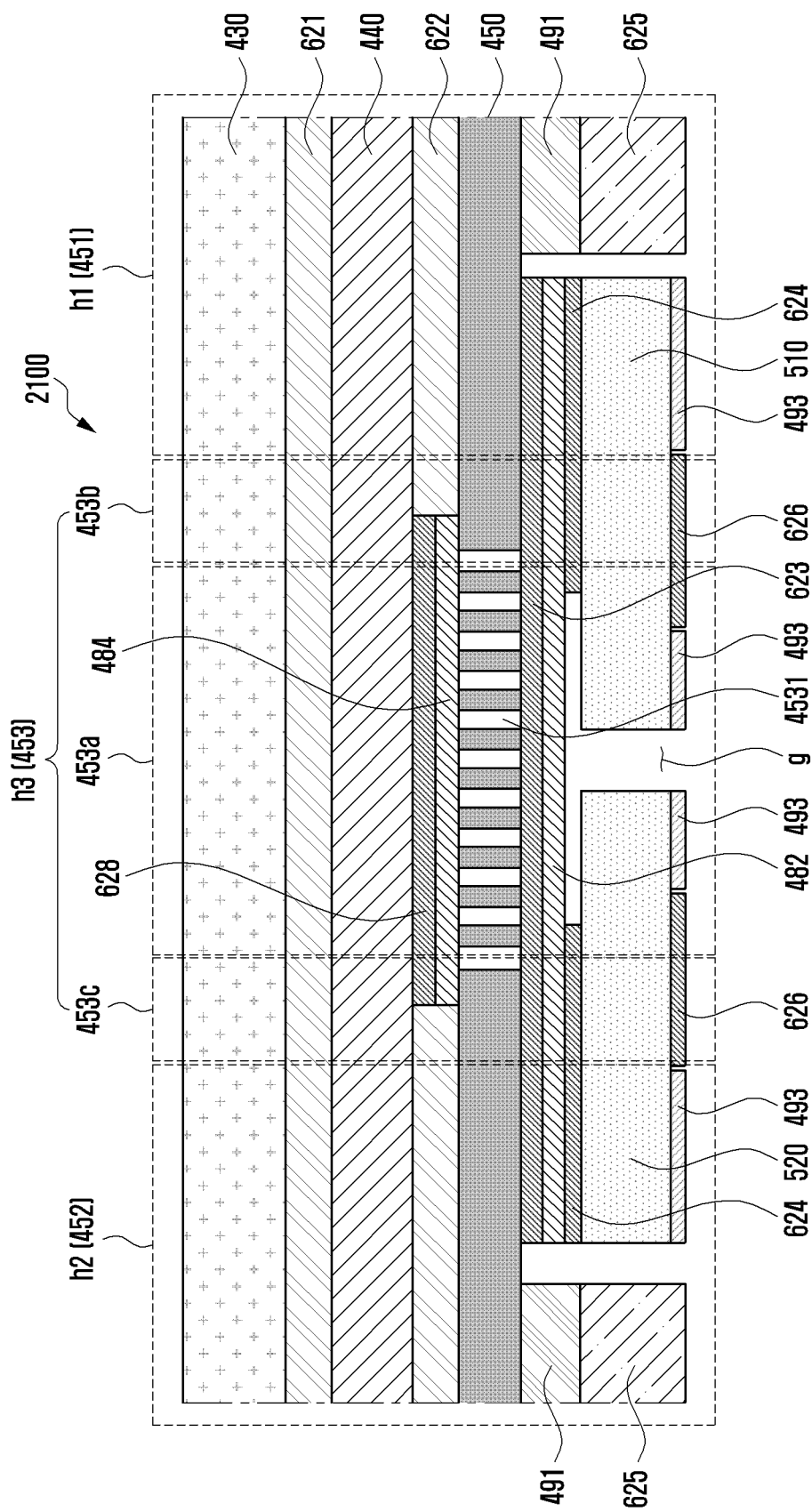

Because a structure of the display 2100 of FIG. 24 includes substantially the same components as those of the structure of the display 2000 of FIG. 23, the same reference numerals are used for the same components, and a detailed description thereof may be omitted.

With reference to FIG. 24, in the display 2100, a second step compensating member 492 of the display 2000 of FIG. 23 is omitted, and a fourth adhesive member 624 may be extended to at least a portion of the flexible portion 453.

According to various embodiments, the display 2000 may include a third blocking member 484 disposed in the flexible portion 453 in which the second adhesive member 622 is omitted, instead of the second blocking member 483 of FIG. 23. According to an embodiment, the third blocking member 484 may be attached to the polymer member 440 through an eighth adhesive member 628. According to one embodiment, the second adhesive member 622 may be formed in the same thickness as the sum of the third blocking member 484 and the eighth adhesive member 628 to prevent a step from generating.

According to various embodiments of the disclosure, the blocking members 474, 475, 481, 482, 483, and 484 form a polymer layer and may include at least one of TPU, silicone, rubber, or urethane.

Figure 25:
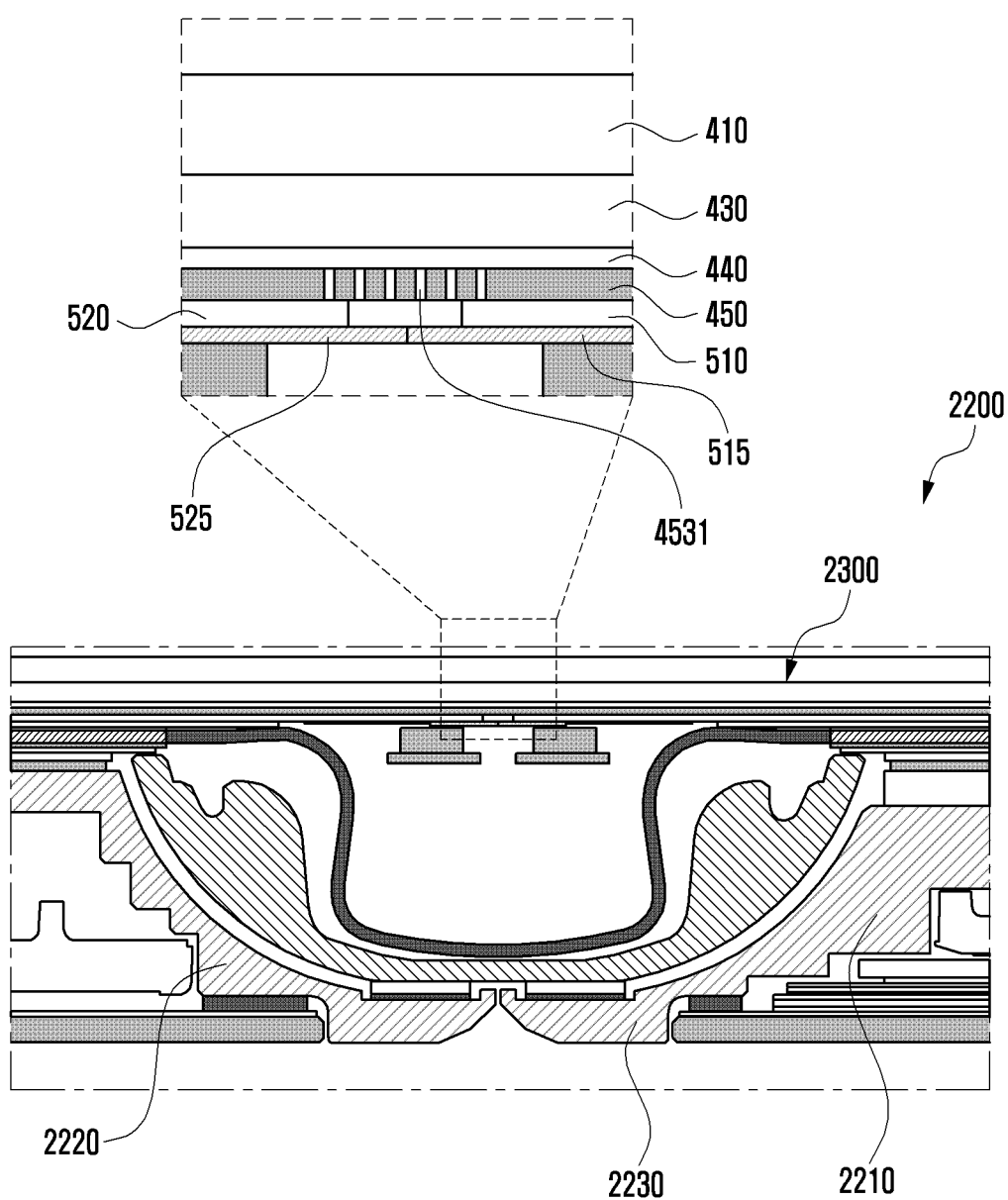
FIG. 25 is a partial cross-sectional view of an electronic device illustrating a hinge portion according to various embodiments of the disclosure.

FIG. 25 is a partial cross-sectional view illustrating a hinge portion of an electronic device 2200 according to various embodiments of the disclosure.

An electronic device 2200 of FIG. 25 may be at least partially similar to the electronic device 100 of FIG. 1 or may further include another component of the electronic device.

With reference to FIG. 25, the electronic device 2200 may include a hinge structure 2230, a first housing structure 2210 connected to the hinge structure 2230, and a second housing structure 2220 connected to the hinge structure 2230. According to an embodiment, the electronic device 2200 may include a display 2300 disposed through the first housing structure 2210, the hinge structure 2230, and the second housing structure 2220. According to an embodiment, the display 2300 may include a window 410, display panel 430, polymer member 440, conductive plate 450, first reinforcing plate 510, and second reinforcing plate 520 sequentially disposed at the rear surface of the window 410, as described above. According to one embodiment, the first reinforcing plate 510 and the second reinforcing plate 520 may have a gap (e.g., the gap g of FIG. 20) with respect to each other in order to receive folding and unfolding operations of the first housing structure 2210 and the second housing structure 2220. According to one embodiment, the gap may be a path in which a foreign material enters from the outside into an opening 4531 of the conductive plate 450.

According to an exemplary embodiment of the disclosure, the first reinforcing plate 510 may include a first flexible member 515 disposed to extend in a gap g direction. According to one embodiment, the second reinforcing plate 520 may include a second flexible member 525 disposed to extend in a direction of a gap g. According to one embodiment, the first flexible member 515 and the second flexible member 525 may include a film member having elasticity disposed at the first reinforcing plate 510 and the second reinforcing plate 520, respectively. Therefore, in an unfolded state of the electronic device 2200, the first flexible member 515 and the second flexible member 525 face to contact each other or are disposed to at least partially overlap with each other to close the gap g from the outside, thereby preventing inflow of a foreign material into the opening 4531. In another embodiment, in a state where the electronic device 2200 is folded, the first flexible member 515 and the second flexible member 525 may be flexibly separated according to the operation of the first reinforcing plate 510 and the second reinforcing plate 520.

According to various embodiments, an electronic device (e.g., the electronic device 100 of FIG. 3) may include a hinge module (e.g., the hinge structure 164 of FIG. 3); a first housing (e.g., the first housing structure 110 of FIG. 14A) connected to the hinge module; a second housing (e.g., the second housing structure 120 of FIG. 14A) connected to the hinge module so as to fold with respect to the first housing; and a flexible display (e.g., the display 1400 of FIG. 14A) disposed to receive support of at least a portion of the second housing from at least a portion of the first housing through the hinge module, wherein the flexible display includes a display panel (e.g., the display panel 430 of FIG. 14A); at least one polymer member (e.g., the polymer member 440 of FIG. 14A) disposed at a rear surface of the display panel; and a conductive plate (e.g., the conductive plate 450 of FIG. 14A) including a first flat portion (e.g., the first flat portion 451 of FIG. 14A) disposed at a rear surface of the polymer member and facing the first housing, a second flat portion (e.g., the second flat portion 452 of FIG. 14A) facing the second housing, and a flexible portion (e.g., the flexible portion 453 of FIG. 14A) configured to integrally connect the first flat portion and the second flat portion and formed to be bendable through a plurality of openings (e.g., the openings 4531 of FIG. 14A) spaced apart from each other, wherein the flexible portion includes a bending portion (e.g., the bending portion 453a of FIG. 14A) configured to be folded together with the display; a first lower attachment portion (e.g., the first lower attachment portion 453b of FIG. 14A) extended from the bending portion to the first flat portion and attached to the first housing together with at least a portion of the first flat portion through an adhesive member; and a second lower attachment portion (e.g., the second lower attachment portion 453c of FIG. 14A) extended from the bending portion to the second flat portion and attached to the second housing together with at least a portion of the second flat portion through the adhesive member.

According to various embodiments, the electronic device may further include a blocking member (e.g., the blocking member 475 of FIG. 14A) (e.g., polymer layer) disposed between the conductive plate and the first housing and the second housing to overlap with at least the flexible portion when viewed from above the display.

According to various embodiments, the at least one polymer member may include a cushion layer (e.g., the cushion layer 441 of FIG. 14A), a first layer (e.g., the first layer 442 of FIG. 14A) (e.g., first polymer layer) disposed between the cushion layer and the display panel, and a second layer (e.g., the second layer 443 of FIG. 14A) (e.g., second polymer layer) disposed between the cushion layer and the conductive plate, and wherein roughness of the first layer may be lower than that of the second layer.

According to various embodiments, the flexible portion may include a rigid reinforcement area (e.g., the rigid reinforcement areas C7 and C8 of FIG. 13A) having a predetermined area from upper and lower edges.

According to various embodiments, the rigid reinforcement area may be formed at least partially through omission of at least one opening of the plurality of openings.

According to various embodiments, the flexible portion may have at least partially different bending characteristics.

According to various embodiments, the bending characteristic may be determined through a change in disposition density in which the plurality of openings is disposed.

According to various embodiments, the plurality of openings may be disposed in a direction perpendicular to a longitudinal direction of the flexible portion such that the disposition density increases as advancing from edges to central portions near the first flat portion and the second flat portion.

According to various embodiments, the plurality of openings may be disposed in a first direction corresponding to a longitudinal direction of the flexible portion and a second direction perpendicular to the first direction, and at least some of the plurality of openings may be disposed to have at least partially different lengths in the first direction.

According to various embodiments, the plurality of openings may be formed such that the length becomes gradually longer or shorter in the first direction and/or the second direction.

According to various embodiments, the plurality of openings may have the same width in a direction perpendicular to a longitudinal direction of the flexible portion.

According to various embodiments, the electronic device may further include a filling member (e.g., the filling member 460 of FIG. 11B) filled in the plurality of openings.

According to various embodiments, the electronic device may further include a support piece protruded further than an edge of the display along an edge of the flexible portion in a length including at least the flexible portion when viewed from above the display. According to various embodiments, the electronic device may further include a first reinforcing plate (e.g., the first reinforcing plate 510 of FIG. 15A) disposed between the conductive plate and the first housing and disposed to face at least a portion of the first flat portion and the flexible portion; and a second reinforcing plate (e.g., the second reinforcing plate 520 of FIG. 15A) disposed between the conductive plate and the second housing and facing at least a portion of the second flat portion and the flexible portion and spaced apart from the first reinforcing plate to have a gap.

According to various embodiments, an electronic device (e.g., the electronic device 100 of FIG. 3) may include a hinge module (e.g., the hinge structure 164 of FIG. 3) and a first housing (e.g., the first housing structure 110 of FIG. 1) connected to the hinge module; a second housing (e.g., the second housing structure 120 of FIG. 1) connected to the hinge module so as to fold with respect to the first housing; and a flexible display (e.g., the display 1500 of FIG. 18) disposed to receive support of at least a portion of the second housing from at least a portion of the first housing through the hinge module, wherein the flexible display includes a display panel (e.g., the display panel 430 of FIG. 18); at least one polymer member (e.g., the polymer member 440 of FIG. 18) disposed at a rear surface of the display panel; a conductive plate (e.g., the conductive plate 450 of FIG. 18) including a first flat portion (e.g., the first flat portion 451 of FIGS. 8A to 8C) disposed at a rear surface of the polymer member and facing the first housing, a second flat portion (e.g., the second flat portion 452 of FIGS. 8A to 8C) facing the second housing, and a flexible portion (e.g., the flexible portion 453 of FIG. 18) configured to integrally connect the first flat portion and the second flat portion and formed to be bendable through a plurality of openings (e.g., the openings 4531 of FIG. 18) spaced apart from each other; a first reinforcing plate (e.g., the first reinforcing plate 510 of FIG. 18) disposed at a rear surface of the conductive plate and disposed to face at least a portion of the first flat portion and the flexible portion; and a second reinforcing plate (e.g., the second reinforcing plate 520 of FIG. 18) disposed at a rear surface of the conductive plate and facing at least a portion of the second flat portion and the flexible portion and spaced apart from the first reinforcing plate to have a gap; wherein the flexible portion includes a bending portion (e.g., the bending portion 453a of FIG. 14A) configured to be folded together with the display; a first lower attachment portion (e.g., the first lower attachment portion 453b of FIG. 14A) extended from the bending portion to the first flat portion and attached to the first reinforcing plate together with at least a portion of the first flat portion through an adhesive member; and a second lower attachment portion (e.g., the second lower attachment portion 453c of FIG. 14A) extended from the bending portion to the second flat portion and attached to the second reinforcing plate together with at least a portion of the second flat portion through the adhesive member.

According to various embodiments, the electronic device may further include a first blocking member (e.g., the first blocking member 474 of FIG. 18) (e.g., polymer layer) disposed between the conductive plate, the first reinforcing plate, and the second reinforcing plate to overlap with at least the flexible portion when viewed from above the display.

According to various embodiments, the electronic device may further include a second blocking member (e.g., the second blocking member 475 of FIG. 19) (e.g., polymer layer) disposed between the conductive plate and the at least one polymer member so as to overlap with at least the flexible portion when viewed from above the display.

According to various embodiments, the gap may be disposed to have at least partially different intervals.

According to various embodiments, an electronic device (e.g., the electronic device 100 of FIG. 3) may include a hinge module (e.g., the hinge structure 164 of FIG. 3); a first housing (e.g., the first housing structure 110 of FIG. 14A) connected to the hinge module; a second housing (e.g., the second housing structure 120 of FIG. 14A) connected to the hinge module so as to fold with respect to the first housing; and a flexible display (e.g., the display 1400 of FIG. 14A) disposed to receive support of at least a portion of the second housing from at least a portion of the first housing through the hinge module, wherein the flexible display includes a display panel (e.g., the display 1400 of FIG. 14A); at least one polymer member (e.g., the polymer member 440 of FIG. 14A) disposed at a rear surface of the display panel; and a conductive plate (e.g., the conductive plate 450 of FIG. 14A) including a first flat portion (e.g., the first flat portion 451 of FIG. 14A) disposed at a rear surface of the polymer member and facing the first housing, a second flat portion (e.g., the second flat portion 452 of FIG. 14A) facing the second housing, and a flexible portion (e.g., the flexible portion 453 of FIG. 14A) configured to integrally connect the first flat portion and the second flat portion and formed to be bendable through a plurality of openings (e.g., the openings 4531 of FIG. 14A) spaced apart from each other, wherein the flexible portion includes a rigid reinforcement area having a predetermined area from upper and lower edges.

According to various embodiments, the rigid reinforcement area may be formed at least partially through omission of at least one opening of the plurality of openings.

According to various embodiments, a mobile communication device (e.g., the electronic device 100 of FIG. 3) include a housing including a first housing portion (e.g., the first housing structure 110 of FIG. 14A) and a second housing portion (e.g., the second housing structure 120 of FIG. 14A); a flexible display (e.g., the display panel 430 of FIG. 14A) received in the first housing portion and the second housing portion, wherein the flexible display includes a first display area (e.g., an area corresponding to the bending portion 453a of FIG. 14A) that may be bent as the housing is folded, and a second display area (e.g., an area corresponding to the first planar portion 451, the second planar portion 452, the first lower attachment portion 453b, and the second lower attachment portion 453c of FIG. 14A) maintained in a flat surface in a state in which the housing is folded; and a plate (e.g., the conductive plate 450 of FIG. 14A) received in the housing, positioned under the flexible display and in which a pattern (e.g., a plurality of openings 4531) having elasticity is formed, wherein a first pattern portion (e.g., the bending portion 453a of FIG. 14A) of the pattern is positioned under the first display area, and a second pattern portion (e.g., the first lower attachment portion 453b and the second lower attachment portion 453c of FIG. 14A) adjacent to the first pattern portion of the pattern is positioned under a portion adjacent to the first display area among the second display area.

According to various embodiments, the second pattern portion may include a first portion (e.g., the first lower attachment portion 453b of FIG. 14A) formed in a first direction with respect to the first pattern portion, and a second portion (e.g., the second lower attachment portion 453c of FIG. 14B) formed in a second direction opposite to the first direction with respect to the first pattern portion, wherein the flexible display may include a first reinforcement plate (e.g., the first reinforcement plate 510 of FIG. 18) positioned between the first portion and the first housing portion; and a second reinforcement plate (e.g., the second reinforcement plate 520 of FIG. 18) spaced apart from the first reinforcement plate and having at least a portion positioned between the second portion and the second housing portion.

According to various embodiments, the mobile communication device may further include at least one first polymer layer (e.g., the first layer 442 and the second layer 443 of FIG. 18) positioned between the flexible display and the plate; and a second polymer layer (e.g., the blocking member 475 of FIG. 14A, the first blocking member 474 of FIG. 18, the blocking member 481 of FIG. 20, and the first blocking member 482 of FIG. 21) positioned between the plate and the first reinforcement plate and the second reinforcement plate.

According to various embodiments, the mobile communication device may further include a buffer member (e.g., the cushion layer 441 of FIG. 14A) positioned between the at least one first polymer layer and the plate.

According to various embodiments, the at least one polymer layer may include two polymer layers (e.g., the first layer 442 and the second layer 443 of FIG. 14A), and the buffer member may be disposed between the two polymer layers.

According to various embodiments, the first polymer layer may include a first material, and the second polymer layer may include a second material different from the first material.

According to various embodiments, the mobile communication device may further include an adhesive layer (e.g., the adhesive member 564 of FIG. 18) positioned between the second polymer layer and the first reinforcement plate.

According to various embodiments, the plate may include an area extended from the pattern and in which the pattern is not formed, and the adhesive layer may be positioned under the area in which the pattern is not formed and be not positioned under the pattern.

According to various embodiments, the mobile communication device may further include a hinge portion (e.g., the hinge structure 164 of FIG. 3) positioned under the first pattern portion and connected to the first housing portion and the second housing portion.

According to various embodiments, the plate may include a first planar portion extended in a first direction with respect to an area in which the pattern is formed, and a second planar portion extended in a second direction opposite to the first direction with respect to an area in which the pattern is formed, and the pattern may not be formed in the first plane portion or the second plane portion.

According to various embodiments, the second pattern portion may relieve a stress applied to a boundary area between the first pattern portion and the second pattern portion.

According to various embodiments, the pattern may be configured with a plurality of openings (e.g., the openings 4531 of FIG. 11B).

According to various embodiments, at least some of the plurality of openings may be filled with a filling member (e.g., the filling member 460 of FIG. 11B).

According to various embodiments, the plurality of openings may include a first opening having a first size and a second opening having a second size greater than the first size.

According to various embodiments, the pattern may be configured with a plurality of recesses.

According to various embodiments, a display module (e.g., the flexible display 1400 of FIG. 14A) includes a flexible display (e.g., the display panel 430 of FIG. 14A) including a first display area (e.g., an area corresponding to the bending portion 453*a* of FIG. 14A) that may be bent according to folding of the display module, and a second display area (e.g., an area corresponding to the first planar portion 451, the second planar portion 452, the first lower attachment portion 453*b*, and the second lower attachment portion 453*c* of FIG. 14A) maintained in a flat surface in a state in which the display module is folded; and a plate (e.g., the conductive plate 450 of FIG. 14A) positioned under the flexible display and in which a pattern having elasticity is formed, wherein a first pattern portion (e.g., the bending portion 453*a* of FIG. 14A) of the pattern is positioned under the first display area, and a second pattern portion (e.g., the first lower attachment portion 453*b* and the second lower attachment portion 453*c* of FIG. 14A) adjacent to the first pattern portion of the pattern is positioned under a portion adjacent to the first display area among the second display area.

According to various embodiments, the second pattern portion may include a first portion formed in a first direction with respect to the first pattern portion, and a second portion formed in a second direction opposite to the first direction with respect to the first pattern portion, wherein the flexible display may include a first reinforcement plate positioned under the first portion; and a second reinforcement plate spaced apart from the first reinforcement plate and positioned under the second portion.

According to various embodiments, the display module may further include at least one first polymer layer positioned between the flexible display and the plate; and a second polymer layer positioned between the plate and the first reinforcement plate.

According to various embodiments, the display module may further include an adhesive layer positioned between the second polymer layer and the first reinforcement plate.

According to various embodiments, the plate may include an area extended from the pattern and in which the pattern is not formed, and the adhesive layer may be positioned under the area in which the pattern is not formed and not be positioned under the pattern.

According to various embodiments, the plate may include a first planar portion extended in a first direction with respect to an area in which the pattern is formed, and a second planar portion extended in a second direction opposite to the first direction with respect to an area in which the pattern is formed, and the pattern may not be formed in the first plane portion or the second plane portion.

According to various embodiments, the pattern may be configured with a plurality of openings.

According to various embodiments, the pattern may be configured with a plurality of recesses.

The embodiments of the disclosure disclosed in this specification and drawings only present a specific example in order to easily describe the technical contents according to an embodiment of the disclosure and to help an understanding of the embodiments of the disclosure, and they do not intend to limit the scope of the embodiments of the disclosure. Accordingly, all changes or modifications derived from the technical idea of various embodiments of the disclosure in addition to the embodiments described herein should be construed as being included in the scope of various embodiments of the disclosure without departing from the scope of the disclosure.

What is claimed is:

1. An electronic device comprising:
a first housing;
a second housing;
a hinge module configured to enable the first housing and the second housing to be folded with respect to each other;
a display panel supported by the first housing and the second housing;
a conductive plate positioned under the display panel, wherein the conductive plate comprises:
a first flat portion disposed with respect to the first housing,
a second flat portion disposed with respect to the second housing, and
a flexible portion formed between the first flat portion and the second flat portion, the flexible portion including a plurality of openings spaced apart from each other so as to enable the flexible portion to bend when the first housing and the second housing are folded with respect to each other;
a blocking member positioned under the flexible portion of the conductive plate such that a first side of the blocking member overlaps with the plurality of openings of the flexible portion of the conductive plate;
a first reinforcing plate positioned at least partially under a first portion of the flexible portion; and
a second reinforcing plate positioned at least partially under a second portion of the flexible portion,
wherein the first reinforcing plate and the second reinforcing plate are disposed to have a gap between the first reinforcing plate and the second reinforcing plate and the gap located at a second side of the blocking member opposed to the first side when the first housing and the second housing are unfolded with respect to each other, and
wherein each of the first reinforcing plate and the second reinforcing plate is adhesively attached to a portion of the conductive plate through an adhesive member except for at least a portion of the flexible portion of the conductive plate corresponding to the plurality of openings.

2. The electronic device of claim 1, further comprising a polymer member positioned between the display panel and the conductive plate.

3. The electronic device of claim 2, wherein the polymer member includes a cushion layer for cushioning.

4. The electronic device of claim 1, wherein the blocking member includes at least one of a thermoplastic polyurethane (TPU), silicone, rubber, urethane or sponge.

5. The electronic device of claim 1, wherein the first reinforcing plate is disposed at a rear surface of the conductive plate and faces at least a portion of a bending portion of the conductive plate and at least a portion adjacent to the bending portion of the conductive plate.

6. The electronic device of claim 1, wherein the second reinforcing plate is disposed at a rear surface of the conductive plate and faces at least a portion of a bending portion of the conductive plate and at least a portion adjacent to the bending portion of the conductive plate at the rear surface of the conductive plate.

7. The electronic device of claim 1, wherein the gap enables the first reinforcing plate and the second reinforcing plate to be folded when the first housing and the second housing are folded with respect to each other.

8. The electronic device of claim 1, wherein the conductive plate further comprises a first support piece protruded, along an edge of the flexible portion of the conductive plate, further than a first edge of the display panel.

9. The electronic device of claim 1, wherein the conductive plate further comprises a second support piece protruded, along an edge of the flexible portion of the conductive plate, further than a second edge of the display panel.

10. The electronic device of claim 1, wherein the conductive plate further comprises a portion including a plurality of recesses formed in a predetermined depth in the first flat portion or the second flat portion.

11. The electronic device of claim 1, wherein the conductive plate includes a metal.

12. The electronic device of claim 1, wherein the first reinforcing plate includes a metal, and the second reinforcing plate includes a metal.

13. The electronic device of claim 1, wherein the gap formed between the first reinforcing plate and the second reinforcing plate includes a first separated gap and a second separated gap having different intervals from each other.

14. The electronic device of claim 1, wherein a gap between the first reinforcing plate and the second reinforcing plate when the first housing and the second housing are folded with respect to each other is greater than a gap between the first reinforcing plate and the second reinforcing plate when the first housing and the second housing are unfolded with respect to each other.

* * * * *